INVENTORS
HANS P LUHN
STEPHEN HNAT
BY Charles E. McTiernan
ATTORNEY

Jan. 22, 1957    H. P. LUHN ET AL    2,778,567
RELAY CALCULATOR
Filed Nov. 23, 1951    24 Sheets-Sheet 8

INVENTORS
HANS P. LUHN
STEPHEN HNAT
BY Charles E. McTiernan
ATTORNEY

Jan. 22, 1957

H. P. LUHN ET AL 2,778,567

RELAY CALCULATOR

Filed Nov. 23, 1951

INVENTORS
HANS P. LUHN
STEPHEN HNAT
BY
Charles E. McTiernan
ATTORNEY

Jan. 22, 1957     H. P. LUHN ET AL     2,778,567
RELAY CALCULATOR
Filed Nov. 23, 1951     24 Sheets-Sheet 13

INVENTORS
HANS P. LUHN
STEPHEN HNAT
BY Charles E. McTiernan
ATTORNEY

Jan. 22, 1957   H. P. LUHN ET AL   2,778,567
RELAY CALCULATOR

Filed Nov. 23, 1951   24 Sheets-Sheet 16

INVENTORS
HANS P. LUHN
BY STEPHEN HNAT
ATTORNEY

Jan. 22, 1957   H. P. LUHN ET AL   2,778,567
RELAY CALCULATOR

Filed Nov. 23, 1951   24 Sheets-Sheet 17

FIG. 3b

DIVISION
$\frac{2986}{75}$ = 39 + REMAINDER

| | 1 | 2 | 3 | 4 | 5 | |
|---|---|---|---|---|---|---|
| DD<br>DR | | 2 9 8 6<br>7 5 | | | | |
| 3rd ON PULSE | 9 7 0<br>7 5 | | | | | ENTERED IN AUGEND<br>ENTERED IN ADDEND<br>AUGEND INVERTED |
| 4th ON PULSE | 7 0 1 3 0<br>7 5 | | | | | 1st SHIFT<br>"1" ENTERED IN ADDEND |
| 5th ON PULSE | | 7 7 6 3<br>7 5 | | | | |
| 6th ON PULSE | | 8 5 1 3 2<br>7 5 | | | | |
| 7th ON PULSE | | 9 2 6 3 3<br>7 5 | | | | |
| 8th ON PULSE | | 2 6 3 3 0<br>7 5 | | | | 2nd SHIFT |
| 9th ON PULSE | | 3 3 8 3<br>7 5 | | | | |
| 10th ON PULSE | | 4 1 3 3 2<br>7 5 | | | | |
| 11th ON PULSE | | 4 8 8 3<br>7 5 | | | | |
| 12th ON PULSE | | 5 6 3 3 4<br>7 5 | | | | |
| 13th ON PULSE | | 6 3 8 3 5<br>7 5 | | | | |
| 14th ON PULSE | | 7 1 3 3 6<br>7 5 | | | | |
| 15th ON PULSE | | 7 8 8 3 7<br>7 5 | | | | |
| 16th ON PULSE | | 8 6 3 3 8<br>7 5 | | | | |
| 17th ON PULSE | | 9 3 8 3 9<br>7 5 | | | | |
| 18th ON PULSE | | 9 3 8 3 9<br>7 5 | | | | 3rd SHIFT |

FIG. 3a

MULTIPLICATION
69 × 83 = 5727

| | 1 | 2 | 3 | 4 | 5 | |
|---|---|---|---|---|---|---|
| MP<br>MC | 8 3<br>6 9 | | | | | ENTERED IN RELAY STORAGE<br>ENTERED IN ADDEND |
| STEP 1 | | | | | | |
| STEP 2 | 8 3<br>6 9 | | | | | TRANSFERRED TO AUGEND |
| STEP 3-3rd ON PULSE | 9 1 6<br>6 9 | | | | | AUGEND INVERTED<br>"1" ENTERED IN ADDEND |
| STEP 4-4th ON PULSE | 6<br>6 9 | | | | | 1st SHIFT |
| STEP 5-5th ON PULSE | 2 6<br>6 9 | | | | | |
| STEP 6-6th ON PULSE | 3 6 1 3 8<br>6 9 | | | | | |
| STEP 7-7th ON PULSE | 4 6 2 0 7<br>6 9 | | | | | |
| STEP 8-8th ON PULSE | 5 6 2 7 6<br>6 9 | | | | | |
| STEP 9-9th ON PULSE | 6 6 3 4 5<br>6 9 | | | | | |
| STEP 10-10th ON PULSE | 7 6 4 1 4<br>6 9 | | | | | |
| STEP 11-11th ON PULSE | 8 6 4 8 3<br>6 9 | | | | | |
| STEP 12-12th ON PULSE | 9 6 5 5 2<br>6 9 | | | | | 2nd SHIFT |
| STEP 13-13th ON PULSE | 6 5 5 2 0<br>6 9 | | | | | |
| STEP 14-14th ON PULSE | 7 5 5 8 9<br>6 9 | | | | | |
| STEP 15-15th ON PULSE | 8 5 6 5 8<br>6 9 | | | | | |
| STEP 16-16th ON PULSE | 9 5 7 2 7<br>6 9 | | | | | |
| STEP 17-17th ON PULSE | 9 5 7 2 7<br>6 9 | | | | | 3rd SHIFT |

INVENTORS
HANS P. LUHN
STEPHEN HNAT
BY
Charles E. McTiernan
ATTORNEY

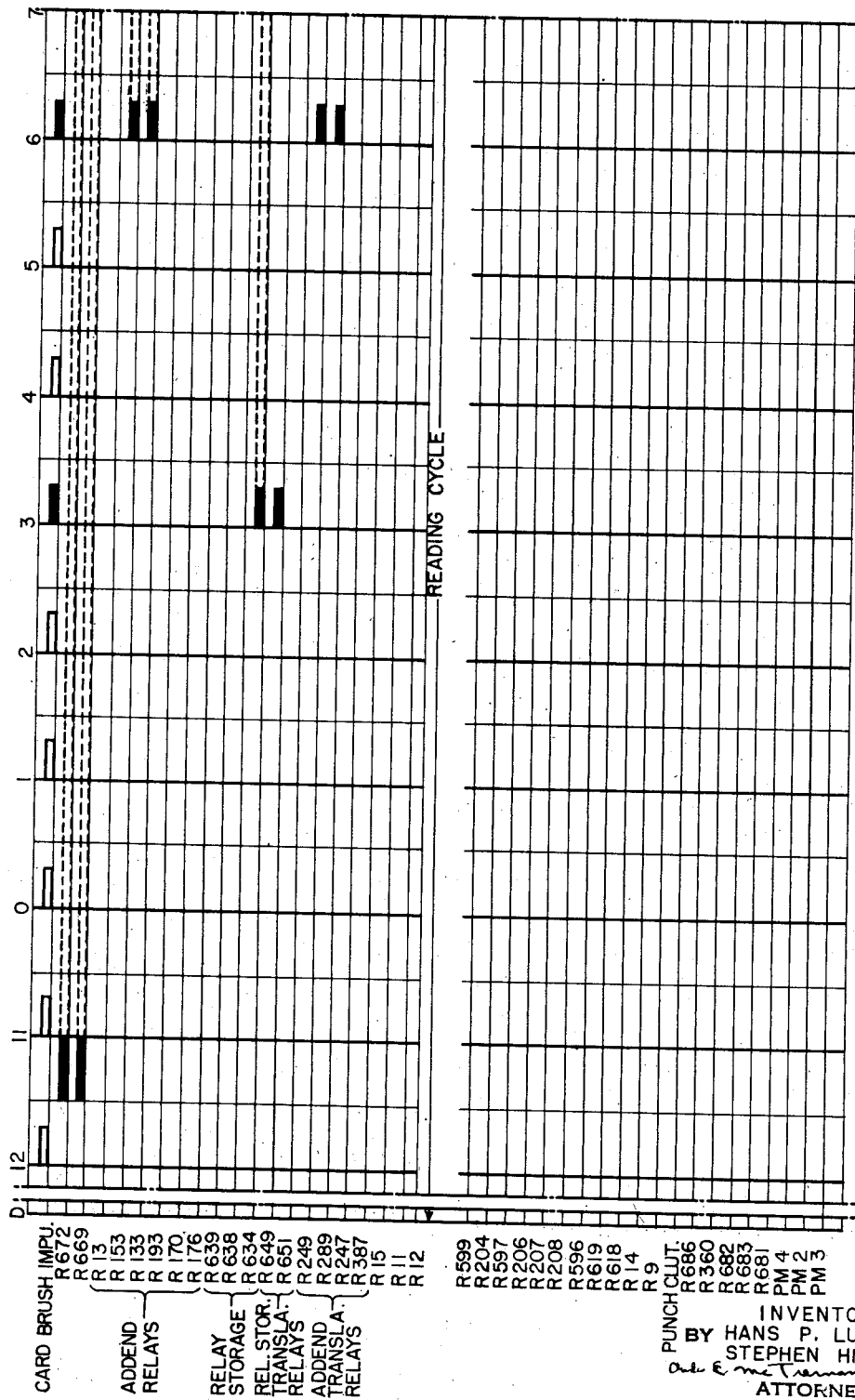

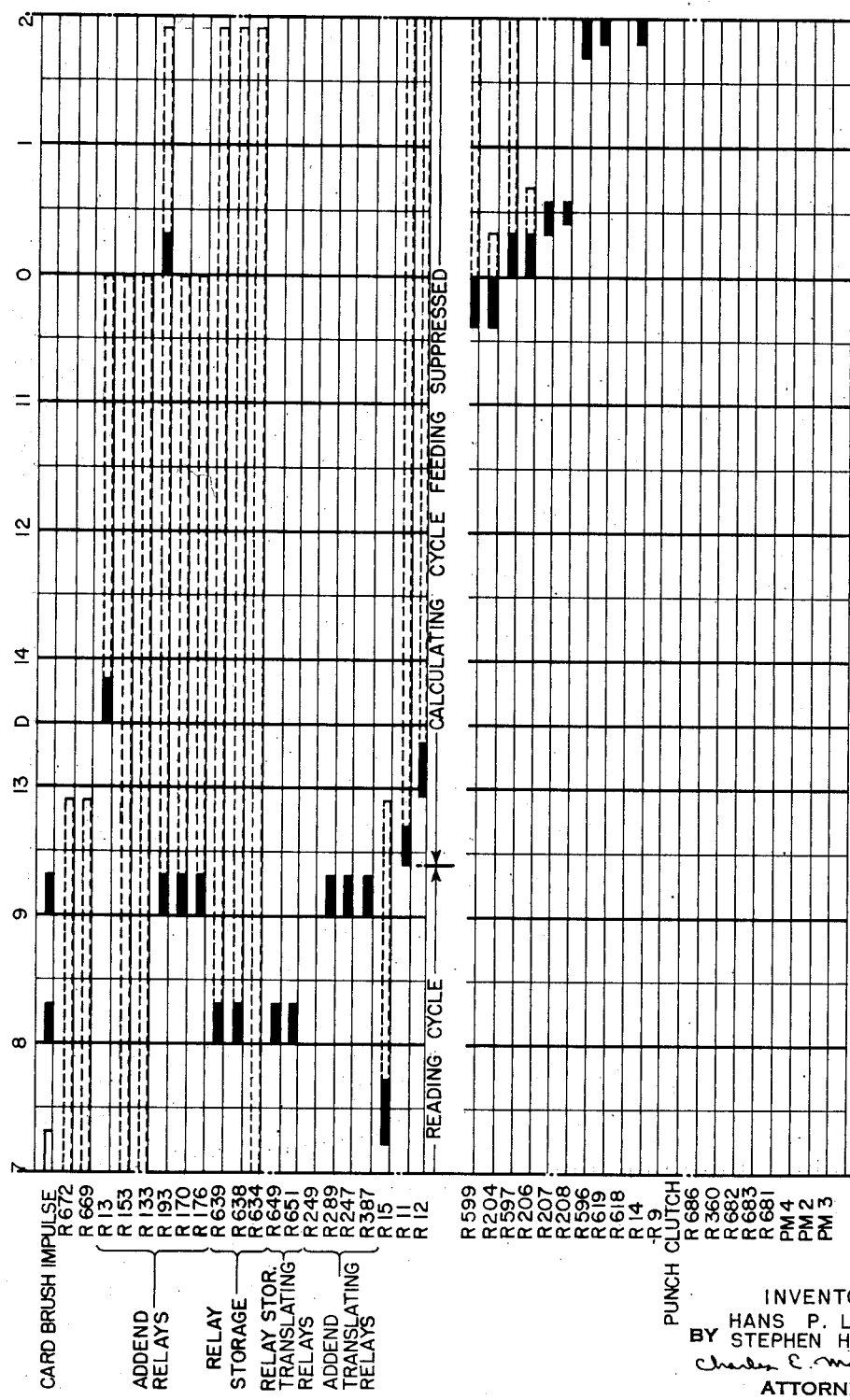

Jan. 22, 1957          H. P. LUHN ET AL          2,778,567
                        RELAY CALCULATOR
Filed Nov. 23, 1951                          24 Sheets-Sheet 20

INVENTORS
HANS P. LUHN
BY STEPHEN HNAT

ATTORNEY

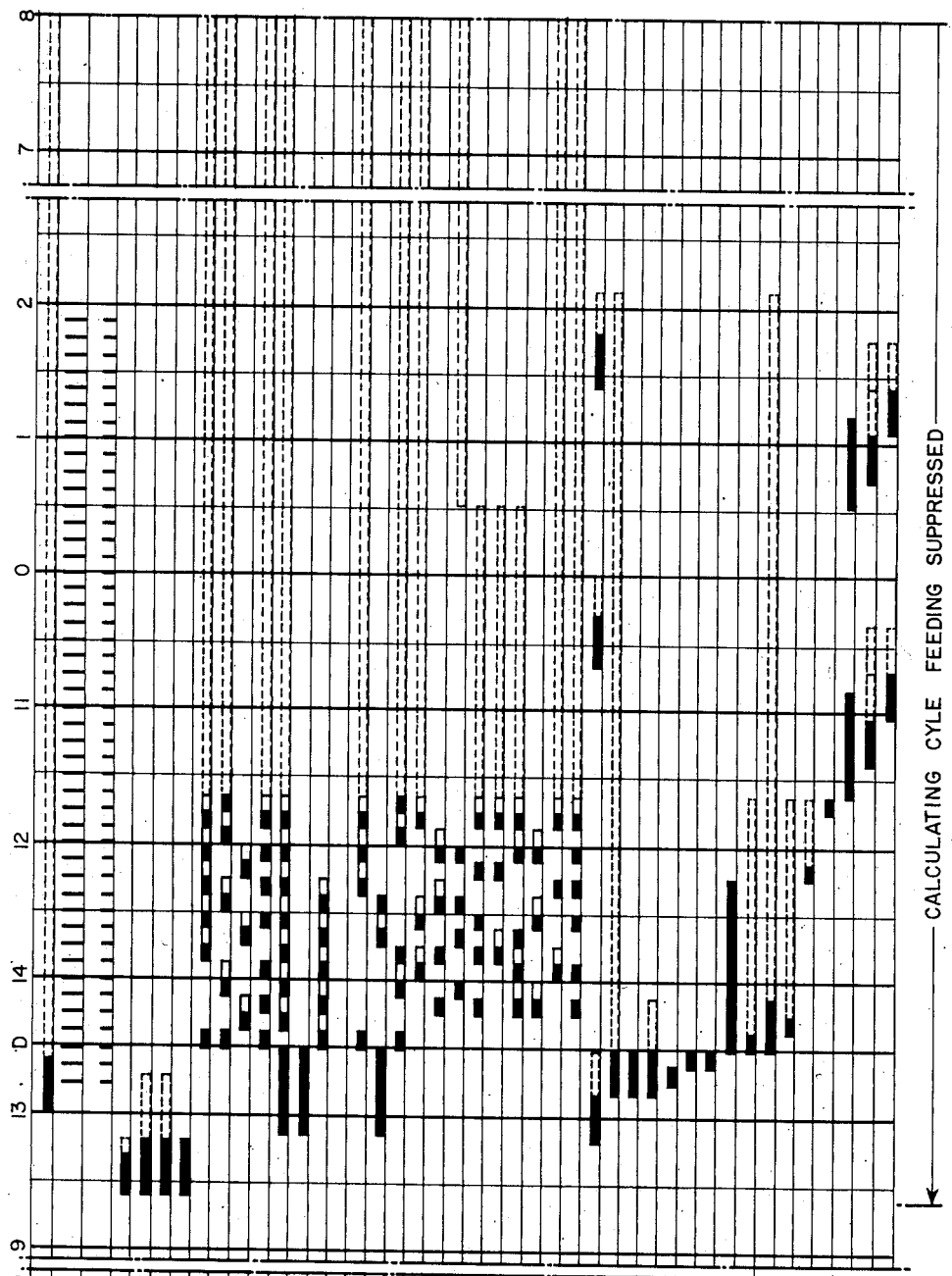

INVENTORS
HANS P. LUHN
BY STEPHEN HNAT
ATTORNEY

Jan. 22, 1957   H. P. LUHN ET AL   2,778,567
RELAY CALCULATOR
Filed Nov. 23, 1951   24 Sheets-Sheet 23

INVENTORS
HANS P. LUHN
STEPHEN HNAT
ATTORNEY

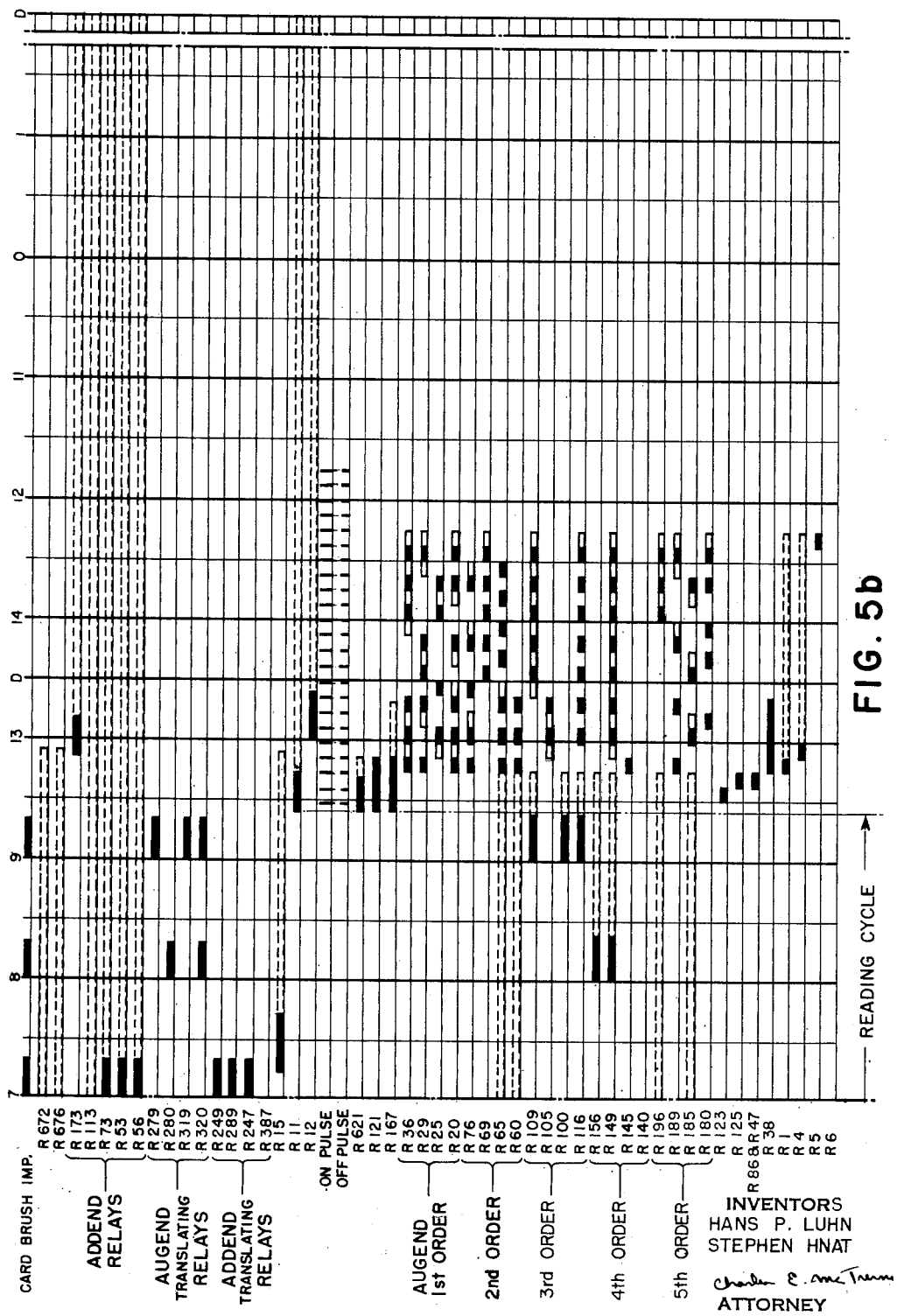

United States Patent Office 2,778,567
Patented Jan. 22, 1957

2,778,567

RELAY CALCULATOR

Hans P. Luhn, Armonk, and Stephen Hnat, New York, N. Y., assignors to International Business Machines Corporation, New York, N. Y., a corporation of New York Application November 23, 1951, Serial No. 257,814

5 Claims. (Cl. 235—61)

The present invention relates to calculating machines and more particularly to a tube controlled relay calculator.

In the calculating machines representative of the prior art, such as Patent No. 2,486,809 issued to George R. Stibitz, November 1, 1949, it has become the practice to provide relay accumulator apparatus in which three sets of code relays are provided. In the aforementioned patent, the three sets of relays function as augend, addend, and sum relays where one of said sets permanently operates as addend means and the other two sets alternately operate as augend and sum means. In other instances of the prior art where the three sets of relays function as augend, addend and sum relays, the amounts set up in the augend and addend are added and entered into the sum relays which is then transferred back to the augend. In either case much apparatus is employed resulting in complexity of circuits in order to produce the proper result. In the case where the sum is transferred back to the augend, the adding frequency of the accumulator is hindered due to the required time necessary to reset the augend relays from the sum relays.

The principal object of the invention is to provide a tube controlled relay calculator having an adding frequency double that of the prior art.

Another object of the invention is to provide two sets of relays for functioning as the augend and the addend relays where the augend relays are controlled by electron discharge means thereby making it possible to reset the augend relays to register the sum of the addend and augend values.

A further object of the invention is to provide a novel summation unit in which the values set up in a pair of sets of relays are added with one of the sets being reset by a single impulse to indicate the sum.

A still further object of the invention is to provide a comparison circuit arrangement for determining if the augend, in complement form, is equal to, greater than, or smaller than the addend.

A still further object of the invention is to provide a tube controlled relay calculator wherein, depending upon the relative magnitude of the augend with respect to the addend and in response to a single electrical impulse, either the augend will be reset to indicate the sum or a column shifting operation will take place therein.

Another object of the invention is to provide column shifting devices controlled by associated comparing means whenever the augend, in complementary form, is less than the addend.

Other objects of the invention will be pointed out in the following description and claims and illustrated in the accompanying drawings, which disclose, by way of examples, the principle of the invention and the best mode, which has been contemplated, of applying that principle.

In the drawings:

Figs. 1a, 1b, 1c, 1d, 1e, 1f, 1g, 1h, 1i, 1j, 1k, 1m, 1n, 1o and 1p arranged horizontally form the electrical circuit arrangement for the present invention.

Fig. 3a is a diagram showing the stages involved in a particular multiplication problem.

Fig. 3b is a diagram showing the stages involved in a particular problem in division.

Figs. 4a, 4b, 4c, 4d and 4e placed in the order 4a    4b    4c
            4d    4e constitute a timing diagram for a particular multiplication problem.

Figure 5A:
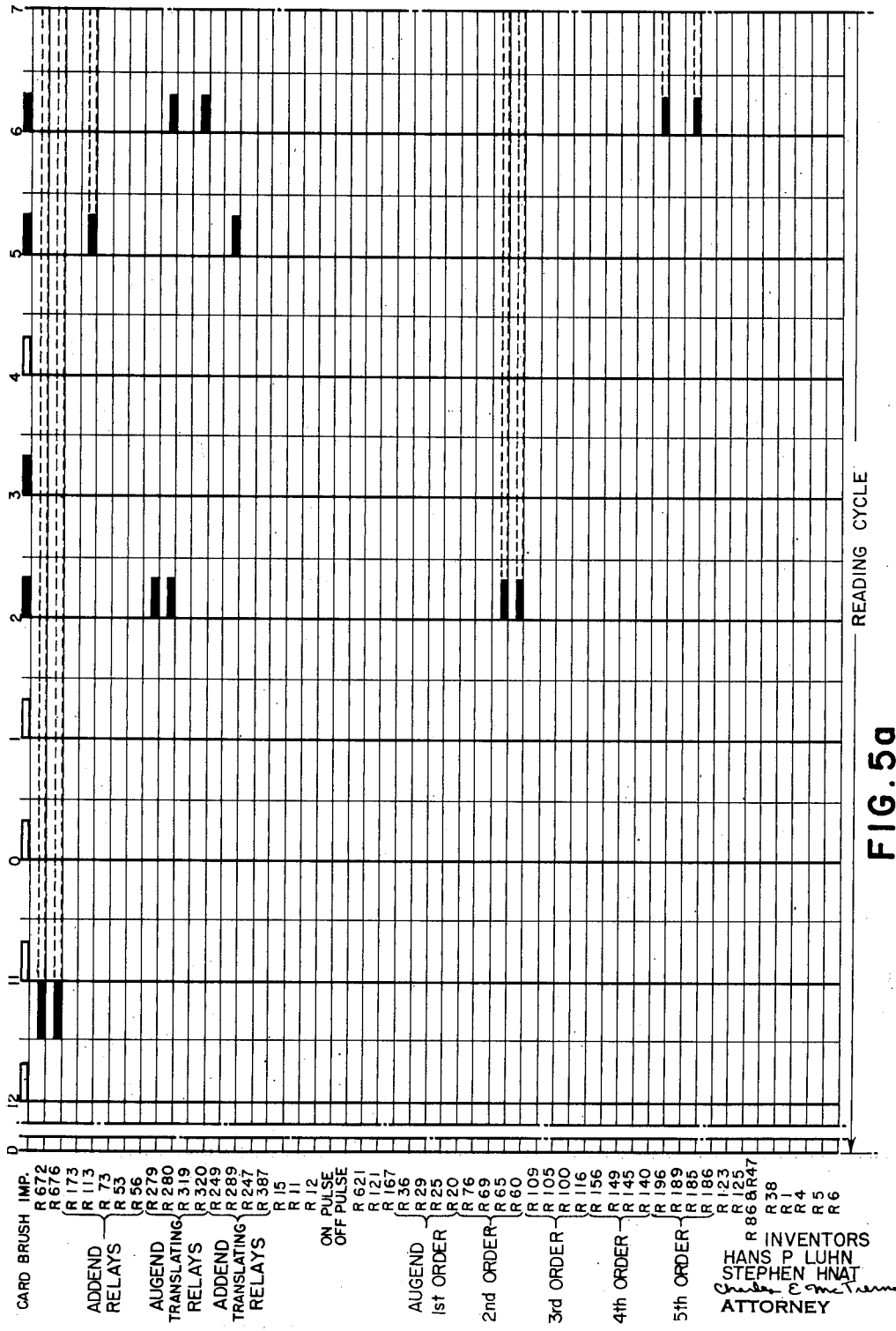

Figs. 5a and 5b placed in a horizontal position constitute a timing diagram for a particular problem in division.

In the operation of the calculator, after the multiplier in complement form and the multiplicand, or dividend in complement form and the divisor, have been entered respectively in the RS and B relays in codified form, a programming step is initiated for transferring the amount entered in the RS relays into the A relays. The RS relays are the relay storage relays, the A relays being the augend relays, and the B relays the addend relays where all three constitute factor receiving devices. Then the next following program step calling for the particular mathematical operation, such as multiplication or division, takes place. During this step a comparison is made by individual successive electrical pulses to determine the relative magnitude of the highest order digit of the multiplier in complement form with a "1" entered in the corresponding order of the multiplicand, for example. If the results of the comparison indicate that the multiplier is either equal to or greater than the multiplicand then the A relays will be reset to indicate the partial product. If the comparison indicates that the multiplier is less than the multiplicand then the value standing in each of the five orders of the A relays will be shifted to the next higher order. Each time the multiplier is determined to be greater than the multiplicand, the multiplicand is repeatedly added a number of times necessary to reduce the tens digit of the multiplier in complement form to zero. When the tens digit of the multiplier is reduced to zero, the comparison test will indicate that the multiplier is less than the multiplicand thereby resulting in a column shifting operation taking place. Then the comparison test will indicate the multiplier is either equal to or greater than the multiplicand and as a result the multiplicand is again repeatedly added a number of times necessary to reduce the units digit of the multiplier to zero. When the units digit is reduced to zero, the comparison test will indicate that the multiplier is again less than the multiplicand. Each time the comparison test indicates that the "1" in the highest addend order is greater than the multiplier, such will be registered in a product count relay unit. Thus, inasmuch as the invention is being described with reference to a problem of multiplying one two-digit number by another two-digit number, or a problem of dividing a two-digit number into a four-digit number, the resultant product or quotient will be registered in the A relays after the third column shifting operation. The product count relay will, upon receiving a pulse indicating the third column shifting operation, prevent further computations and, as a result, cause either the product or quotient to be registered in the augend.

*Entry control*

The factors from a record card representing either the multiplicand and multiplier, or the divisor and dividend, as the case may be, may be entered into the corresponding one of the five accumulating orders or positions of any of the four factor receiving devices which are respectively designated as the augend, the addend, the relay storage, and the capacitor storage. Inasmuch as a readout operation can take place only from either the augend or the relay storage device, factors may be entered from the record card into the addend and the capacitor storage and either the augend or the relay storage device. This restriction on the number of factors which can be entered into the factor receiving devices is attributed to the fact that at the time a readout operation is taking place from either the augend or the relay storage device, factors are being read and entered from the next following record card into any of the remaining three receiving devices. It should be pointed out, however, that it is well within the scope of the invention to add more factor receiving devices to handle a like increase of factors whenever such is required.

The four factor receiving devices likewise are adapted to permit the transfer of factors from one device to another during a calculating operation except that when called for during a transferring operation the factor entered in the capacitor storage device can only be transferred to the augend.

The four factor receiving devices are initially conditioned to receive a factor through the plugging of the corresponding entry hub thereof to the entry control hub. Upon determining which of the devices are to receive factors, the entry control hub 147 (Fig. 1f) will be plugged to the selected ones of the entry hubs 148, 149, 150, 151 and 152 of the respective augend, addend, relay storage, capacitor storage #1, and capacitor storage #2 receiving devices. This plugging arrangement will result in the energization of the entry control relays when the cam controlled contacts C38 (Fig. 1f) make at 12.5 index time of a reading cycle. The energized entry control relays will be held in such a state until the end of the reading cycle by the cam controlled contacts C44 (Fig. 1f) which contacts make at 14 and break at 9.9 index time of each card cycle as shown in the timing diagram of Fig. 2.

The record card bearing the factor to be read and entered is moved past the sensing brushes such that as a perforation is sensed, a connection is established between the conductive roll 17 and the sensing brush. The conductive roll 17 is coupled through the cam controlled contacts C16 (Fig. 1a) to the line 14 coupled to the positive side of a 40-volt power supply (not shown). The contacts C16, as shown in the timing diagram of Fig. 2, assume a closed position as each index point position of the record card is in a sensing position. The sensing brushes are adapted to scan the respective orders of the factors entered in the record card, and are coupled to the corresponding order of the selected factor receiving devices. For example, brushes 10 and 11 (Fig. 1a) which are respectively sensing the column containing the tens and units digit of the factor 83 are coupled respectively to the second and third order of the relay storage receiving device.

Translating circuit

The factors entered in the record card are represented in decimal form. The factors as entered in the factor receiving devices are represented therein pursuant to a coding notation 0, 1, 3 and 5. This conversion is made possible through the energization of the translating relays (Fig. 1d) either singly or in combination so as to cause the shifting of contacts of an associated network thereby enabling the sensed value to be entered in the factor receiving relays pursuant to the coding notation 0, 1, 3 and 5.

There is a set of translating relays for the augend and addend factor receiving devices while there is a common set of translating relays for the relay storage and capacitor storage receiving devices. The translating relays for the auguend are R279, R280, R319 and R320 (Fig. 1d) respectively representative of the values 0, 1, 3 and 5. The translating relays for the addend are R247, R249, R287 and R289 (Fig. 1d) respectively representative of the values 0, 1, 3 and 5. The translating relays for the relay storage and capacitor storage receiving devices are R646, R648, R649 and R651 (Fig. 1d) respectively representative of the values 0, 1, 3 and 5.

Figure 1A:
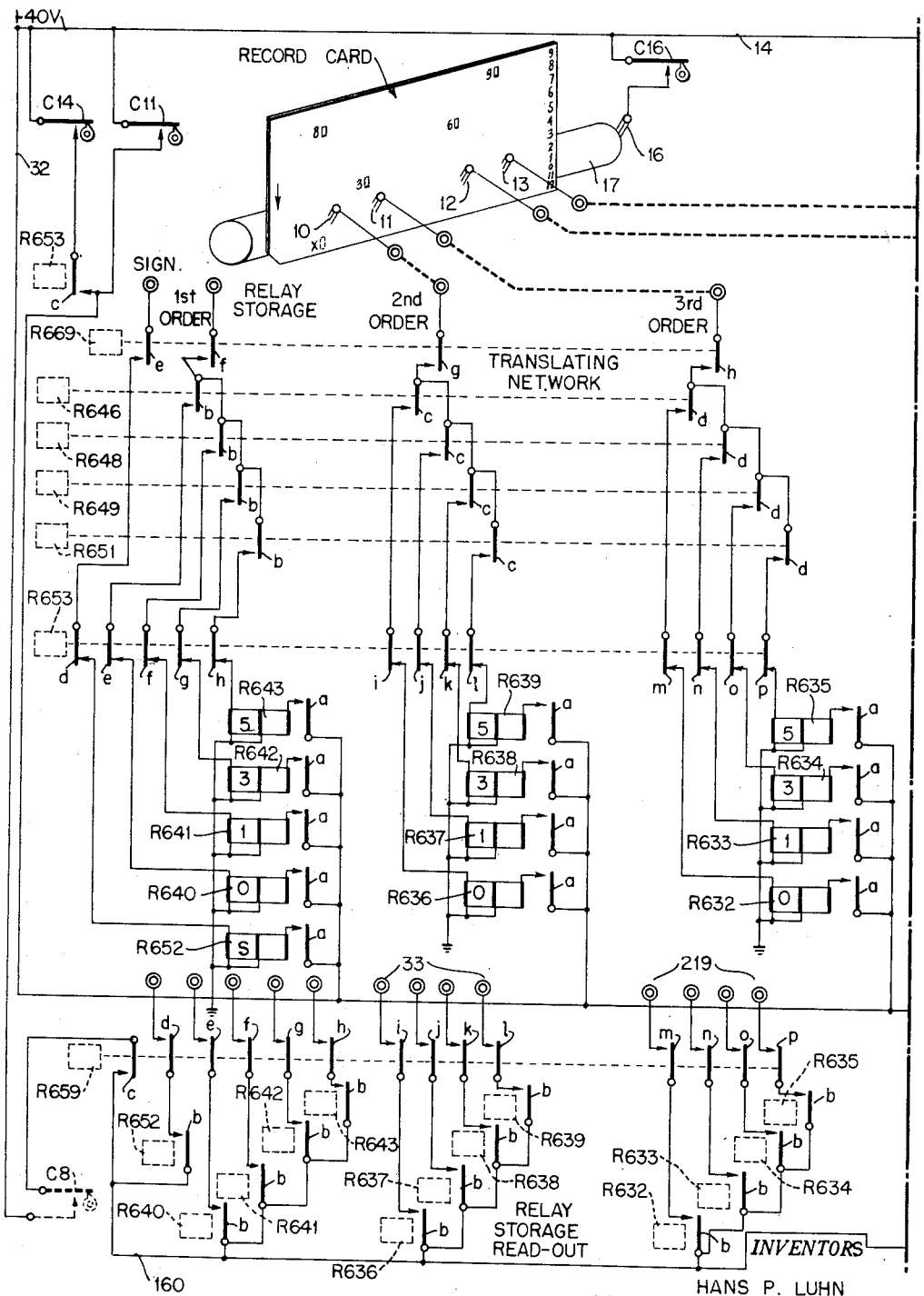
Figure 1B:
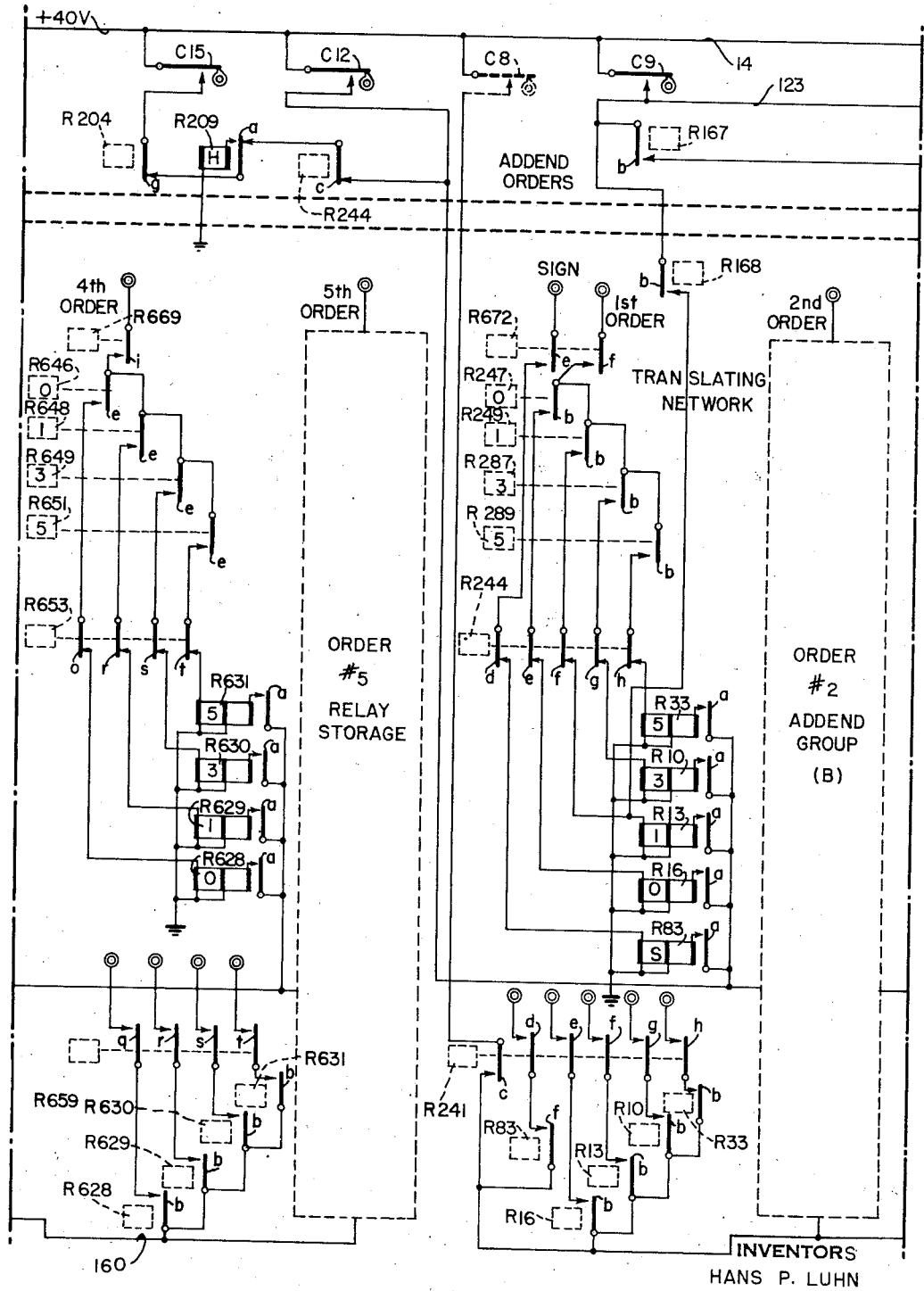
Figure 1C:
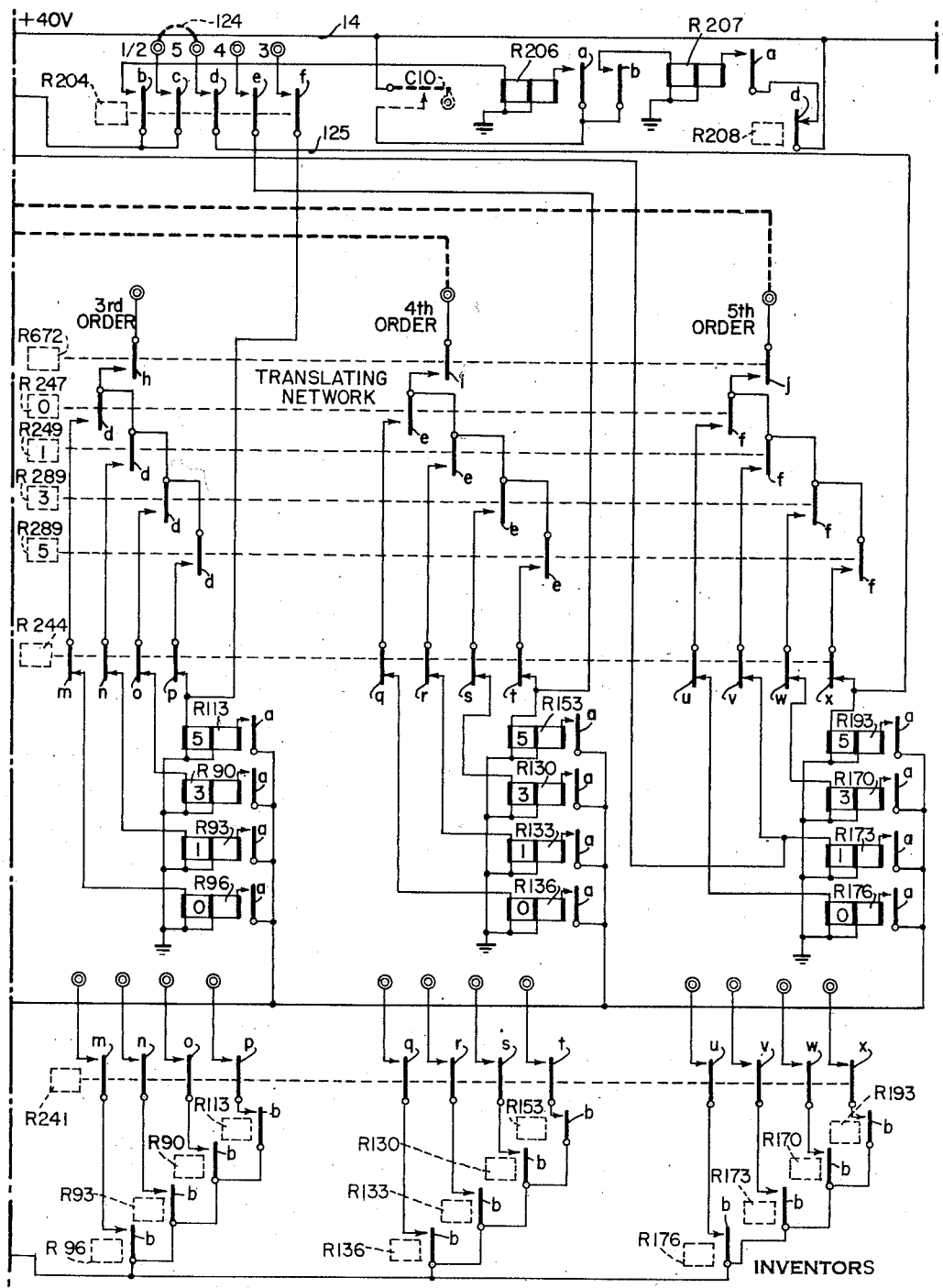
Figure 1D:
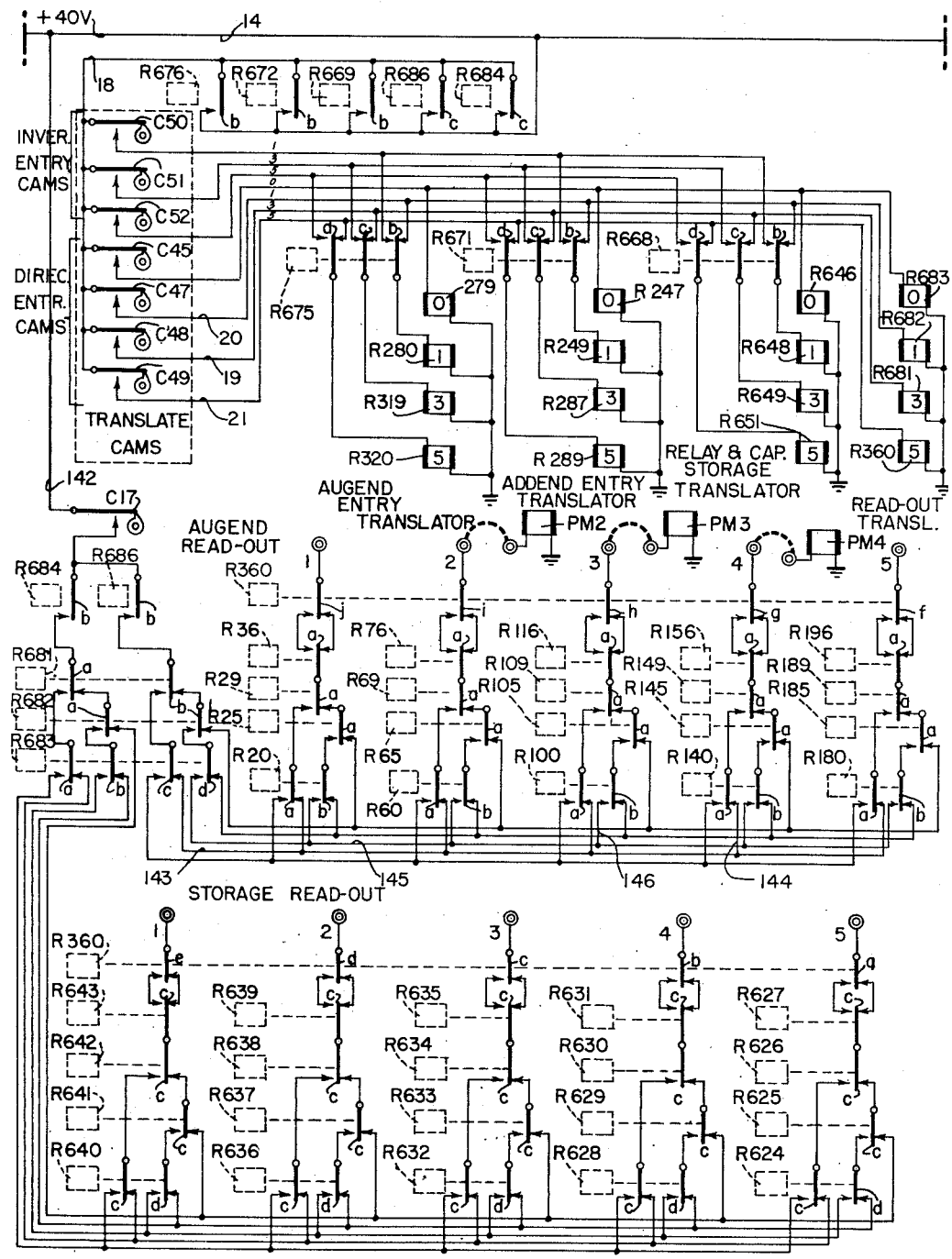

The energization of the translating relays associated with the receiving device into which the factor represented in the card is to be entered is controlled by the translating cams C45, C47, C48 and C49 (Fig. 1d). These four cams are so timed, as shown in the timing diagram of Fig. 2, to cause the energization of the particular translating relays concerned thereby enabling the equivalent values for each index point from 0 to 9 to be registered in code. For example, in the addend entry translator when the cam 45 closes its associated contacts at "0" index time, the relay R247 will be energized. The closing of the corresponding contacts of cam 47 at "1" index time will result in the relay R249 being energized. At "2" index time each of the cams C45 and C47 will close its associated contacts thereby enabling the relays R247 and R249 to be energized, and thus converting the decimal value 2 to the equivalent code arrangement as represented by the values 0 and 1. At "3" index time the cam C48 will close its associated contacts thereby causing the relay R287 to be energized. At "4" index time the cams C45 and C49 will close associated contacts causing the energization of the corresponding relays R247 and R287. Thus the value 4 will be converted to the code equivalent thereof through the energization of the relays R247 and R287 respectively representative of the values 0 and 3. At "5" index time the cam C49 closes its associated contacts thereby causing the energization of the relay R289. The conversion of the remaining values 6, 7, 8 and 9 now become self evident and need not be discussed.

Now as the respective sensing brushes traverse the index point positions of the record card, the translating cams in synchronization with the feeding of the record card are causing the energization of the translating relays representative of a value equivalent to the index point being sensed.

The energization of the translating relays associated with each receiving device controls the positioning of the associated contacts constituting a translating network for each order of each factor receiving device. The translating network is so positioned as each index point is traversed that upon sensing a perforation in the record card, a circuit will be completed therethrough to cause the value to be stored either singly or in combination in the four storage relays which are representative of the values 0, 1, 3 and 5. In the case of the capacitor storage receiving device, the value sensed upon being applied to a particular order will be stored either singly or in combination in the four capacitors which likewise are representative of the values 0, 1, 3 and 5.

Figure 2:
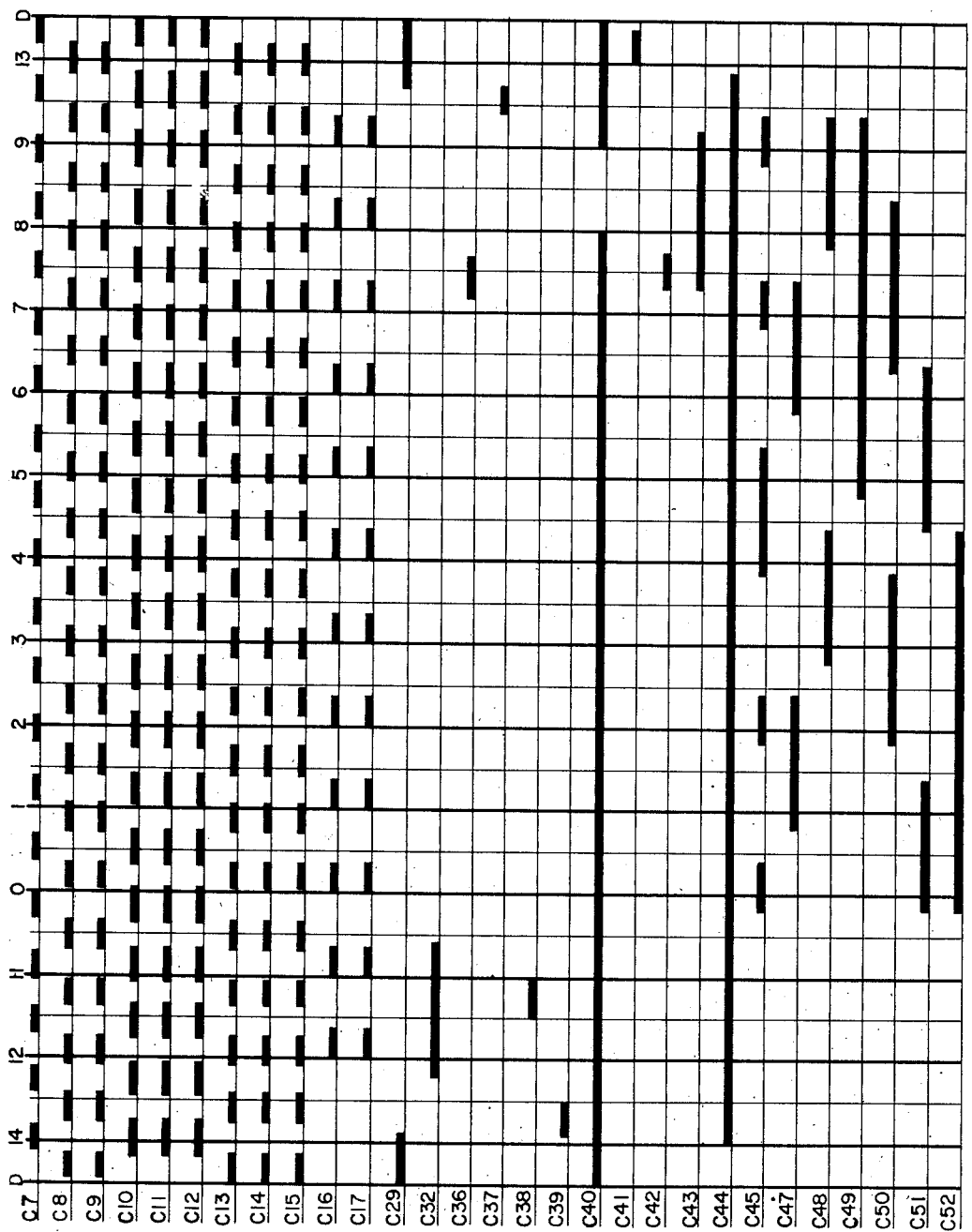
Fig. 2 is a timing diagram of the several cam controlled contacts of the calculator.
Figure 4C:
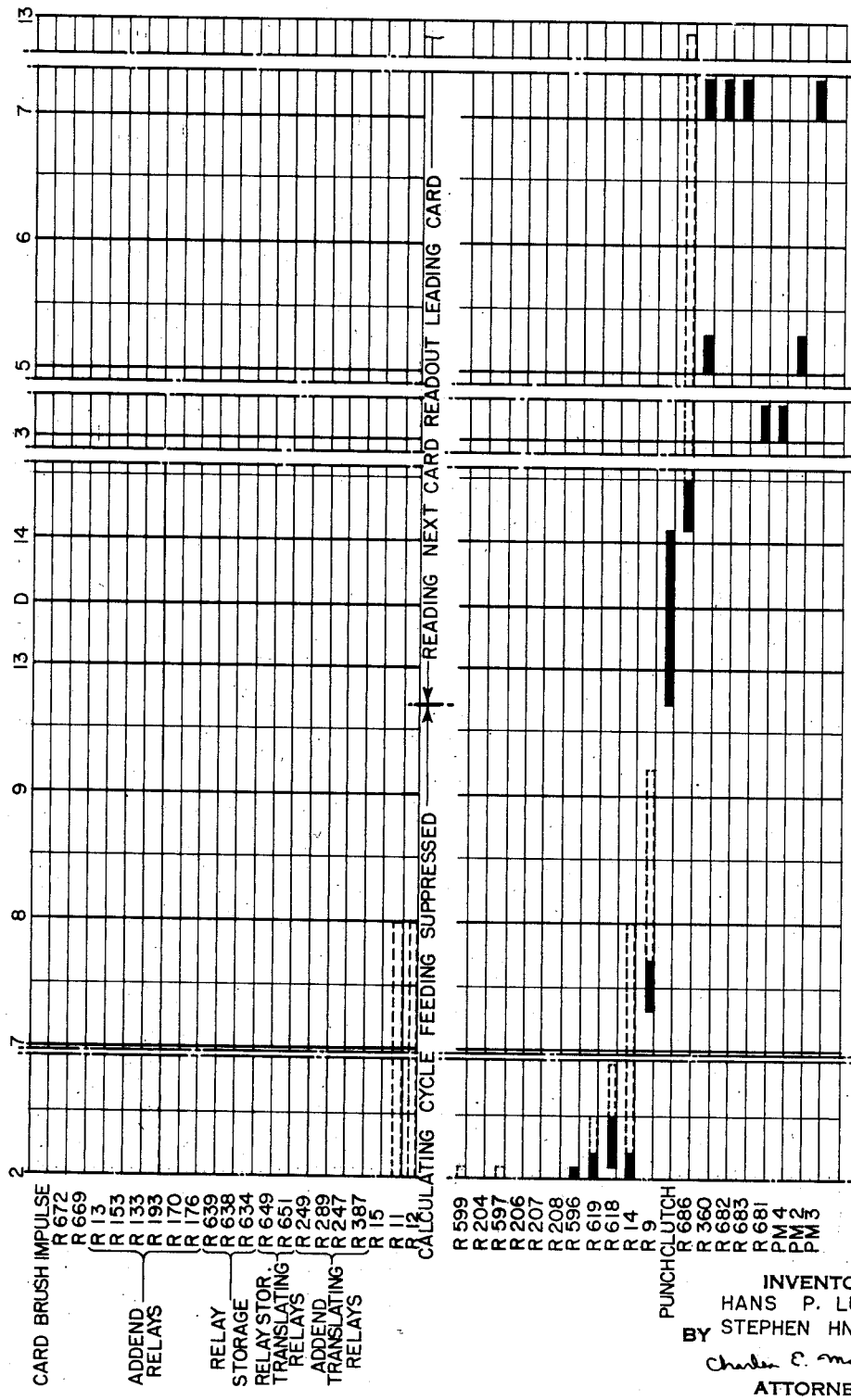
Figure 4E:
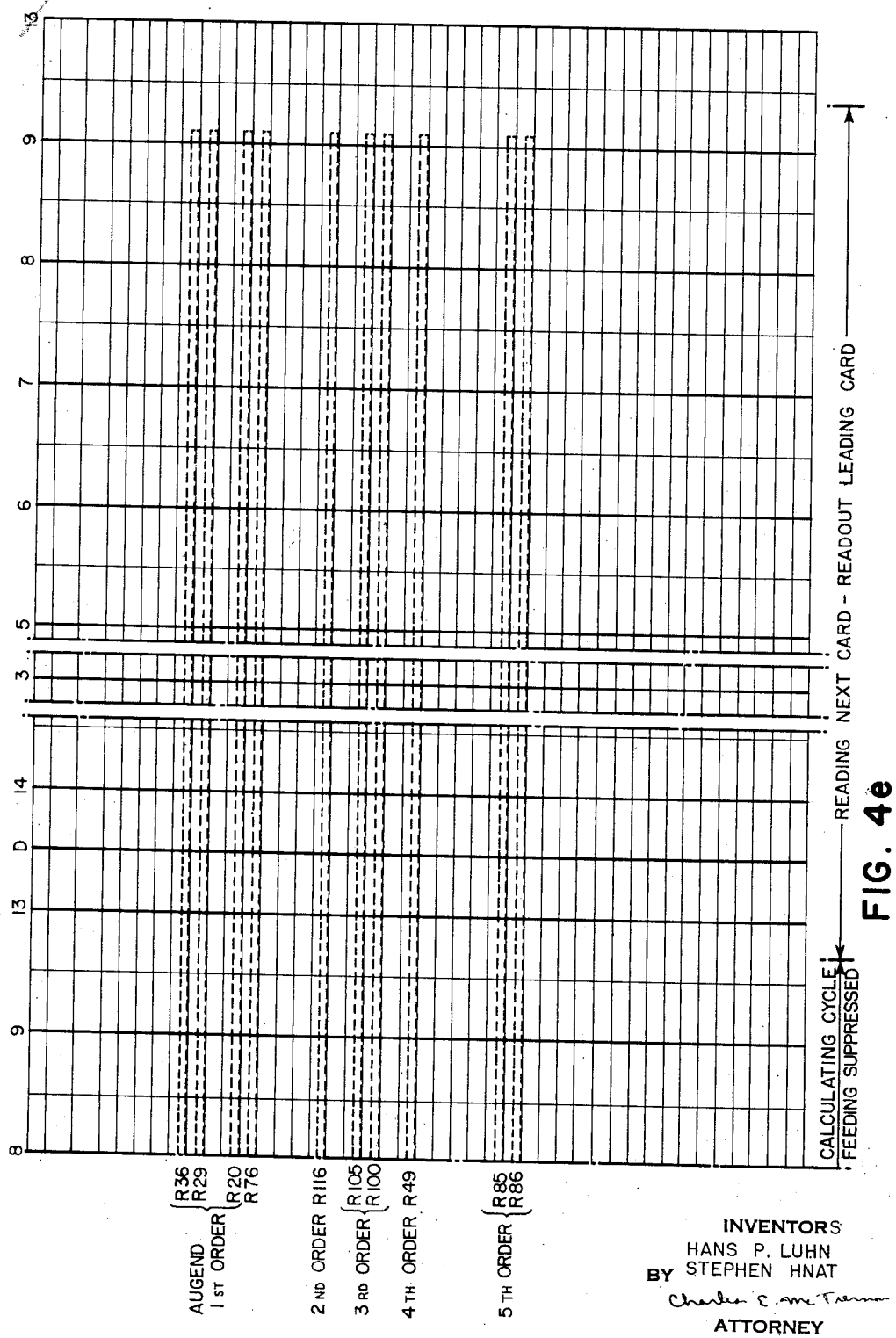

For example, when the "8" in the factor 83 represented in the record card shown in Fig. 1a is sensed, and which is to be entered in the second order of the relay storage receiving device, the translating relays R651 and R649 (Fig. 1d) representative of the code values 5 and 3 will be in an energized state and the associated contacts R649c and R651c (Fig. 1a) in the translating network of the second order of the relay storage device will be closed. The sensing of the perforation in the "8" index position and the energizing of the relays R651 and R649 at this time will thus enable a complete circuit to be traced from conductor 14 (Fig. 1a), cam controlled contacts C16 now closed, brush 16, roll 17, brush 10, entry control relay contacts R669g now closed, respective contacts R649c and R651c now closed, corresponding contacts R653k and R653z as shown, respective relays R638 and R639 and then to ground thereby causing the relays R638 and R639 representative of the values 3 and 5 to be energized. A hold circuit for these relays through the associated a contacts will be set up through the alternate making and breaking of the cam controlled contacts C11 and C14 (Fig. 1a). The timing for the contacts C11 and C14 is shown in Fig. 2.

With regard to entering a value directly from the record card into the augend, let it be sufficient to state at this time that upon sensing a perforation which is to be applied to a particular order of the augend, a circuit will be established through the associated translating relay network for rendering the corresponding augend control tube, such as tube VT2 (Fig. 1k) for example, conductive. The rendering of the control tube will, in turn, energize and hold the corresponding augend relay R25. After all the values entered in the record card have been sensed, converted and entered in the proper factor receiving relays, the program counter (Fig. 1e) becomes effective.

Programming

The program counter provides ten program steps for selecting and ordering the operations to be performed by the calculator. Depending upon the operations to be performed, the program step hubs PS1, PS2, PS3, PS4 . . . PS10 (Fig. 1e) may be plugged to the corresponding hubs of the control relays R122, R121 and R161, respectively representative of a multiplication, division and addition mathematical operation, and the gate relays R204, R199, R79, R244, R241, R653, R659, R563, R566, R605 and R608, representative of a transferring operation between the various factor receiving devices.

The program counter is rendered effective at the end of a card read cycle when the cam control contacts C37 (Fig. 1e) make at 9.4 index time, as shown in the timing diagram of Fig. 2, thereby enabling the program start relay R621 (Fig. 1e) to be energized. The energization of this relay R621 will then enable the first program step, depending upon the plugging arrangement from the hubs PS1 to either the gate or control relays, to be carried out when the cam control contacts C10 (Fig. 1e) make. The timing of C10 is shown in Fig. 2.

The program counter is a decimal relay counter which is advanced through the ten program steps by the count relay R622 (Fig. 1e) which is pulsed by either the gate relay or the calculator complete relay R203 (Fig. 1e) at the end of the operation called for by each program step. After the completion of one of the operations called for by the gate relays, the cam controlled contacts C8 (Fig. 1e) will cause the energization of the relay R622. At the completion of one of the mathematical operations as represented by the picking up of any of the control relays by the program step, the relay R622 will be energized by a circuit established by the cam controlled contacts C13 (Fig. 1e) after the cam controlled contacts C10 (Fig. 1e) cause the energization of the calculate complete relay R203.

Figure 1E:
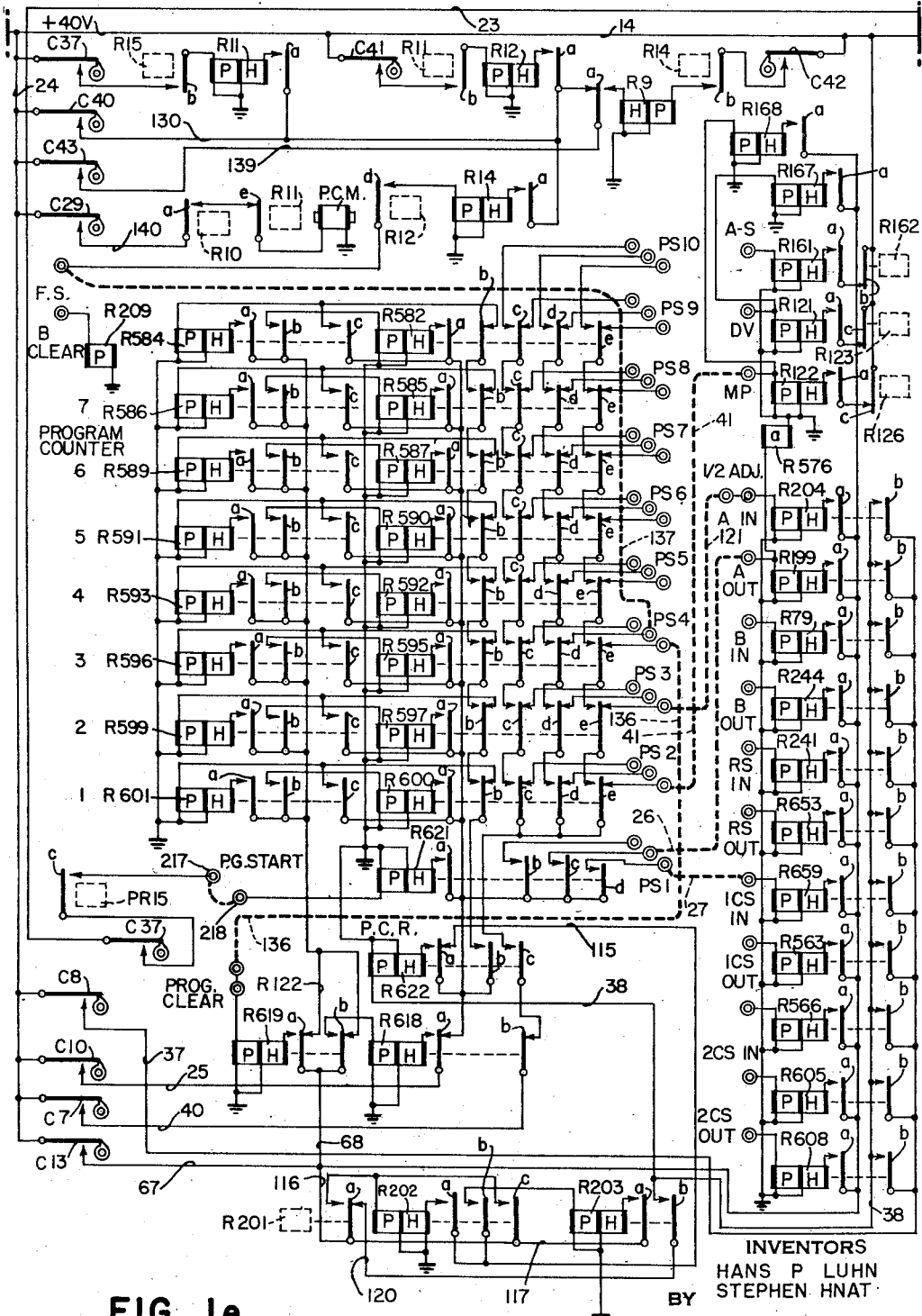

During the time the count relay R622 is energized, the cam control contacts C7 (Fig. 1e) will close thereby initiating the second program step while the cam control contacts C10 will set up a hold circuit for R622 and pick up the pilot relay R601 (Fig. 1e). At the time the operation called for by the program step is being carried out, the cam controlled contacts C13 (Fig. 1e) will set up a hold circuit for the relay R601 and pick up the associated step relay R600. The relays R600 and R601 will then be held in an energized condition by the contacts C10 and C13 until the program clear relay R619 (Fig. 1e) is operated by the final program step.

After the operation called for by the second program step is completed, the count relay R622 will once again be energized. Thus when the contacts C10 make at this time and with R600 still energized, a circuit will be established for picking up the pilot relay R599 (Fig. 1e). It is to be noted that the energizing of the step relay R600 advances the counter to pick up the next program step.

The final program step is plugged to pick up the clear relay R619 (Fig. 1e). The energizing of this relay breaks the hold circuits for the pilot and step counter relays as set up by the contacts C13 and C10.

Arithmetic controls

Figure 1F:
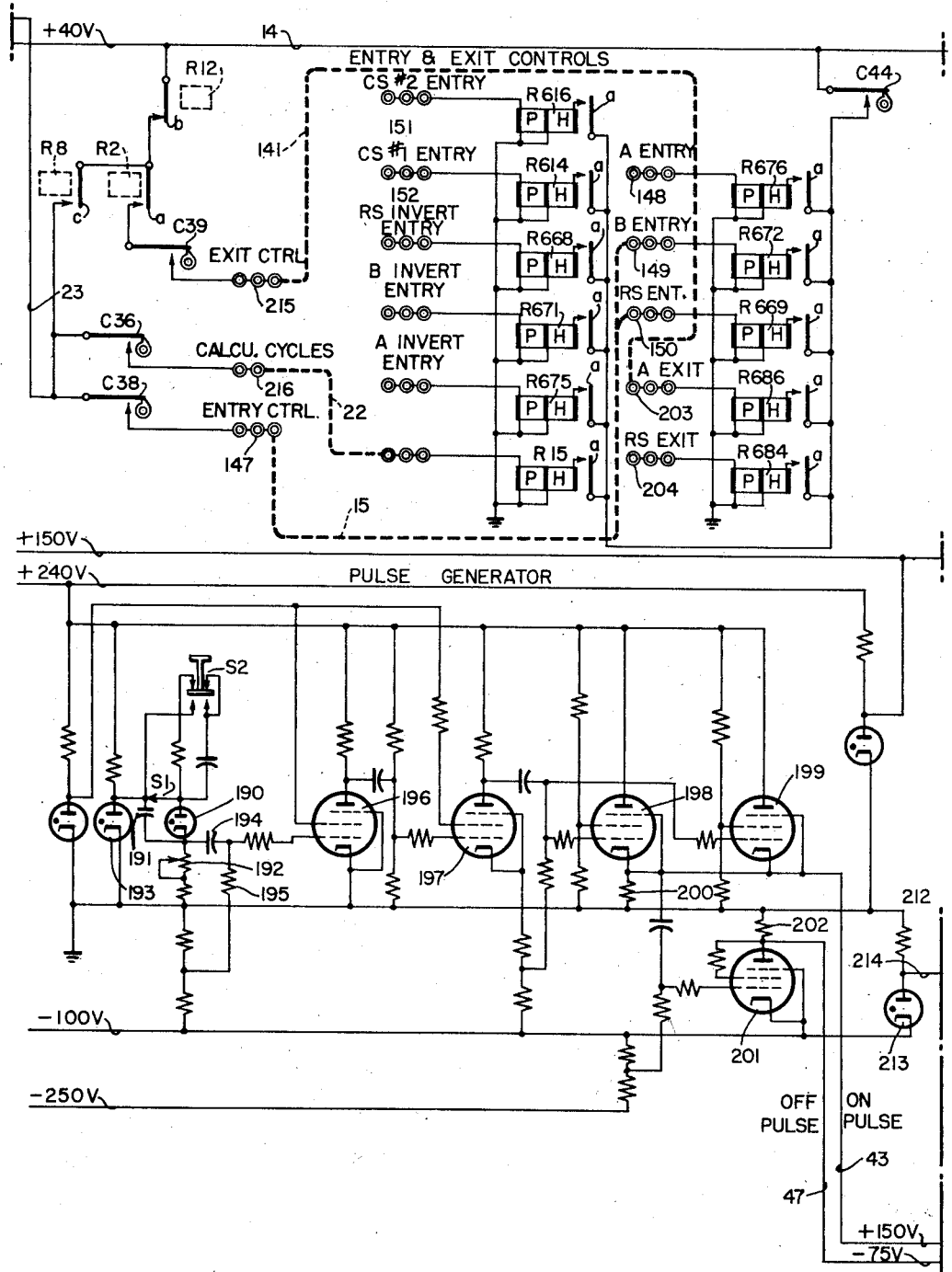
Figure 1G:
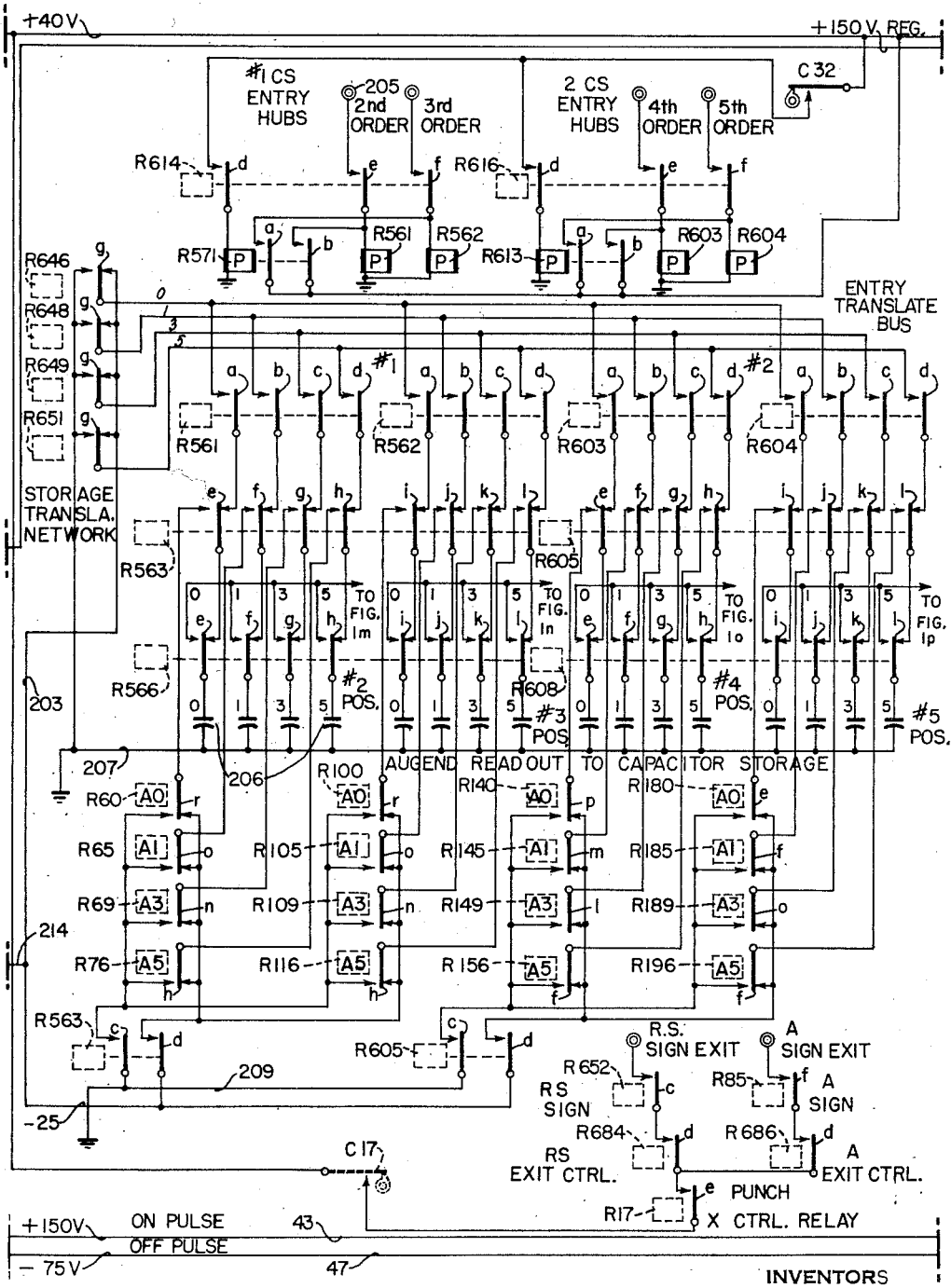
Figure 1H:
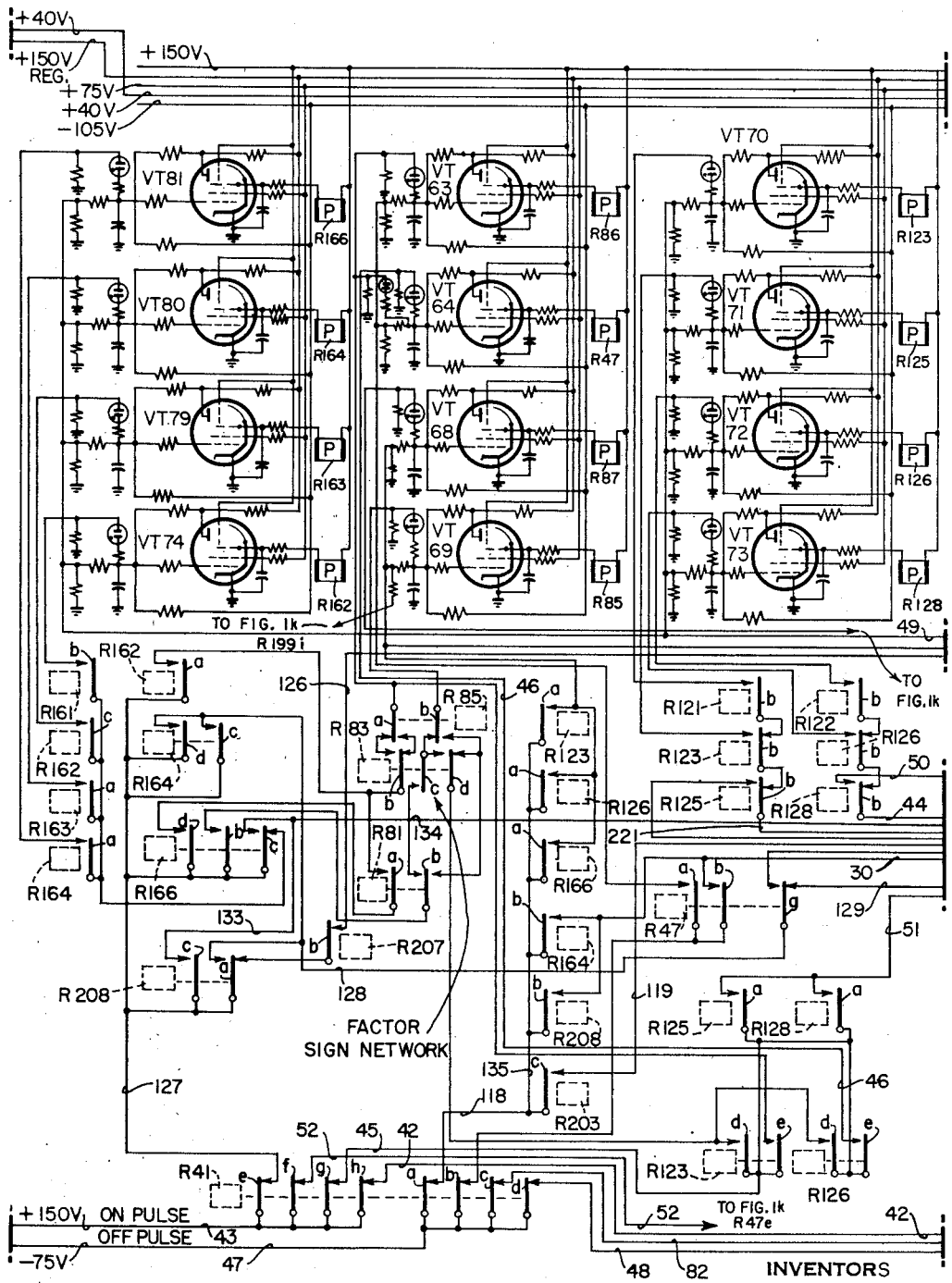
Figure 1I:
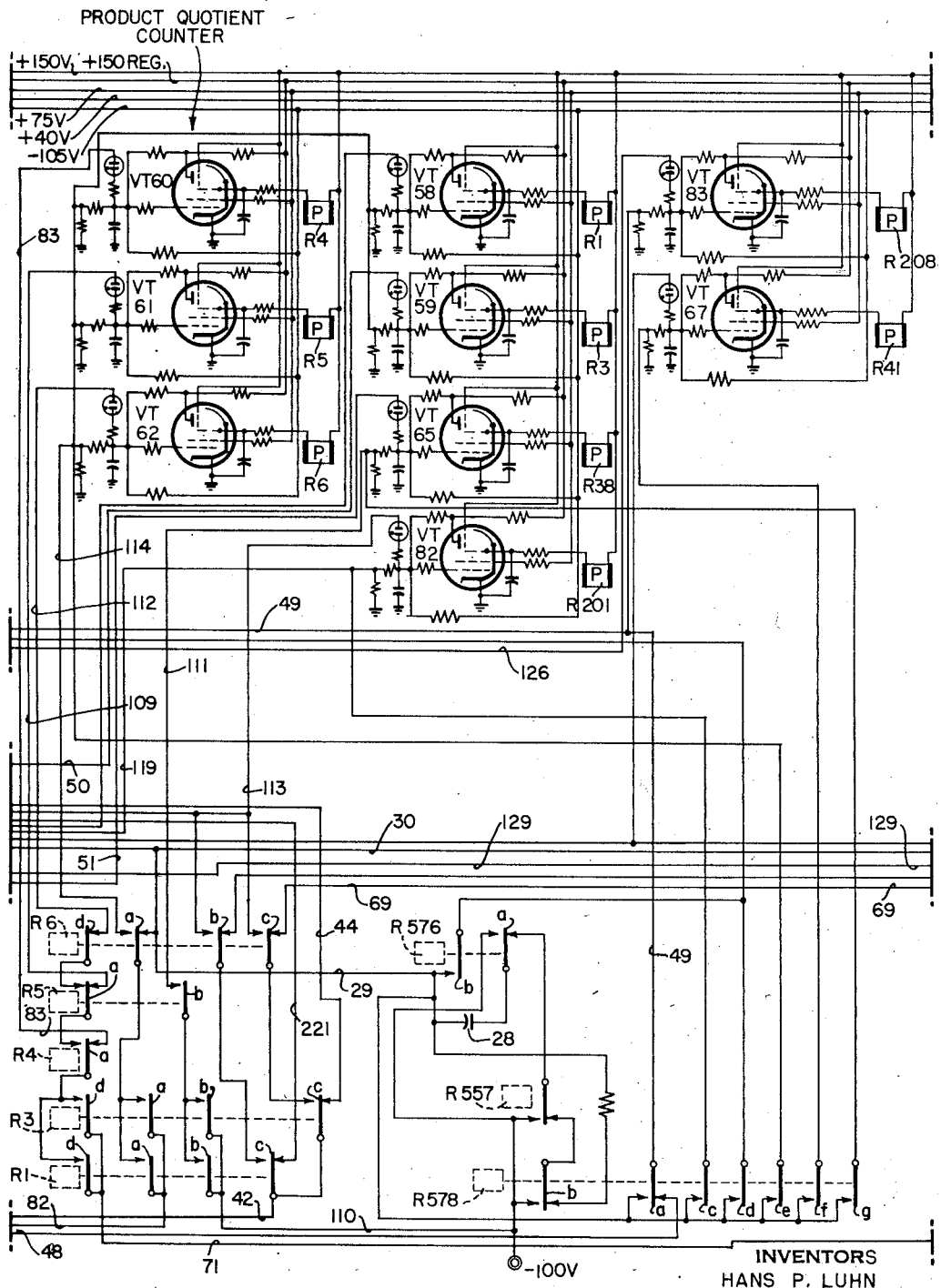

The control relays for a multiplication operation are R122 and R168 (Fig. 1e), R126 and R128 (Fig. 1h), and R3 (Fig. 1i). The function of these relays is to set up circuits to control the calculator for a multiplication operation.

The relays R122 and R168 are energized by the same program step. The energization of the relay R122 closes a circuit and enables a positive "On" pulse to be applied from the pulse generator (Fig. 1f) to the control grid of the tube VT72 (Fig. 1h) rendering VT72 conductive which, in turn, causes the relay R126 (Fig. 1h) to be energized. The energization of relay R168 closes the contacts R168b (Fig. 1b) thereby enabling a circuit to be established for energizing the addend relay R13 (Fig. 1b) when the cam control contacts C9 (Fig. 1b) close. The relay R13 in an energized state represents a "1" being entered in the highest order of the addend. This relay is held energized continuously by the cam control contacts C12 and C15 (Fig. 1b) until the calculations required have been completed. The timing of the contacts C12 and C15 is shown in the timing diagram of Fig. 2.

The relay R122 which is held by relay R126 drops out when R126 becomes energized.

With R126 now energized, a positive "On" pulse will be respectively applied through the contacts R126e (Fig. 1h) to render the tube VT64 (Fig. 1h) conductive and contacts R126b (Fig. 1h) to render the tube VT73 conductive. Upon being made conductive the tubes VT64 and VT73 will respectively energize the invert relay R47 and the relay R128. At the same time the "On" pulse will be applied through the contacts R126d (Fig. 1h) over the factor sign network consisting of the contacts of relays R85, R83 and R81. If either of the relays R85 or R81 (Fig. 1h) is in an energized state the circuit will be completed therethrough to cause the tube VT69 (Fig. 1h) to be made conductive and the relay R85 energized.

There is also applied by the pulse generator with each "On" pulse, a simultaneous negative "Off" pulse. Thus an "Off" pulse is applied over contacts R126a (Fig. 1h) to the control grid of the tubes VT68 and VT69. If the tube VT69 does not receive a simultaneous "On" pulse through the factor sign network then the tube VT69 will either be made non-conductive or continued in a nonconductive state, whichever the case may be. If VT69 does receive a simultaneous "On" pulse then the tube VT69 will either be made conductive or retained in such a state, as the case may be.

This negative "Off" pulse is also applied to the tube VT72 to render this tube non-conductive causing the relay R126 to be de-energized. It is possible to sneak through an "On" pulse over the various circuits containing contacts associated with the relay R126 before the shifting of these contacts, due to the simultaneous "Off" pulse causing R126 to be de-energized, because the time for breaking normally closed contacts is about two milliseconds while the duration of the positive "On" pulse is at the most one millisecond.

With the relays R47 and R128 now energized, an "On" pulse will read out the augend readout circuits of the first three orders thereby resetting the multiplier to complement form, as well as causing the energization of the shift relay R38 (Fig. 1i) and the relay R3 (Fig. 1i). The simultaneous "Off" pulse will be applied to the augend tubes causing those tubes not receiving an "On" pulse at this time to be made non-conductive. Likewise this simultaneous "Off" pulse will de-energize the relays R47 and R128.

The energization of the relay R3 actually starts the calculation inasmuch as it enables subsequent "On" pulses to be applied to the even comparison circuit.

The control relays for a divisional problem are relays R121 and R167 (Fig. 1e), R123 and R125 (Fig. 1h), and R1 (Fig. 1*i*). The manner of operating these relays is similar to that described with reference to the multiplication control relays. The relays R121 and R167 will be picked up by a program step. The energization of R121 will enable a circuit to be established for applying an "On" pulse to the tube VT70 (Fig. 1*h*) causing this tube to be made conductive and resulting in the energization of the associated relay R123. The energization of R167 will enable the addend relay R173 to be energized thereby entering a "1" in the lowest order of the addend. Then with relay R123 energized, the factor sign network will be read out, the invert relays R47 and R86 (Fig. 1*h*) will be energized, and the relay R125 (Fig. 1*h*) will be energized. Then with the invert relays R47 and R86 energized, an "On" pulse will read out the augend readout circuits for all orders thereby resetting the dividend to complement form. While the relay R125 is energized, circuits will be established for applying the positive "On" pulse to the tubes VT65 and VT58 respectively causing the energization of the shift relay R38 and the relay R1 (Fig. 1*i*). The energization of R1 now enables subsequent "On" pulses to be applied to the comparison circuit (Fig. 1*j*) which actually starts the calculations. The energizing of relay R1 also closes the count circuit to the product-quotient counter.

Comparison circuit

Figure 1J:
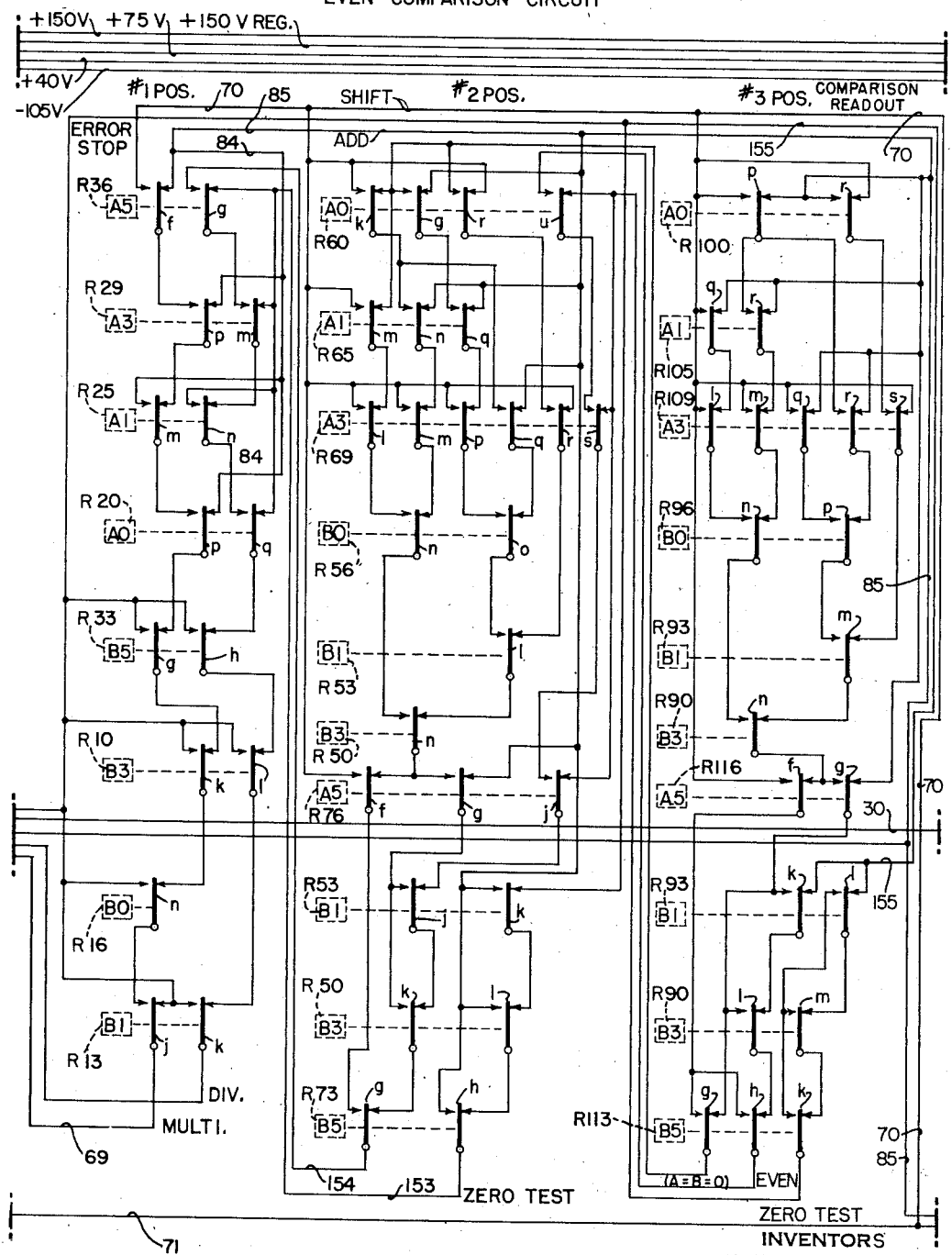

As alluded to previously when the relay R3 (Fig. 1*i*) becomes energized, in a multiplication operation, or the relay R1 (Fig. 1*i*) becomes energized, in a division operation, the "On" pulses are applied to the comparison circuit (Fig. 1*j*).

The function of the comparison circuit is to compare the factors registered in the augend and addend for the purpose of controlling multiplication or division operations. The circuit is arranged to compare the true value registered in the addend with the value registered in complementary form in the augend in order to determine if the latter value is equal to, smaller than or larger than the former value. If the results of the comparison indicate that the augend is either equal to or greater than the addend, then the "On" pulse will be emitted from the comparison circuit as an adding pulse. If the comparison of the two values indicates that the addend is greater than the augend, then the "On" pulse will be applied in the form of a shift pulse to the column shift readout circuits.

The comparison starts with the highest order and continues through the second order to the third order. The comparison however will take place in only those orders required to determine the necessary conditions.

In multiplication, the multiplier is registered in the augend in complement form and reduced by repeated subtraction of the digit 1 entered in the first order of the addend. Inasmuch as the augend will be compared with the addend having the digit 1 fixed in the first order, the comparison position for the first order is only effective in a multiplication operation. The comparison does not go beyond the first order for a multiplication problem.

In multiplication successive "On" pulses are applied through a circuit made by the energizing of the relay R3 over the conductor 69 (Fig. 1*j*) to the input side of the first comparison position. Inasmuch as in a multiplication problem R13 must be in an energized state at this time, the comparison circuit is so wired that if the contacts R13*j* (Fig. 1*j*) are in the normal position as shown the "On" pulse will be applied to the tube VT67 (Fig. 1*i*). Upon receiving this pulse the tube VT67 will be rendered conducting causing the error relay R41 (Fig. 1*i*) to be energized resulting in the contacts R41*a* to R41*h*, inclusive, (Fig. 1*h*) being open. Opening these contacts stops the feeding of the "On" and "Off" pulses to the various circuits. It is also pointed out that the relay R41 will also be energized when any other addend relay in the first order, besides R13, is energized.

Now assuming that the relay R13 is energized, the left-hand electrical path for the first order of the comparison circuit is so designed that a circuit will be completed therethrough to the line 85 whenever the augend is equal to or greater than the addend, and to the line 70 whenever the augend is less than the addend.

Inasmuch as the value 9 is represented in codified form by the digits 5, 3 and 0, and since the value 9 is the only value which if entered in the augend would make the augend less than the addend, the circuit is so designed for those values, such as 3, 6 and 8, not represented in code by the digit 0, and for those values, such as 1, 2, 5 and 7, represented in code partially by the digit 1, no further sampling is necessary after the respective contacts R20*p* and R25*m* and the "On" pulses are applied directly to the conductor 85 through the conductor 84. For the value 4, which contains two of the digits common to the code representation of the value 9, namely 0 and 3, the "On" pulse is applied through the complete circuit before it is determined whether it should be applied to the conductor 85 or conductor 70.

In case of a problem in division, the "On" pulse is applied to the strap of contacts R13*k*. In this operation the right-hand electrical path of the first comparison position is used in conjunction with the second and third positions for comparison purposes. Inasmuch as no value is entered in the first order of the addend in a divisional problem, the circuit is so designed that if any of the first order addend relays R13, R16, R10 and R33 (Fig. 1*j*) are energized, the "On" pulse will be applied to the tube VT67 (Fig. 1*i*) resulting in the energization of the error relay R41. The right-hand circuit is also designed so that through the augend portion of the first order the "On" pulse will be applied to conductor 153 (Fig. 1*j*) if the augend is greater than the addend in the first order, and to conductor 154 if the augend is equal to the addend.

Since the pulse on conductor 153 indicates that the augend is greater than the addend, it will be applied to the remaining comparison positions in order to determine whether or not the divisor is zero. If the divisor is zero in the second comparing position then the pulse will be applied to conductor 155 for the purpose of energizing the error relay R41. If a value is detected in the second comparing position of the divisor then the pulse will be applied to conductor 85 as an adding pulse.

The pulse appearing on conductor 154 indicates that the values entered in the first order of the augend and addend are equal and that further comparison is necessary to determine the relative magnitude of the factor standing in the augend and addend. The pulse is then applied to the second comparing positions. If a value is detected in the second position then the pulse will be fed into the conductor 85 as an adding pulse. If the divisor is zero in the second position then the pulse is applied to the third comparing position. Also if the relative magnitude is still undetermined at the second comparison position it is applied to the third position where the final answer is supplied as to whether the augend is equal to, less than, or greater than the addend. In the third position if a value is detected in the divisor the pulse will then be emitted as an adding pulse. If the divisor is zero then the pulse will be applied from the output side of the third comparing position over conductor 155 to the error relay R41.

Summarizing, the "On" pulses are continuously applied to the comparison circuit for the purpose of controlling subsequent multiplication or divisional operations. If the comparison indicates that the augend is either equal to or greater than the addend then the "On" pulse will be emitted from the comparison circuit as an adding pulse. The adding pulse will be applied over conductor 85 to read out the adding circuit for each order of the augend. If the comparison indicates that the augend is less than the addend, then the "On" pulse will be emitted as a shift pulse. The shift pulse will be applied over conductor 70 through the augend readout circuit for each order of the augend for the purpose of shifting each respective order to the next higher order. The shift pulse will also be applied to the product-quotient counter over conductor 71 (Fig. 1j) for the purpose of registering each shifting operation.

Adding circuit

The adding circuit for each order of the augend includes contacts of the augend and addend relays constructed and arranged as a biquinary circuit with instantaneous carry.

In a biquinary system, the decimal values as registered in codified form in the corresponding augend and addend relays are each in effect replaced by a combination of two digits. One of the digits is expressed as a binary digit having the values of 0 and 5 while the other of the digits is expressed as a quinary digit having the values 0, 1, 2, 3 and 4.

For the biquinary addition of the augend and addend values entered in a particular order, the two quinary digits and the two binary digits are added independently. When the quinary sum is greater than four, a plus 5 is carried into the binary circuits. When the binary sum is ten, a plus 1 is carried into the quinary circuit of the adjacent higher position.

The adding circuits for the first to the fifth order, inclusive, are shown respectively in Figures 1k, 1m, 1n, 1o and 1p, and each circuit includes a binary add circuit, binary carry circuit, quinary add circuit, quinary extend circuit, and a quinary carry circuit. The adding pulse from the comparison circuit (Fig. 1j) is applied over conductor 85 to the input side of the quinary carry circuit for each order to cause the instantaneous reading out of the binary and quinary carry circuits. For example, in the third order of the augend (Fig. 1n), the adding pulse is applied over conductor 85, conductor 88 to the contacts strap of the contacts R109k which is the input for the adding circuit. From this position the pulse is applied directly over conductor 99 to read out the binary carry circuit and also through the quinary carry circuit to either the binary add or carry circuits depending upon the position of the contacts forming the quinary carry circuit.

The quinary carry circuit includes a network of contacts controlled by the corresponding augend code relays A0, A1 and A3 and the addend relays B0, B1 and B3. This network is so arranged as to have a no-carry and carry outputs coupled to the binary add and the binary carry circuits. A circuit will be completed through the quinary carry circuit to the carry output whenever a sum greater than four is detected. Whenever a sum is less than four, a complete circuit will be established through the quinary carry circuit to the no-carry output terminal. In Fig. 1n, conductor 156 is representative of the quinary no-carry output while conductor 157 is representative of the quinary carry output.

The binary add and the binary carry circuits are separate networks including intercoupled contacts associated with the A5 and B5 code relays. The binary carry network is so arranged as to read out a no-carry signal if the binary sum is zero and a carry signal if the sum is ten. Referring to Fig. 1n, the adding pulse will be applied over conductor 99 to the binary carry circuit. The no-carry and the carry signals are applied to the adding circuit of the next higher order over the respective conductors 100 and 158. If the binary sum is five, the binary carry circuit will extend the quinary carry or no-carry as a binary carry or no-carry into the adjacent higher position. This is shown in Fig. 1n, for example, where the quinary carry output 157 is coupled to the contacts R113d of the binary carry circuit while the quinary no-carry output 156 is connected to contacts R113f of the binary carry circuit.

There is also a quinary extend circuit which forms an integral part of the adding circuit for each order. This circuit is effective when the quinary sum in a particular order is equal to 4 to extend the binary carry or no-carry from the adjacent lower position. For example, when the binary no-carry signal from the third order (Fig. 1n) is applied over conductor 100 to the strap of the contacts of R50g (Fig. 1m) constituting one of the inputs of the quinary extend circuit of the second order, the right-hand portion of the quinary extend network leading from the contacts R50g to R69j is instrumental in applying this no-carry signal signal to the next higher order, the first, as well as enabling the binary adding circuit to be read out under certain conditions. For example, assume that a no-carry signal is being applied from the third order over conductor 100 to the contacts R50g, and that the relays R50, R56 and R76 respectively representative of the values 3 and 0 entered in the addend, and 5 entered in the augend are energized. This signal upon being applied to the contacts R50g will pass through the quinary extend circuit to conductor 104. From conductor 104 two circuits will be established. One circuit will be traceable through contacts R73f as shown, and R76e shifted of the binary carry circuit to produce a no-carry signal on conductor 101. The second circuit will be completed through the contacts R73c as shown and the shifted contacts R76c to cause the value 5 to be registered in the second order of the augend. The no-carry signal from the third order of the augend will also be applied over conductor 100 to the contacts R50e (Fig. 1m) to enable this circuit to be read out whenever 4 is entered in this order. The binary carry signal from the third order of the augend will be applied over conductor 158 (Fig. 1n) to the strap of the contacts R50f (Fig. 1m), constituting the other input of the quinary extend circuit of the second order. The left-hand set of contacts of the quinary extend circuit having the contacts R50f as the input and R69i as the output will be instrumental in reading out a 5 value through the binary adding circuit whenever this left-hand portion of the network has the value 4 entered therein. Like the no-carry signal from the third order, the carry signal will also be applied over conductor 158 to contacts R50d constituting one of the inputs of the quinary add circuit. This carry signal will read out the quinary add circuit increased by one.

The quinary add circuit which also forms an integral part of the adding circuit for each order includes a maze of contacts controlled by the augend code relays A0, A1 and A3 and the addend code relays B0, B1 and B3. These contacts are so arranged in the network to read out the sum direct upon receiving a no-carry signal from the adjacent lower position, and to read out the sum increased by one upon the application of a carry signal from the adjacent lower position whenever the quinary value entered therein is not greater than 3. For example, in Fig. 1n, the no-carry signal from the fourth order (Fig. 1o) will be applied over conductor 96 to contacts R90e (Fig. 1n) of the third order, while the carry signal from the fourth order will be applied over conductor 210 to contacts R90d of the third order.

The output of the quinary adding circuit is reconverted to the code representation 0, 1, 3 and 5 by providing multiple tube inputs and connecting the quinary values accordingly. For example, in Fig. 1n, the quinary value 4 is connected to individual inputs of the tubes VT9 and VT11 respectively representing the values 0 and 3, while the quinary value 2 is connected to individual inputs of the tubes VT9 and VT10 respectively representing the values 0 and 1.

It is also to be noted that the binary value 5 will be read out of the binary add circuit and be applied directly to the tube VT12 representative of the value 5 in the coding arrangement 0, 1, 3 and 5.

Augend readout circuit

As mentioned previously, whenever the comparison circuit indicates that the augend is less than the addend, a shift pulse is emitted from the comparison circuit. This shift pulse besides being applied over conductor 70 (Fig. 1j) and 71 to the product-quotient counter (Fig. 1i) is also applied over conductor 71 to the augend readout circuit for each order. The shift pulse is applied to each order over conductor 71 (Fig. 1j to Fig. 1k), conductor 53, contacts R79D and R79C normally closed, conductor 54 to the readout circuit for each order of the augend.

The augend readout circuit is a network of contacts controlled by the corresponding augend relays for each order. The network is arranged to enable the value standing in one order to be shifted or transferred to the next higher order upon the application of a shift pulse to the respective network whenever the shift relay R38 (Fig. 1i) is energized. The network is also arranged such that whenever the invert relays R47 and R56 (Fig. 1h) are energized, the complement of the value standing in the network will be read out upon the application of an "On" pulse thereto. The network is also adaptable whenever the appropriate gate relays are energized for transferring a value from one order of a factor receiving device to the corresponding order of another factor receiving device.

An example of the operation of augend readout circuit for shifting a value, such as 1, as represented by the code relay R65 (Fig. 1m) being energized, from the second order to the first order will now be given. The shift pulse from conductor 54 will be applied over conductors 159, 62 and 59 (Fig. 1m) to the augend readout circuit for the second order. The electrical circuit from conductor 159 will be open due to contact R65b being open. The circuit traced over conductor 59, closed contacts R47i, conductors 80 and 77 (Fig. 1m to Fig. 1k) will lead to an open circuit at contacts R36b. The only completed circuit will be that traced over conductor 62, contacts R47k as shown, R65d shifted, R79j as shown, conductor 72, line 73 (Fig. 1m to Fig. 1k), now closed shift relay contacts R38f, conductor 74 to the control grid of tube VT2. The application of the shift pulse to VT2 will render this tube conductive causing the energization of relay R25 which is representative of the value 1.

An example will now be given of the manner in which the augend readout circuit enables the complement of a value entered in a particular order of the augend to be read out.

At the proper time, an "On" pulse will be applied over conductor 43 (Fig. 1h), normally closed contacts R41f, conductor 52 (Fig. 1h to Fig. 1k), invert relay contacts R47e now closed, conductor 53, contacts R79D and R79C, to the conductor 54. From conductor 54 this "On" pulse will be applied to the augend readout circuit for each order. Now assuming in the augend readout circuit for the second order that the relays R76, R65 and R69 (Fig. 1m), respectively representative of the values 5, 3 and 0 are energized, the "On" pulse will be applied from conductor 54 over conductors 159, 62 and 59 (Fig. 1m) to the augend readout circuit for the second order. The circuit traced from conductor 59 will be established through the shifted invert relay contacts R47i (Fig. 1m) but will encounter an open circuit at the shifted contacts R76b. The circuit traced from conductor 62 will be established through contacts R47k shifted, R69d shifted, R65e as shown but will encounter an open circuit at contacts R69d. The only complete circuit traceable through the augend readout circuit for the second order is from conductor 159. This circuit may be traced from conductor 159 as follows: contacts R60c shifted, R79i and R38i as shown, to the control grid of the tube VT5. Since VT5 will be in an energized condition it will be retained in such a condition by the "On" pulse fed through the augend readout circuit. With VT5 energized, it follows that the relay R60 is also energized where relay R60 is representative of the value 0 which is the complement of the value 9 as expressed in code by the values 5, 3 and 0. It is to be understood that the relays R76 and R69 representative of the values 5 and 3 will be deenergized due to the application of a negative "Off" pulse to the corresponding control tubes VT8 and VT7 simultaneous with the feeding of the "On" pulse to the tube VT5.

The readout circuit for each order is also effective in enabling a value entered in one of the storage devices to be transferred to one of the other storage devices with the exception that any amount entered in the capacitor storage can only be transferred to the augend. The various gate relays which are rendered operative by a program step are shown in Fig. 1e. Relays R199 and R79 when energized respectively control the transferring of data into and out of the augend. Relays R244 and R241 when energized respectively control the transferring of data into and out of the addend. Relays R653 and R659 when energized respectively control the transferring of amounts into and out of the relay storage device. The relays R563 and R566 when energized respectively control the transferring of amounts into and out of the capacitor storage #1 unit. The relays R605 and R608 control similar operations for the capacitor storage #2 unit.

To make the transferring operation more readily understood, a specific operation of transferring the value 1, as represented by R637 (Fig. 1a) in an energized state, from the second order of the relay storage device to the corresponding order of the augend will now be described. The initial step in enabling this transferring operation to be brought about is to operate the relay storage out gate relay R659 (Fig. 1e) and the augend in gate relay R199 (Fig. 1e) by the same program step. It is to be noted that at the time relay R199 is energized, the relay R576 (Fig. 1e) also is energized. Relay R576 upon being energized enables a negative pulse to be applied through contacts R576a (Fig. 11) to the augend control tubes for the purpose of clearing the augend. Now with the gate relays R659 and R199 in an energized condition, a circuit will be completed through the cam controlled contacts C8 (Fig. 1a) make for transferring the amount standing in the second order of the relay storage unit into the corresponding order of the augend. It is to be pointed out that the cam controlled contacts C8 in Fig. 1a are represented in dash line form in order to eliminate the extending of connecting lines throughout the various figures from the cam controlled contacts C8 represented in solid line form in Fig. 1e. This form of representation applies to all other instances where the cam controlled contacts are shown in dash line form. This circuit is traceable from the conductor 14 (Fig. 1a) coupled to the positive side of the 40-volt power source as follows: conductor 32 (Fig. 1a), cam controlled contacts C8 now closed, contacts R659c now closed, conductor 160, contacts R637b now closed, R659j now closed, hub 33 plugged to hub 34 (Fig. 1m) of corresponding order of augend, contacts R199k to the control grid of the tube VT6. The tube VT6 becomes conductive causing the relay R65, representative of the value 1, to be energized thereby completing the transfer. It is to be pointed out that the hubs 33 and 34 are used in the drawings mainly to reduce the number of connecting lines running across the figures. It is to be noted that in actual operation a five-line transfer bus which includes a sign transfer line would be used in place of a plugging operation.

Tube controlled augend relays

In each order of the augend there are four augend relays respectively corresponding to the values 5, 3, 1 and 0. Each of the augend relays is controlled by a corresponding vacuum tube or electron discharge device similar to that described and claimed in U. S. Patent No. 2,293,177, issued August 18, 1942.

Figure 1K:
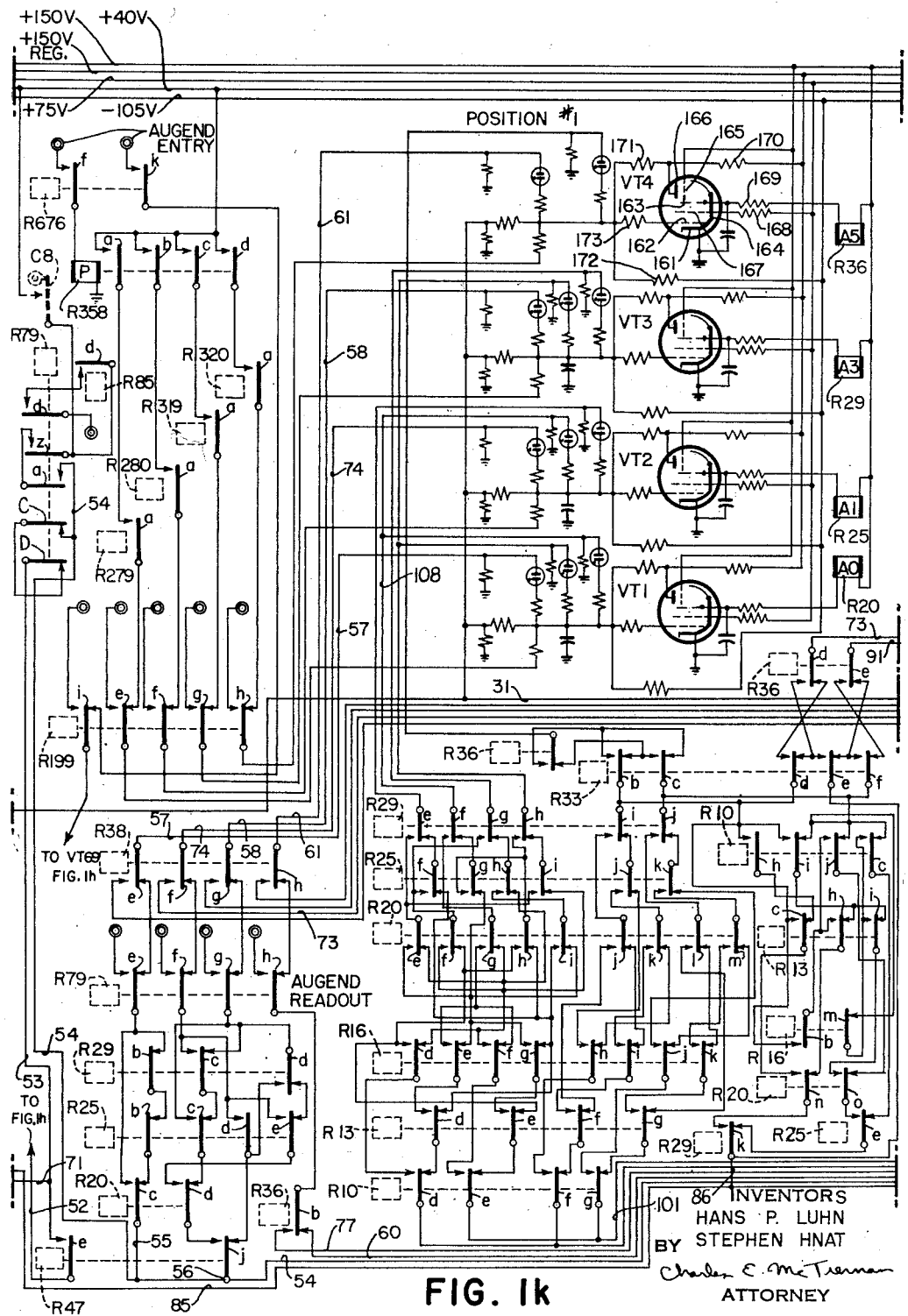

Inasmuch as each tube and relay arrangement for each order is substantially similar, a description will be given only of the circuit connections of the tube VT4 (Fig. 1k) and its associated relay R36 (Fig. 1k). The vacuum tube or electron discharge device VT4 comprises a cathode 161, an input control grid 162, a screen grid 167, a primary anode 163, a deflector electrode 164, a secondary collector grid 165, and a secondary emitting anode 166. The cathode 161 and deflector 164 are coupled to ground while the anode 163 and cathode 161 are capacitively coupled by a .01 microfarad capacitor in order to reduce the inductive kick caused by the relay dropping out. The screen grid 167 is connected through the 240 ohm resistor 168 to the high side of a regulated 75-volt power supply. The primary anode 163, which is provided with a small aperture through which electrons emitted by the cathode pass through, is coupled through 400 ohm resistor 169 to the relay R36 which, in turn, is also coupled to the positive side of the 150-volt power source.

The electrons which pass through the slot in the anode 163 are directed toward the deflector 164. The deflector 164 causes the electrons that pass out through the aperture to pass through the collector grid 165 and to impinge on the secondary electron emitting anode 166. The collector grid 165 is connected directly to the positive 150-volt power source because it is desired to keep the collector more positive than the secondary anode at all times.

The resistors 170, 171 and 172 (Fig. 1k) are connected in series between the regulated 150 voltage and −105 voltage supply sources. The .51 megohm resistor R170 produces a suitable positive voltage for the secondary anode 166, the .39 megohm resistor 171 couples the anode 166 with the control grid 162, and the .33 megohm resistor 172 provides a suitable cut-off bias for the control grid 162. The control grid 162 is coupled to the junction of the resistors 171 and 172 by the .01 megohm resistor 173 which limits the grid current. These connections of resistors establish normal voltages of plus 50 volts at the anode 166, and minus 25 volts at the control grid 162. The positive anode voltage is needed to insure the stability of the secondary anode at the start of tube conduction while the grid bias keeps the tube effectually cut off.

Now when a positive "On" pulse is applied to the normally biased control grid 162, the tube will be rendered conductive thereby causing the secondary anode voltage to become highly positive. Due to the feedback circuit from the secondary anode 166 to the control grid 162 through the resistor 171, the tube is retained in a conducting condition until a negative "Off" pulse is applied to the control grid 162. When the tube VT4 is made conducting the relay R36, representative of the value 5, will be energized and held in this position until VT4 is made non-conductive. It is to be noted that every relay control tube, such as VT4, receives from the pulse generator a negative "Off" pulse every pulse cycle. The positive "On" pulses are fed into the calculator relay network that determines which augend tubes will receive any given positive pulse. The positive and negative pulses reach their destinations at the same time. Any control grid receiving simultaneous negative and positive pulses will react to a single resultant positive pulse inasmuch as the greater positive pulse completely overrides the negative pulse. In the absence of a positive "On" pulse, the negative "Off" pulse cuts off a conducting tube, or keeps at cut-off a non-conducting tube.

There are four different types of inputs to the control grid resistors which are used to feed the several voltages that energize or de-energize the augend relays by starting or stopping current flow in the corresponding augend tubes. These four inputs are as follows:

1. *Direct connection.*—This type of connection is used for applying the capacitor storage output over normally open relay points so that only during storage readout time these connections are in the circuit. For example, when reading out a 1 value stored in the #1 capacitor storage device the contacts R566f (Fig. 1g) will be shifted, thereby enabling this value to be applied directly to the control grid of VT6 (Fig. 1m) of the second order of the augend.

2. *Resistor and relay connection.*—This type of connection is used when reading direct from the card into the augend, or when transferring an amount stored either in the adjacent lower order of the augend, or in another factor receiving device. For example, a direct entry value or a transfer value will be applied to the control grid of the tube VT6 (Fig. 1m) through the .1 megohm resistor 182.

3. *Direct resistor coupling.*—This type of connection is used for applying the negative "Off" pulse to the control grid of the augend control tubes. For example, in Fig. 1m the negative "Off" pulse will be applied from the conductors 31 and 211 through the .33 megohm resistor 189 to the control grid of the tube VT6.

4. *Glow tube connection.*—This type of connection is used for the application of pulses greater than 100 volts, usually the "On" pulses. The pulses are applied to the control grid of a tube, such as VT6 (Fig. 1m) for example, through the neon glow tubes 183, 184 and 185 (Fig. 1m), each of which has a corresponding current limiting .024 megohm resistor 186, 187 and 188 in series with it. The high voltage pulse ionizes the glow tube to which it is applied, drops some of its voltage across the glow tube and the corresponding resistor, and causes the control grid to go positive. The glow tubes 183 and 184 enable the output pulses from the quinary add circuit to be applied to the control grid of the tube VT6 while the neon tube 185 enables the output pulse in the augend readout circuit to be applied to the control grid of VT6.

*Pulse generator*

The pulse generator (Fig. 1f) develops the positive "On" and negative "Off" pulses that operate the relay control tubes which, in turn, causes the operation of their associated relays. The glow tube 190, which is shunted by the capacitor 191 and connected between the positive side of 150-volt power source and the variable resistor 192 to ground, acts as a relaxation oscillator. The variable resistor 192 controls the pulse repetition rate inasmuch as the capacitor 191 is of a fixed value and the anode voltage is regulated by the glow tube 193. With the switch S1 in a closed position the oscillator runs continuously at a frequency of 180 pulses per second as determined by the setting of the control resistor 192. The oscillator output pulses are differentiated by .005 microfarad capacitor 194 of the .1 megohm resistor 195 to become positive pips about one millisecond wide and 30 volts in amplitude. These positive pulses are then applied through two stages of amplification as represented by the electron discharge devices 196 and 197 to produce pulses about one millisecond wide and of a magnitude of 180 volts. The pulses are then in turn applied to the parallel connected beam power tubes 198 and 199 having a common cathode .051 megohm resistor 200 coupled to ground. The pulses developed across this cathode resistor 200 are the positive "On" pulses of the pulse generator which are applied to the various tube control relays over the conductor 43 (Fig. 1f). The pulses developed across cathode resistor 200 are also used to drive a beam power inverter 201 whose plate resistor 202 is connected to ground and whose cathode is coupled to the −100 volts conductor. The pulses which are developed across this plate resistor 202 are the negative "Off" pulses which are periodically applied to the relay control tubes over the conductor 47 (Fig. 1f). These pulses are the negative 75-volt output pulses of the generator. Thus the output of the pulse generator consists of a series of positive and negative pulses which are developed simultaneously at the rate of 180 pulses per second and which have the same width of one millisecond. It is to be noted also that the resistor 212 and tube 213 in parallel with the resistor 202 and tube 201 develops across the plate resistor 212 a negative 25-volt pulse which is applied over conductor 214 to the capacitor storage device (Fig. 1g).

*Readout operation*

After the last program step has been carried out and with the calculations completed with the results standing in the augend, a readout operation will take place in conjunction with the sensing of the next following card.

The readout operation is initiated after the termination of a calculating cycle with the making at 14.1 index time of the cam controlled contacts C39 (Fig. 1f) which upon being plugged to either the augend exit hub 203 or the relay storage exit hub 204 will cause the energization of the corresponding augend and relay storage readout control relays R696 and R684 (Fig. 1f). A hold circuit for these relays will be established through their a contacts by the cam controlled contacts C44 (Fig. 1f).

Assuming the readout operation will take place from the augend, for example, the contacts R686c (Fig. 1d) will close with the energization of the relay R686. The closing of the contacts R686c will then enable the translating cams C45, C47, C48 and C49 to cause the energization of the readout translating relays R683, R682, R681 and R360 either singly or in combination in a manner as previously described in order to enable the coded values to be converted to decimal representation for readout purposes.

At each card cycle point from 0 to 9, the equivalent value is registered in code by the translating relays thereby enabling the quinary readout circuits, which are wired over the contacts associated with the translating relays R681, R682 and R683 respectively representative of the values 0, 1 and 3, to provide a sequence of pulses from 0 to 4 card cycle time and repeat the sequence from 5 to 9 cycle time when the cam controlled contacts C17 (Fig. 1d) make. The contacts R681b, R682b, and R682c and R682d form the quinary readout circuit for the augend while the contacts R681a, R682a, and R683a and R683b form the quinary readout circuit for the relay storage device.

The quinary readout circuit controlled by the translating relays is coupled to the quinary inputs of the augend and relay storage readout circuits such that each card cycle point from 0 to 4 a readout pulse is fed to the corresponding input value. During the 5 to 9 cycle time, the translating relay R360 is energized thereby enabling the contacts associated therewith to complete the augend or relay storage readout circuit for the proper sequence of quinary pulses at this time.

While the hubs for the second, third and fourth orders of the augend readout circuit (Fig. 1d) are shown as plugged to the respective punch magnets PM2, PM3 and PM4, it is to be noted that this is only representative of the uses to which the readout pulse may be applied.

*Capacitor storage*

In situations which call for an additional factor receiving device, the capacitor storage unit shown in Fig. 1g may be employed.

The capacitor storage device includes four storage positions which are controlled as two separate units. The #1 storage unit comprises two separate orders having their in and out circuits connected permanently to the second and third augend orders. The #2 storage unit also comprises two separate orders having their in and out circuits connected permanently to the fourth and fifth augend orders. Inasmuch as all the orders of the capacitor storage are identical, only the second order of the #1 storage unit shall be described in detail.

As in the case of the other factor receiving devices, entry into the capacitor storage is made possible by plugging the entry control hub 147 (Fig. 1f) to the capacitor storage entry hub 152 for the #1 unit and by plugging the hub 205 to a card reading brush. The former plug connection will cause the entry control relay R614 (Fig. 1f) to be energized when the cam controlled contacts C38 (Fig. 1f) make at 12.5 index point time. After the relay R614 is energized and with the cam controlled contacts C32 (Fig. 1g) now in a closed position, a circuit will be established for energizing the capacitor storage clear relay R571 (Fig. 1g) through the now closed contacts R614d. The energizing of the clear relay R571 will in turn cause the energization of the entry relays R561 and R562 (Fig. 1g) through a circuit established through the respective contacts R571a and R571b. The energization of the entry relays at this time, 12.5 index time, will cause the shifting of the associated contacts, such as R561a to R561d (Fig. 1g), for example. The shifting of these contacts will establish a circuit through the translating relay contacts R646g, R648g, R649g and R651g for clearing the capacitors 206 by connecting the capacitors to the —25 voltage source. The circuit for clearing one of the capacitors is traceable as follows: grounded conductor 207, capacitor 206 representative of the value 1, contacts R566f and R563f as shown, R561b shifted, R648g as shown, conductor which is coupled to a —25 voltage source as supplied by the pulse generator. This is the manner in which the capacitor storage device will be cleared before the actual reading time.

Now assume that at 1 index time the value 1 has been detected which will result in the energization of the entry relay R561 (Fig. 1g) and the translating relay R648 in a manner similar to that previously described. The energization of these two relays will then accordingly establish a circuit for charging the capacitor 206 representative of the value 1.

The values entered in the capacitor storage units #1 and #2 are transferred to the augend when the respective gate relays R566 and R608 (Fig. 1e) are energized by a program step. The energizing of either of these two relays causes the associated contacts R566e to R566L (Fig. 1g) and R608e to R608L to be shifted thereby enabling the value stored in the capacitor storage device to be transferred to the corresponding order of the augend.

For transferring values from the augend into the capacitor storage units #1 and #2 it is necessary that the respective gate relays R563 and R605 (Fig. 1e) be made effective by means of a program step.

With the energization of the relay R563, for example, a circuit will be established for transferring the augend value to the corresponding order of the capacitor storage in which the capacitor representative of the value stored will be charged. Assuming a 1 in the second order of the augend is being transferred, the circuit is traceable from the grounded conductor 209 (Fig. 1g) as follows: contacts R563c, R650 and R563f all shifted, R566f as shown, and the capacitor 206 representative of the value 1.

*Mathematical theory of operation*

Prior to describing the physical operation of the calculator in detail with respect to a particular problem, the mathematical theory of operation relating to a multiplication problem will be described with reference to Fig. 3a. The problem involved is 69×83 which will produce the product 5727. It is to be noted in Fig. 3a that each step necessary to produce the final result is identified in the left-hand side.

In the first step the tens and units digits of the multiplier will be entered respectively in the second and third orders of the relay storage factor receiving device. At the same time the tens and units digits of the multiplicand will be entered respectively in the fourth and fifth orders of the addend factor receiving device. During the second step the amount entered in the relay storage device will be transferred to the corresponding orders of the augend.

Now pursuant to principles employed in the calculator forming the basis of the present invention, it is necessary that the factor standing in the augend be inverted, and that a 1 be entered in the highest order of the addend. This operation as represented by the third step is necessary inasmuch as the multiplication process is accomplished by repeated addition or accumulation of the multiplicand into the product simultaneously with the reduction of the multiplier to 0, digit by digit by the repeated subtraction of 1 from the multiplier digit. This latter operation controls the product accumulation in that for each multiplier digit the multiplicand is added as many times as 1 can be subtracted from the multiplier digit.

The controlling operation is actually effected by a comparison circuit in which, in a multiplication operation for example, the highest order of the augend is compared with the corresponding order of the addend to determine the relative magnitude of these values. If the results of the comparison indicate that the augend is either equal to or greater than the addend then the adding operation will be effected. On the other hand, if the results of the comparison indicate that the augend is less than the addend then each value standing in the augend will be shifted to the next higher order.

In Fig. 3a the fourth step indicates that in comparing the 9 value, which is the complement of the value 0, standing in the highest order of the augend, with the 1 value standing in the corresponding order of the addend, the augend is less than the addend thereby calling for the shifting of the augend. In the fifth step the results of the comparison indicate that the augend is equal to the addend, thereby calling for the values entered in the corresponding orders of the augend and the addend to be added.

In steps 6 to 12 inclusive, the multiplier digit is gradually reduced to 0 as represented by the 9 value standing in the highest order of the augend at the twelfth step. In each of these steps the augend and the addend will be added to produce the partial product 552 standing respectively in the third, fourth and fifth orders of the augend.

Since the tens digit of the multiplier has now been reduced to zero, the results of the comparison during the thirteenth step will indicate that the augend is less than the addend, thereby calling for the shifting of each of the values standing in the augend to the next higher order.

In the next three steps, 14, 15 and 16, the units digit of the multiplier is reduced to 0 as in the case of the tens digit of the multiplier. Likewise, during these three steps the multiplicand will be added to the multiplier. While the product is standing in orders 2 to 5 respectively of the augend, at the sixteenth step, it is necessary in the actual operation of the calculator that another comparison between the augend and the addend be made. Thus during step 17, inasmuch as the comparison indicates that the augend is less than the addend, no further computation is necessary. This final step in which the augend is less than the addend differs from steps 4 and 13 inasmuch as the augend value amount is not shifted. Thus it becomes apparent in a multiplication problem involving a pair of two digit numbers that the final product will be registered in the augend after the comparison circuit indicates for the third time that the augend is less than the addend.

The detailed operation of the circuits will now be described with reference to a problem in multiplication and to one in division.

(1) Multiplication of 83 by 69—result 5727.

In seeking the solution to this problem it is necessary that certain operating conditions be assumed. For example, let it be assumed that the two factors will be entered in the relay storage and addend storage units; that the tens and units digits of the factor 83 will be applied respectively to orders 2 and 3 of the relay storage unit; that the tens and units digits of the factor 69 will be applied respectively to the addend storage unit; that at the appropriate time the value standing in the relay storage unit will be transferred to the augend storage unit; that prior to readout time, the last digit will be rounded; and that the rounded total will be read out of the augend.

Thus proceeding under the aforementioned assumptions, the following connections must be made. The connections are as follows: brushes 10 and 11 (Fig. 1a) to the respective orders 2 and 3 (Fig. 1a) of the relay storage unit; brushes 12 and 13 (Fig. 1a) to the respective orders 4 and 5 (Fig. 1c) of the addend storage units; entry control hub 147 (Fig. 1f) to "B" (addend) entry hub 149 and the "RS" (relay storage) entry hub 150; exit control hub 215 (Fig. 1f) to "A" (augend) exit hub 203; augend readout hubs for orders 2, 3 and 4 (Fig. 1d) to the respective punch magnets PM2, PM3 and PM4; "calcu. cycles" hub 216 (Fig. 1f) to relay R15; program start hubs 217 to 218 (Fig. 1e); program step hubs PS1 (Fig. 1e) to the respective hubs "A In" and "RS Out"; program step hub PS2 (Fig. 1e) to hub "MP"; program step hub PS3 (Fig. 1e) to hub "½ ADJ"; program step hubs PS4 (Fig. 1e) to the respective hubs "Feed Start" and "Program Clear"; hub "½" (Fig. 1c) to hub "5"; and relay storage readout hubs 33 and 219 (Fig. 1a) to the respective augend read-in hubs 34 (Fig. 1m) and 220 (Fig. 1n).

Now let it be sufficient to state at this time that the circuit arrangement will be in condition for a reading cycle. As to how such an operating condition is brought about will be made clearer subsequently.

The relay storage and addend storage units for the respective orders thereof will be initially conditioned for an entry operation when the cam controlled contacts C38 (Fig. 1f) make at 12.5 index time as shown in the timing diagram of Fig. 2. The closing of contacts C38 establishes a circuit from the line 14 coupled to the positive side of a 40 volt power source, contacts R12b normally closed, contacts R8c closed when the card being fed depresses a card lever (not shown) in a manner well understood, contacts C38 now closed, hub 147, plug line 15, hubs 149 and 150, respective pick-up coil of the relays R669 and R672 (Fig. 1f) in parallel and then to ground thereby causing the relays R669 and R672 to be energized. A hold circuit for these relays will be set up through the respective a contacts as long as the cam controlled contacts C44 (Fig. 1f) are in a closed position such as shown in the timing diagram of Fig. 2. The energization of these relays R669 and R672 results in the shifting of the associated contacts.

If either of the factors 83 or 69 were a negative value such would be indicated by an "X" perforation in the column of the higher order digit such as shown, for example, in the record card of Fig. 1a. Upon sensing such a perforation for the factor 83, a circuit would be established from line 14 (Fig. 1a), cam controlled contacts C16 which make for each index point position as shown in the timing diagram of Fig. 2, common brush 16, roll 17, "X" perforation, brush 10, column split contacts (not shown) as well understood, sign hub of the relay storage unit, closed contacts R669e, contacts R653d as shown, pick-up coil of relay R652 and then to ground, whereby relay R652 is energized. A hold circuit for this relay is set up by contacts R652a through the alternate making and breaking of the cam controlled contacts C11 and C14 (Fig. 1a).

If the factor 69 was a negative value, a similar circuit would be set up through the brush 12 (Fig. 1a) and the sign hub (Fig. 1b) for the addend storage unit to cause the energization of the relay R83 (Fig. 1b). The relay R83 would be held through contacts R83a by the alternate making and breaking of the cam controlled contacts C12 and C15 (Fig. 1b).

With the record card being fed in the usual manner, the brush 11 at "3" index time will sense the units digit of the factor 83. At the same time the cam controlled contacts C48 (Fig. 1d) will be in a closed position thereby establishing a circuit from the line 14 (Fig. 1d), contacts R672b now closed, line 18, contacts C48 now closed, corresponding line 19, contacts R668c as shown, translator relay R649 (Fig. 1d) and then to ground. With the relay R649 in an energized condition at the time the "3" value is sensed, a circuit will be established converting the decimal representation sensed in the record card to the coding arrangement 0, 1, 3 and 5. This circuit may be traced as follows: from line 14 (Fig. 1a), cam controlled contacts C16 now closed, brush 16, roll 17, brush 11, plug connection to the third order of the relay storage unit, contacts R669h now closed, contacts R649d now closed, contacts R653o as shown, pick-up coil of relay R634 (Fig. 1a) and then to ground. A hold circuit shall be set up for this relay through contacts R634a through alternate making and breaking of the cam controlled contacts C11 and C14 (Fig. 1a). The timing diagram of Fig. 4a shows the relays R649 and R634 energized at "3" index time.

At "6" index time the tens digit of the factor 69 will be sensed and then entered in the fifth order of the addend storage unit (Fig. 1c) pursuant to the code arrangement 0, 1, 3 and 5. At "6" index time the addend translating relays R249 and R289 will be energized through a circuit which may be traced from the line 14 (Fig. 1d), closed contacts R669b, line 18, respective cam controlled contacts C47 and C49, corresponding lines 20 and 21, the respective contacts R671b and R671d as shown, the associated relays R249 and R289 and to ground. Upon sensing the "6" value in the record card, a circuit will be completed which may be traced as follows: line 14 (Fig. 1a), cam controlled contacts C16 now closed, brush 16, roll 17, brush 12, plug connection to the fourth order of the addend storage unit (Fig. 1c), contacts R672i now closed, parallel circuit arrangement including contacts R249e now closed, contacts R244r as shown, pick-up coil of the relay R133 and then to ground, and contacts R289e now closed, R244t as shown, pick-up coil of the relay R153 and then to ground. A hold circuit for these relays will be established through the alternate making and breaking of the cam controlled contacts C12 and C15. With the relays R153 and R133 now energized, the sensed decimal value 6 has now been entered in the fourth order of the addend pursuant to the 0, 1, 3 and 5 coding arrangement. The timing diagram of Fig. 4a shows these relays energized simultaneous with the energization of the corresponding translating relays R249 and R289.

As shown in the timing diagram of Fig. 4b, the relay R15 (Fig. 1f) will be energized when the cam controlled contacts C36 make at 7.2 index time. The energizing of relay R15 represents a preliminary step for suppressing card feeding and for commencing calculations. This circuit may be traced as follows: from line 14 (Fig. 1f), closed contacts R12b, now closed contacts R8c, cam controlled contacts C36 now closed, calculating cycles hub 216, plug line 22, pick-up coil of relay R15 and then to ground. A hold circuit for this relay will be established through the contacts R15a by the cam controlled contacts C44.

At "8" index time the tens digit of the factor 83 will be sensed and the translating relays R649 and R651 (Fig. 1d) will be energized. The circuit established for energizing these relays is as follows: from line 14 (Fig. 1d), contacts R669b now closed, cam controlled contacts C48 and C49 now closed, the corresponding lines 19 and 21, the associated contacts R668c and R668d as shown, relays R649 and R651 and then to ground. With the translating relays R649 and R651 in an energized condition at the time that the "8" value is sensed, a circuit will be completed as now understood for converting this decimal representation into the code representation 0, 1, 3 and 5 as represented by the relays R639 and R638 (Fig. 1a) being energized. A hold circuit will be established for these relays through their respective a contacts through the alternate making and breaking of contacts C11 and C14.

In a like manner the units digit of the factor 69 at "9" index time will be entered in the fifth order of the addend storage unit and shall be converted to the new coding arrangement with the ultimate result being that the relays R170, R176 and R193 (Fig. 1c) will be energized. A hold circuit for these relays will be set up by their respective a contacts through the alternate making and breaking of contacts C12 and C15.

With all the values entered in the card now being sensed and stored in the respective receiving units the feeding of the sensed card will be suppressed and the programing operation designed to produce the final result will commence. The suppression of the feeding of the record card will be initiated through the making of the cam controlled contacts C37 (Fig. 1e) at 9.4 index time as shown in the timing diagram of Fig. 2. An obvious circuit will be established for energizing the pick-up coil of the relay R11 (Fig. 1e) at 9.4 index time as shown in the timing diagram of Fig. 4b. A double overlapping hold circuit for relay R11 will be established by the cam controlled contacts C40 and C43 (Fig. 1e). The hold circuit established by the cam controlled contacts C40, which close at "9" index time as shown in the timing diagram of Fig. 2, is completed through the contacts R11a. The hold circuit completed by the making of the cam controlled contacts C43, which close at 7.3 index time, is established during the time that the hold circuit set up by C40 is ineffective. This hold circuit is traceable from C43, normally closed contacts R9a (Fig. 1e), the now closed contacts R11a to the hold coil of the relay R11. With the relay R11 in an energized condition when the cam controlled contacts C41 (Fig. 1e) make, another obvious circuit will be established through the now closed contacts R11b for energizing the relay R12. A continuous hold circuit will be established for the relay R12 by means of either the cam controlled contacts C40 establishing a circuit to the hold coil of the relay R12 through the contacts R12a, or by means of the cam controlled contacts C43 establishing a circuit through the contacts R9a and the contacts R12a.

With the energization of the relay R11 the normally closed contacts R11e (Fig. 1e) are open thereby preventing the pulse clutch magnet PCM from being energized whenever the cam controlled contacts C29 close. Thus the feeding of the record card will be suppressed as long as the relay R11 is jointly held up by the cam controlled contacts C40 and C43. As shall be seen subsequently, the relay R11 will be de-energized when the calculations are completed thereby enabling the feeding of the record card to be continued. The relay R12 is held in an energized state along with the relay R11 by the cam controlled contacts C40 and C43 for the purpose of retaining in an open position the contacts R12b (Fig. 1f), thus preventing unwanted circuits from being completed due to the subsequent making of the cam controlled contacts C36 and C37.

The program operation will commence with the making of cam controlled contact C37 (Fig. 1e) at 9.4 index time, such as shown in the timing diagram of Fig. 2. With C37 in a closed position a circuit will be established for energizing the relay R621 which may be traced as follows: from line 14 (Fig. 1f) contacts R12b normally closed, card lever contacts R8c now closed, line 23 (Fig. 1f to Fig. 1e), contacts C37 now closed, contacts PR15c now closed, hub 217 plugged to hub 218, pick-up coil of the relay R621, and then to ground.

When the cam controlled contacts C10 (Fig. 1e) make at 9.4 index time as shown in the timing diagram of Fig. 2, a series-parallel circuit arrangement will be established which will set up a hold circuit for the relay R621 and energize the relays R199, R659 and R576 (Fig. 1e) all of which are representative of the first program step to be carried out. The energization of the relays R199 and R659 will cause the factor stored in the second and third order of the relay storage unit to be transferred to the corresponding orders of the augend. The energization of the relay R576 will, as shall be seen, result in a negative pulse being applied to the accumulator tubes of the augend for the purpose of clearing them of any values which may be stored therein.

The circuit is traceable as follows: line 14 (Fig. 1e), conductor 24, cam controlled contacts C10 now closed, line 25, normally closed contacts R618a, parallel circuit arrangement of the shifted contacts R621a, hold coil of relay R621 and then to ground, and the now shifted contacts R621c and R621d, corresponding hubs PS1, respective plug connections 26 and 27, pick-up coil of the associated relays R659, R199 and R576 and then to ground. A hold circuit for relays R659 and R199 is established through the respective contacts R659a and R199a when the cam controlled contacts C13 make.

The energization of the relay R576 enables a circuit to be established for applying a negative pulse from the −100 volt terminal (Fig. 1i) to the control grid of each of the accumulator tubes of the augend. This circuit is traceable as follows: −100 volt terminal (Fig. 1i), contacts R576a now closed, capacitor 28, line 29, conductor 30 (Fig. 1i to Fig. 1k) to the control grid of the tube VT1, VT2, VT3 and VT4 (Fig. 1k) of the first order of the augend, and line 31 (Fig. 1k to Fig. 1p) to the control grid of the tubes associated with the remaining orders of the augend. It is to be noted that no hold circuit is supplied for the relay R576.

The timing diagram of Fig. 4d shows the duration during which the relays R621, R659, R199 and R576 remain energized.

At the time the cam controlled contacts C13 are establishing a hold circuit for the relays R199 and R659, the cam controlled contacts C8 make, thereby enabling two separate circuits to be established. The first of these circuits will cause the actual transfer of the data entered in the relay storage unit to the corresponding orders of the augend while the second circuit will condition the programming circuit arrangement for the next following program step.

The first circuit will enable the value stored in the second and third orders of the relay storage unit to be transferred to the corresponding order for the augend. The circuit established for transferring the data entered in the second order of the relay storage unit is as follows: line 14 (Fig. 1a), line 32, now closed contacts C8, contacts R659c now closed, parallel circuit of contacts R638b and R639b now closed, respective contacts R659k and R659z now closed, corresponding ones of the hubs 33 plugged to hubs 34 (Fig. 1m), corresponding contacts R199m and R199n now closed, conductors 35 and 36, control grid of the tubes VT7 and VT8, plate electrode of the tubes VT7 and VT8, to the respective augend relays R69 and R76. As pointed out previously, the application of a positive pulse to each of the tubes VT7 and VT8 causes the tubes to be ignited resulting in the associated relays R69 and R76 respectively representative of the values 3 and 5 being energized and held thereby.

The circuit established for transferring the data entered in the third order of the relay storage unit is similar to that as just described for the second order. With regard to this transferring operation, it is believed sufficient to state that as a result of this transferring operation the augend relay R109 representative of the value 3 will be energized, thus signifying that the units digit of the factor 83 is now entered in the third order of the augend.

The second circuit established when contacts C8 make is traceable as follows: line 14 (Fig. 1e), conductor 24, contacts C8 now closed, conductor 37, contacts R659b now closed, conductor 38, pick-up coil of program count relay R622 and then to ground, thereby causing the relay R622 to be energized.

After the relay R622 is picked up and at "13" index time, the cam controlled contacts C41 (Fig. 1e) make, as shown in the timing diagram of Fig. 2, causing an obvious circuit to be established through the now closed contacts R11b to energize the pick-up coil of the relay R12. A hold circuit is established for R12 by the cam controlled contacts C40 and C43. By energizing relay R12, the contacts R12b (Fig. 1f) are opened thereby rendering the cam controlled contacts C36 (Fig. 1f) and C37 (Fig. 1e) ineffective until the calculations are completed. Fig. 4d shows the extent of time during which relay R12 is energized.

A hold circuit will be established for the relay R622 (Fig. 1e) when the cam controlled contacts C10 make after the "13" index time, as shown in the timing diagram of Fig. 2. Likewise, when the cam controlled contacts C10 make a circuit will be established for energizing the program counter pilot relay R601 (Fig. 1e). The circuit established to carry out these two operations when the contacts C10 make is traceable as follows: from line 14 (Fig. 1e), conductor 24, contacts C10 now closed, conductor 25, normally closed contacts R618a, the parallel circuit arrangement of contacts R622a shifted, hold coil of R622 and then to ground, and contacts R622b now closed, contacts R600b as shown, pick-up coil of the relay R601 and then to ground.

With the energizing of the relay R622 (Fig. 1e) the programming circuit arrangement is now conditioned for the initiation of the second program step which occurs when the cam controlled contacts C7 (Fig. 1e) make. The circuit established when contacts C7 make is as follows: line 14 (Fig. 1e), conductor 24, contacts C7 now closed, conductor 40, contacts R618b normally closed, contacts R622c now closed, contacts R600e as shown, hub PS2, plug connection 41 hub MP, pick-up coil of the parallel relays R122 and R168 and then to ground. A hold circuit will be set up for the relay R168 by the cam controlled contacts C13 through contacts R168a now closed. A hold circuit will be set up for the relay R122 through the contacts R122a now closed and the normally closed contacts R126c (Fig. 1e). With the energization of the relay R122 (Fig. 1e) the contacts R122b (Fig. 1h) are closed thereby completing a circuit for enabling a positive "on" pulse to be fed from the pulse generator (Fig. 1f) to the relay R126 (Fig. 1h) causing the energization of the same. This circuit may be traced from the pulse generator (Fig. 1f) as follows: conductor 43 (Figs. 1f, 1g and 1h) contacts R41h, as shown, line 42 (Fig. 1h to Fig. 1i), contacts R3c as shown, line 44, (Fig. 1i to Fig. 1h), contacts R128b as shown, contacts R126b as shown, contacts R122b shifted, the control grid of the tube VT72, plate electrode of VT72, to the relay R126 (Fig. 1h).

With the energization of the relay R126, the relays R47 and R128 (Fig. 1h) are energized by the next following "On" pulse while the relay R122 is dropped due to the contacts R126c now being in an open position. The circuit established from energizing the relay R47 may be traced from the pulse generator (Fig. 1f) as follows: line 43 (Figs. 1f, 1g and 1h), contacts R41g as shown, line 45, contacts R126e now closed, line 46, control grid of the tube VT64, the plate electrode of VT64 and then to the relay R47. The completion of the circuit to the tube VT64 causes the same to be ignited in the manner similar to that as previously described thereby resulting in the energization of the relay R47. The circuit established for energizing the relay R128 is as follows: line 43 (Fig. 1h), contacts R41h, conductor 42 (Figs. 1h to 1i), contacts R3c as shown, conductor 44 (Figs. 1i to 1h), contacts R128b as shown, contacts R126b shifted to the control grid of the tube VT73, the plate electrode of tube VT73 and then to the relay R128. Simultaneously with the "On" pulse which causes the energization of the relays R47 and R128, an "Off" pulse is applied from the pulse generator to the tube VT72 for the purpose of de-energizing the relay R126. This circuit may be traced as follows: line 47 (Fig. 1h), contacts R41d as shown, line 48 (Figs. 1h to 1i) contacts R578a as shown, line 49 (Figs. 1i to 1h), to the control grid of the tube VT72 thereby rendering the same non-conducting and causing the relay R126 to be returned to a de-energized state.

It is to be noted that with the energization of the relay R122 (Fig. 1e) the "On" and "Off" output pulses of the pulse generator become effective. Likewise, it is to be noted that the first "On" pulse causes the energization of the relay R126 (Fig. 1h), that the second "On" pulse is applied through a circuit including contacts associated with relay R126 prior to the relay R126 being de-energized by the corresponding "Off" pulse to cause the energization of the invert relay R47 (Fig. 1h) and the relay R128 (Fig. 1h). The third "On" pulse will be instrumental in causing the enrgization of the shift relay R38 (Fig 1i), the multiplication control relay R3 (Fig. 1i), and the inverting of the factor entered in the augend. The circuit completed for feeding the "On" pulse to the multiplication control relay R3 may be traced as follows: line 43 (Fig. 1h), contacts R41h as shown, line 42 (Figs. 1h to 1i), contacts R3c as shown, line 44 (Fig. 1i to Fig. to Fig. 1h), R128b shifted, conductor 50 (Figs. 1h to 1i), to the control grid of the tube VT59, the plate electrode of VT59 and then to the relay R3. The feeding of the "On" pulse to the tube VT59 renders the tube conductive, resulting in the relay R3 being energized. The completed circuit for applying the positive "On" pulse to the shift relay R38 (Fig. 1i) is as follows: line 43 (Fig. 1h), contacts R41g as shown, conductor 45, contacts R128a now closed, line 51 (Figs. 1h to 1i), the control grid of the tube VT65, the plate electrode thereof, and then to the relay R38.

The third "On" pulse will also be instrumental in investing the data entered in the first three orders of the augend. The circuit established for energizing the relays R20, R29 and R36 of the first order of the augend, and representative of the complement value originally entered in this order, is traceable as follows: line 43 (Fig. 1h), contacts R41f as shown, conductor 52 (Fig. 1h to Fig. 1k), contacts R47e now closed, conductor 53, contacts R79C and R79D normally closed, conductor 54, three parallel circuit arrangements, the first of which includes conductor 55, contacts R20c, R25b, R29b, R79e and R38e all as shown, conductor 57, to the control grid of the tube VT1, the plate electrode of VT1, and then to the relay R20. The second circuit being conductor 56 (Fig. 1k), contacts R47j shifted, R20d, R25c, R29c, R79g and R38g all as shown, line 58. to the control grid of the tube VT3, plate electrode of VT3, and the relay R29. The third circuit being line 54 (Fig. 1k to Fig. 1m), conductor 59, contacts R47i shifted, line 60 (Fig. 1m to Fig. 1k), contacts R36b, R79h and R38h all as shown, conductor 61, to the control grid of the tube VT4, plate electrode of VT4, and then to the relay R36.

The value "8" as repersented in the second order of the augend by the energized relays R76 and R69 will be inverted and its complement represented therein in the form of the energized relay R65. The circuit established for energizing the relay R65 may be traced as follows: line 54 (Fig. 1m), conductor 62, contacts R47k shifted, R60d and R65c as shown, R69c shifted, R79j as shown, R38j as shown, line 63, control grid of the tube VT6, plate electrode thereof, and then to the relay R65.

In the third order of the augend the value "3" as repersented by the relay R109 in an energized state, will be inverted and its complement as represented by the relays R105 and R116 in an energized state will be entered therein. The circuit established for energizing the relay R105 may be traced as follows: line 54 (Fig. 1m), conductor 59, contacts R47i shifted, conductor 60 (Fig. 1m to Fig. 1n), contacts R116b, R79p and R38p, all as shown, line 66, to the control grid of the tube VT12, the plate electrode of the tube VT12, and the relay R116. At the time the third "On" pulse is applied to the accumulator tubes of the augend a simultaneous "Off" pulse is applied to all of the accumulator tubes of the augend. Only those tubes which receive an "Off" pulse will be rendered non-conductive. In the cases where the "Off" pulse is applied to the control grid of the accumulator tube coincident with the application of the "On" pulse thereto, the "On" pulse will predominate and render the particular tube concerned conductive. The circuit established for applying the "Off" pulse to the accumulator tubes may be traced as follows: line 47 (Fig. 1h), contacts R41b as shown, contacts R47b, line 30 (Fig. 1h to Fig. 1k), line 31, to which each of the control grids of the accumulator tubes are coupled.

At "D" index time the cam controlled contacts C13 make, thereby establishing a hold circuit for the relay R601 and an energizing circuit for the relay R600 (Fig. 1e). This circuit may be traced as follows: line 14 (Fig. 1e), conductor 24, contacts C13 now closed, conductors 67 and 68, contacts R619a as shown, conductor 122, parallel circuit arrangement of contacts R601a, the hold coil of R601 and then to ground, and contacts R601b, the pick-up coil of the relay R600 and then to ground. The relays R600 and R601 will be continually held by the alternate making of the cam controlled contacts C10 and C13 until the last program step is carried out as shown in the timing diagram of Fig. 4d.

Also at "D" index time, a circuit will be established when cam controlled contacts C9 (Fig. 1b) make causing the digit one, as represented by the relay R13 (Fig. 1b) in an energized state, to be entered in the highest order of the addend. The circuit established when the cam controlled contacts C9 (Fig. 1b) make is as follows: line 14 (Fig. 1b), cam controlled contacts C9 now closed, contacts R168b now closed, pick-up coil of relay R13 and then to ground. As in the case of the other addend relays, a hold circuit for the relay R13 is established through the contacts R13a by the joint action of the cam controlled contacts C12 and C15.

With the data now entered in the augend in a complementary fashion, the fourth "On" pulse will be applied to the comparison circuit (Fig. 1j) where the factor entered in the respective orders of the addend is compared with the inverted factor entered in the corresponding orders of the augend. In a multiplication problem the highest order of the augend is compared with the corresponding order of the addend in order to determine if the augend is equal to, less than, or greater than the addend. If the results of the comparison show that the augend is less than the addend then the value entered in each order of the augend will be shifted to the next higher order. If the results of the comparison show that the augend is equal to or greater than the addend then the adding circuits associated with each order of the augend will be read out with the total being entered in the augend relays. The circuit established when the fourth "On" pulse is applied from the pulse generator to the comparison circuit may be traced as follows: line 43 (Fig. 1h), contacts R41h as shown, line 42 (Fig. 1h to Fig. 1i), contacts R3c shifted, contacts R6c as shown, line 69 (Fig. 1i to Fig. 1j), contacts R13j shifted, R16n, R10k and R33g all as shown, R20p shifted, R25m as shown, R29p and R36f shifted, to conductor 70. The circuit being completed through the first position of the comparison circuit to conductor 70 indicates that the addend is greater than the augend. Thus since the comparison circuit of the first order shows that the addend value is greater than the augend value, the fourth "On" pulse will be fed from the first order of the comparison circuit as a shift pulse.

This shift pulse will be applied over conductors 70 and 71 (Fig. 1j to Fig. 1k), conductor 53, contacts R79D and R79C, line 54, to the input side of the augend readout circuits for each order thereof. The shift pulse will be applied to conductors 55, 56 (Fig. 1k) and 59 (Fig. 1m) for the purpose of reading out the augend readout circuit of the first order, but an open circuit will prevail inasmuch as the shift relay contacts R38e, R38f, R38g and R38h (Fig. 1k) will all be in a shifted position. The shift pulse will be applied to the readout circuit of the second order of the augend through conductors 54 and 62, such that the circuit will be established for shifting the value entered in the second order of the augend to the next higher order, namely, the first order. This circuit may be traced as follows: line 54 (Fig. 1m), conductor 62, contacts 47k as shown, R65d shifted, R79j as shown, conductors 72 and 73 (Fig. 1m to Fig. 1k), shift relay contacts R38f transferred, conductor 74, the control grid of the tube VT2, the plate electrode of VT2, to the relay R25. In the third order the shift pulse will be fed through line 54 (Fig. 1n), conductor 64, contacts R47d as shown, contacts R105d shifted, contacts R79n as shown, conductors 75 and 76 (Fig. 1n to Fig. 1m), contacts R38j shifted, line 63, to the control grid of the tube VT6, the plate electrode of VT6 and the relay R65. The third order will also be read out through a parallel circuit which may be traced as follows: line 54 (Fig. 1m), conductor 59 (Fig. 1m), contacts R47i as shown, conductors 80 and 77 (Fig. 1m to Fig. 1n), contacts R116b shifted, R79p as shown, line 78, conductor 79 (Fig. 1n to Fig. 1m), contacts R38y, line 81, to the control grid of VT8, the plate electrode of VT8 and the relay R76.

Simultaneous with the fourth "On" pulse, the fourth "Off" pulse is applied to the accumulator tubes rendering those tubes not receiving a coincident "On" and "Off" pulse non-conductive. The circuit for applying this "Off" pulse to the accumulator tubes is as follows: conductor 47 (Fig. 1h), contacts R41c, conductor 82 (Fig. 1h to Fig. 1i), contacts R3a shifted, contacts R6a as shown, to the line 30 which is coupled to the control grid of each of the accumulator tubes in a manner such as previously described. It has been seen that after passing through the comparison circuit the fourth "On" pulse is emitted as a shift pulse. Since the multiplication problem is terminated after the third shift pulse, it is necessary that each shift pulse be applied to the product-quotient counter arrangement (Fig. 1i). Therefore the first shift pulse is applied through a circuit which energizes the relay R4, thereby registering a first shift pulse. This circuit is as follows: line 70 (Fig. 1j), line 71 (Fig. 1j to Fig. 1i), contacts R3d shifted, contacts R4a as shown, conductor 83, the control grid of the tube VT60, the plate electrode of VT60, and the relay R4. Thus after the fourth "On" pulse there is registered in the first and second orders of the augend factor 16, the tens digit being represented by the relay R25 in an energized state while the units digit is represented by the relays R65 and R76 in an energized state.

The fifth "On" pulse is applied to the comparison circuit and inasmuch as the value entered in the highest order of the augend relays is greater than the value entered in the corresponding order of the addend relays, the fifth "On" pulse is emitted from the comparison circuit as an adding pulse which is applied to the adding circuit associated with each order of the augend.

The circuit established for applying the fifth "On" pulse to the comparison circuit is as follows: line 43 (Fig. 1h), contacts 41h normally closed, line 42 (Fig. 1h to Fig. 1i), contacts R3c shifted, contacts R6c as shown, conductor 69 (Fig. 1i to Fig. 1j), contacts R13j shifted, contacts R16n, R10k, R33g, and R20p all as shown, and conductor 84 to the output side of the comparison circuit for the first order.

As a result of the comparison and by means of the conductor 84, the fifth "On" pulse is applied simultaneously through conductor 85 as an adding pulse to the corresponding adding circuit for each of the accumulating positions or orders.

Figure 1M:
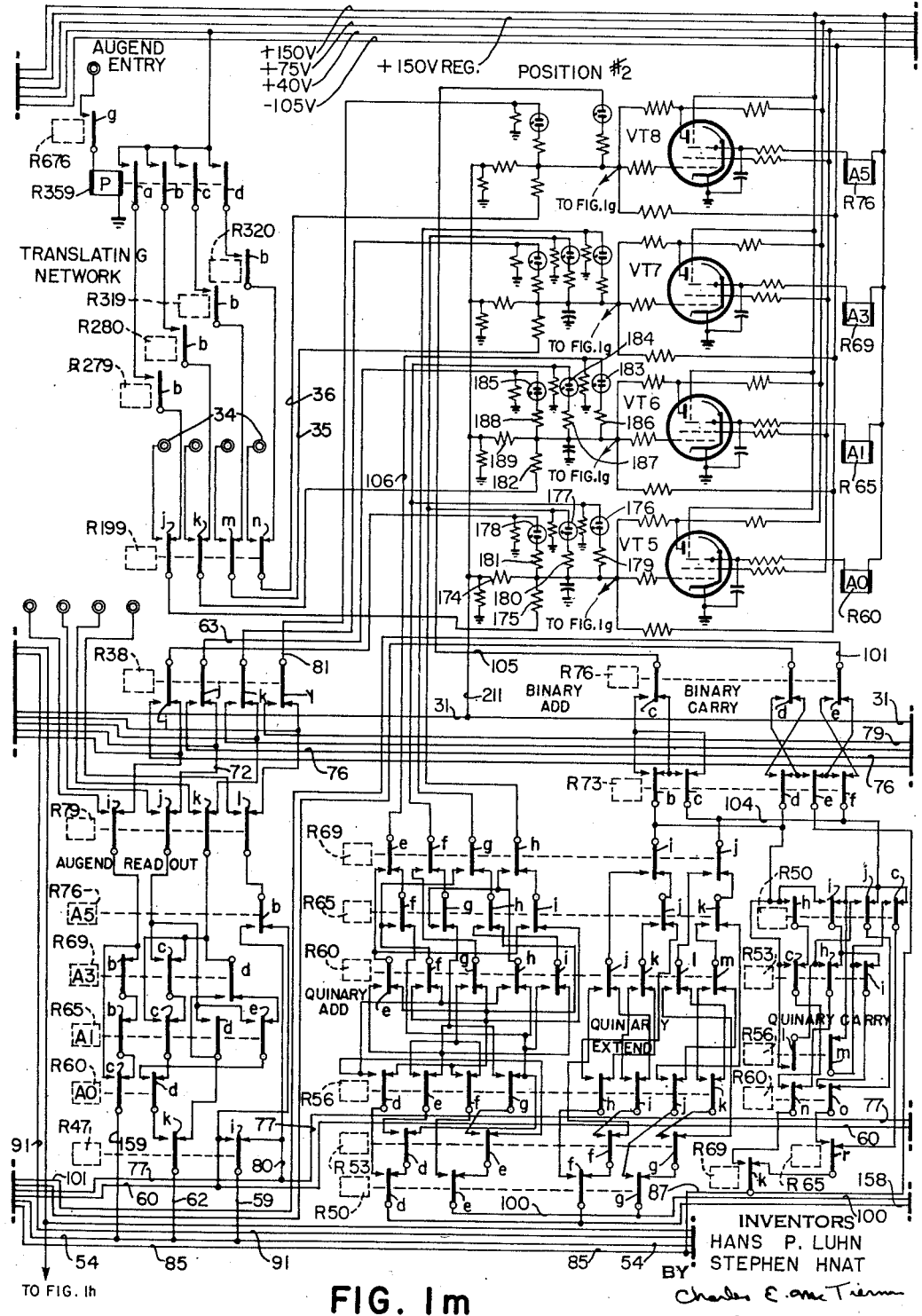
Figure 1N:
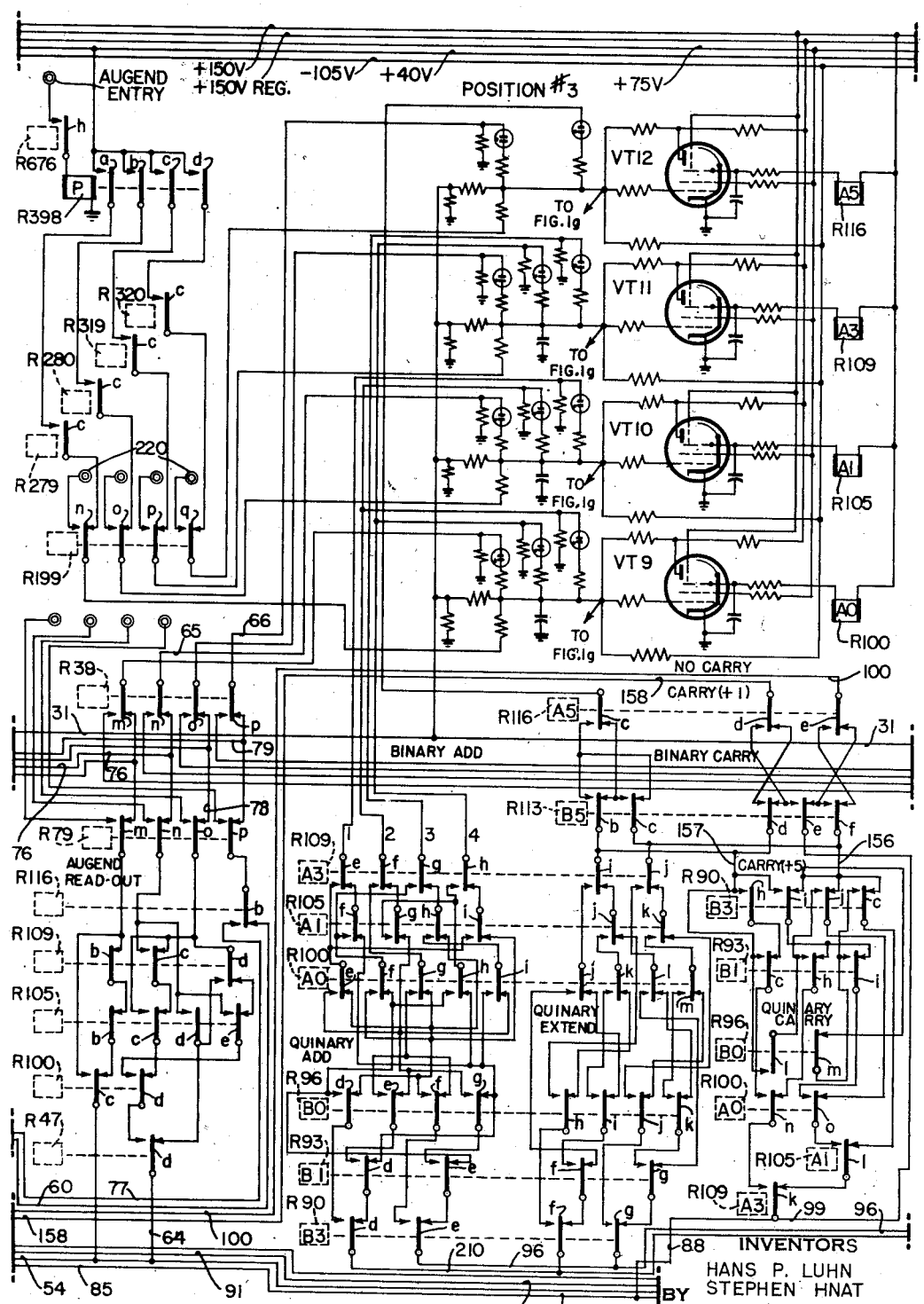
Figure 10:
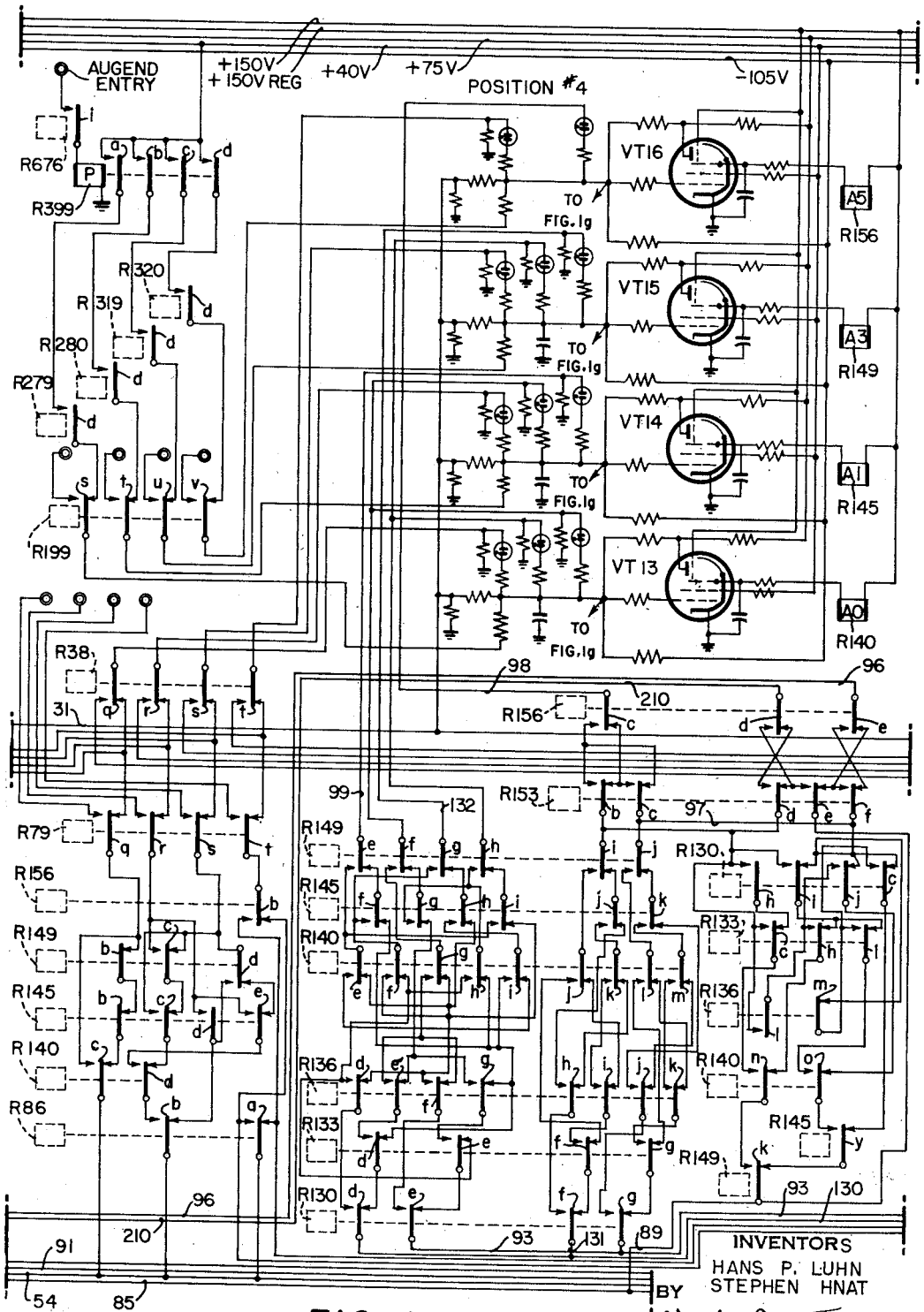
Figure 1P:
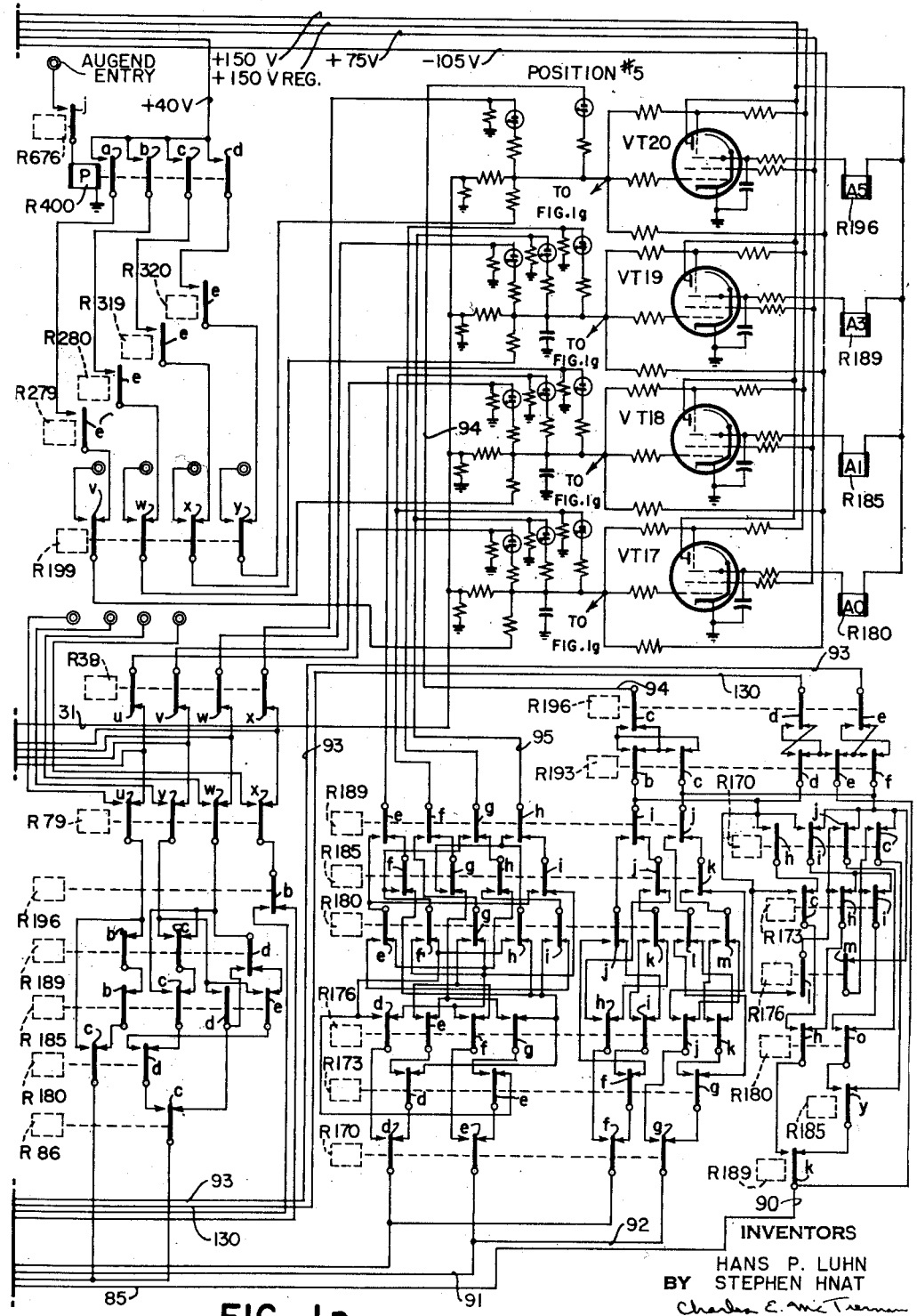

The adding pulse is applied to the adding circuit for the first, second, third, fourth and fifth orders from conductor 85 by means of the respective conductors 86 (Fig. 1k), 87 (Fig. 1m), 88 (Fig. 1n), 89 (Fig. 1o) and 90 (Fig. 1p).

In attempting to trace the adding pulse through the adding circuit of the fifth accumulating position from the input conductor 90 (Fig. 1p), it will be observed that due to the shifting of contacts no completed circuit can be traced therefrom. But this adding circuit will be read out by an adding pulse which will be fed back from the highest accumulating position to the fifth position, the lowest, by means of conductor 91 in a manner to be subsequently described. The circuits read out by this adding pulse carried back from the highest order will result in the value "9" being entered in codified form in the augend relays. One of these circuits is traceable as follows: line 91 (Fig. 1p), conductor 92, shifted contacts R170g and R176j, contacts R185k and R189j as shown, a parallel circuit arrangement of shifted contacts R193f, contacts R196e, and no-carry line 93 to the fourth order, and contacts R193c shifted, R196c as shown, line 94, to the control grid of the tube VT20. The feeding of this pulse to the tube VT20 causes the same to be made conductive resulting in the energization of the augend relay R196 representative of the value "5."

The second circuit is traceable as follows: conductor 91, shifted contacts R170e and R176f, contacts R185i and R189h as shown, conductor 95, to the respective control grid of the tubes VT17 and VT19. The application of a positive pulse to these tubes will render them conducting resulting in the relays R180 and 189 representative of the values "0" and "3" being energized.

Summarizing, it is found that in reading out the adding circuit for the fifth order at this particular time that the total of the values registered in the augend and addend relays will be entered in the augend relays.

In the fourth accumulating position, there is nothing entered in the augend relays while the addend relays have entered therein in codified form the value "6." Thus in reading out the adding circuit associated with the fourth order at the time the fifth "On" pulse is fed from the pulse generator, the total of the values registered in the augend and addend relays will be entered in the augend relays.

The following circuits are completed for reading out the fourth accumulating position at this time. The first circuit is as follows: line 85 (Fig. 1o), line 89, contacts R149k, R145y, and R130c all as shown, R153f shifted, R156e as shown, no-carry conductor 96 to the next higher order.

The second circuit is similar to the first circuit up to contacts R153f and from this point is traceable as follows: conductor 97, shifted contacts R153c, contacts R156c as shown, line 98, to the control grid of tube VT16. The feeding of a positive pulse to the control grid of VT16 will render this tube conductive causing the relay R156 representative of the value "5" to be energized.

The third circuit is set up by means of a positive pulse being applied over the no-carry conductor 93 from the adjacent lower order. This circuit is traceable as follows: line 93 (Fig. 1o), contacts R130e as shown, R133e shifted, R136g, R145f and R149e all as shown, conductor 99, to the control grid of the tube VT14. Upon applying a positive pulse to the grid of VT14 it is made conductive resulting in the energization of the relay R145 representative of the value "1."

Thus with the relays R145 and R156, respectively represenative of the values "1" and "5," now energized, it is apparent that the total of the values entered in the augend and addend relays at this time is now registered in the augend.

In reading out the adding circuit for the third accumulating position (Fig. 1n) only one circuit will be established which will enable a pulse to be applied to the next higher order. This circuit is traceable as follows: conductor 85 (Fig. 1n), line 88, line 99, contacts R113e and R116e as shown, to the no-carry conductor 100.

In the second accumulating position (Fig. 1m) there is entered in the augend the value "6" as represented by the relays R76 and R65 in an energized position while no value has been entered in the addend relays. Thus it is apparent that in reading out the adding circuit for this second order the summation of the values entered

27 in the augend and addend relays will be represented by the relays R76 and R65 retained in an energized state. The circuits making this condition possible will now be traced.

The first circuit which receives a direct add pulse from conductor 85 is traceable as follows: conductor 85 (Fig. 1m), line 87, contacts R69k as shown, R65r shifted, R60o, R50j and R73f all as shown, R76e shifted, no-carry conductor 101 to the next higher order.

The second circuit is similar to the first circuit up to contacts R73f and from this point is traceable as follows: conductor 104, contacts R73c as shown, R76c shifted, line 105, to the control grid of the tube VT8 in an energized condition. Since this tube is already energized when the positive pulse is applied thereto, it shall be retained in such a condition. Thus with VT8 in an energized condition, it follows that the corresponding relay R76 representative of the value "5" is also energized.

The third circuit is set up by the pulse being applied over the no-carry conductor 100 from the adjacent lower order. This circuit may be traced as follows: line 100 (Fig. 1m), contacts R50e, R53e and R60f all as shown, R65f shifted, R69e as shown, conductor 106, to the control grid of the tube VT6. Inasmuch as VT6 is in an energized state, it is continued in such a state as is the corresponding relay R65 representative of the value "1."

In the highest order of each of the augend and the addend units there is entered the value "1" as represented by the respective relays R25 and R13 being in an energized condition. When the adding pulse is applied to the adding circuit operably coupled to the highest accumulating position directly from the comparison circuit and indirectly from the adjacent lower order, the summation of the values entered therein will be read out and entered in the augend. Thus with a "1" entered in the augend and the addend, the reading out of the adding circuit will cause the relay R20 to be energized and the relay R25 to be retained in an energized condition. It is to be noted that the relays R25 and R20 being in an energized condition are representative of the value "2" as expressed in the coding arrangement of 0, 1, 3 and 5. The circuit making possible the energization of relay R20 and continuing the energization of relay R25 is traceable as follows: no-carry conductor 101 (Fig. 1k) which is delivering the add pulse from the adjacent lower order, contacts R10e as shown, R13e shifted, R16g, R20h, R25g and R29f all as shown, conductor 108, to the control grid of the tubes VT1 and VT2. The feeding of the positive pulse to the tubes VT1 and VT2 will continue the latter and the associated relay R25 in an energized state while the former will be energized resulting in the relay R20 being energized.

Simultaneous with the fifth "On" pulse, the fifth "Off" pulse will be applied to the control grid of all the accumulator tubes such that those tubes not receiving a concurrent "On" pulse will be rendered non-conductive. As previously mentioned, those tubes receiving the "On" pulse at the same time an "Off" pulse is applied thereto will either be energized or continued in an energized state, as the case may be, since the "On" pulse will predominate.

Thus it now becomes apparent that the adding pulse reading out the adding circuit of a particular order to reset the augend to indicate a total passes through a path in the adding circuit which may include contacts of the relay which is being reset. As mentioned previously, the fact that it is possible to sneak through an adding pulse over the adding circuit prior to being reset is due to the difference in time between the duration of the adding pulse, which is one millisecond, and the time required for a closed set of contacts to break, which is about two milliseconds.

The following seven "On" pulses are each emitted by the first comparison position as an adding pulse inasmuch as in each instance the value standing in the highest order of the augend is equal to or greater than the "1" standing in the corresponding order of the addend. These seven

28

"On" pulses will enable the multiplicand to be added seven times and the multiplier digit "8" to be reduced to zero as represented in complement form. The timing diagram of Fig. 4d shows the augend relays energized for each adding pulse during this phase of the calculations. The diagram of Fig. 3a shows the amount entered in the augend for each of these seven pulses, pulses 6 to 12 inclusive, which are similar to steps 6 to 12.

The thirteenth "On" pulse upon being applied to the comparison circuit will, as a result of the comparison, be emitted as a shift pulse which will cause each value registered in the augend to be shifted to the next higher order. This shift pulse will also be applied to the relay R5 (Fig. 1i) for registration purposes inasmuch as R5 in an energized state represents that a second count shift has taken place. The circuit established for energizing relay R5 is traceable from the output side of the comparison circuit as follows: conductor 70 (Fig. 1j), line 71 (Fig. 1j to Fig. 1i), contacts R53d now closed, R4a shifted, R5a as shown, conductor 109, to the control grid of the tube VT61. Upon being energized the tube VT61 will cause the relay R5 to be energized in a manner as previously described.

As shown in the timing diagram of Fig. 4d when the relay R5 is energized, the shift relay R38 is deenergized. The circuit causing the de-energization of the shift relay R38 when relay R5 is energized is traceable as follows: from the −100 volt terminal (Fig. 1i), conductor 110, contacts R3b and R5b now closed, conductor 111, to the control grid of the tube VT65. The application of a negative potential to VT65 will render VT65 non-conductive causing the relay R38 to be de-energized.

The next three "On" pulses, the fourteenth, fifteenth and sixteenth pulses, which are equivalent to steps 14, 15 and 16 as shown in Fig. 3a, are adding pulses and are instrumental in adding the multiplicand three times to the partial product entered in the augend as well as reducing the multiplier digit "3" to zero.

The seventeenth "On" pulse upon being applied to the comparison circuit is, as a result of comparing the "9" standing in the highest order of the augend with the "1" standing in the corresponding order of the addend, emitted as a shift pulse. This third shift pulse, unlike the two preceding shift pulses, reads out each of the augend positions direct without any shifting operation inasmuch as the shift relay R38 is in a de-energized state at this time. The completed circuit for reading out the highest order will be traced, as an example, as follows: conductor 70 (Fig. 1j), conductor 71 (Fig. 1j to Fig. 1k), line 53, contacts R79D and R79C normally closed, conductor 54 parallel conductors 55, 56 (Fig. 1k), and 59 (Fig. 1m). From conductor 55 the circuit may be traced through contacts R20c shifted, R79e and R38e as shown, conductor 57 to the control grid of the tube VT1 thereby continuing this tube and the associated augend relay R20 in an energized state. The circuit may also be traced from conductor 56 through contacts R47j as shown, R29d shifted, R79g and R38g as shown, conductor 58 to the control grid of VT3. Inasmuch as VT3 is in an energized state it shall upon receiving this positive pulse be continued in such a state as shall the associated relay R29. The circuit from conductor 59 (Fig. 1m) may be traced through contacts R47i as shown, conductor 80, conductor 77 (Fig. 1m to Fig. 1k), contacts R36b shifted, R79h and R36h as shown, conductor 61 to the control grid of the tube VT4. Since VT4 is in an energized state at this time it shall be continued in such a state as well as the associated relay R36.

As previously explained, an "Off" pulse is applied to all of the accumulator tubes simultaneous with the application of an "On" pulse to certain ones of said tubes such that only those tubes receiving an "Off" pulse are rendered non-conductive.

Besides reading out the adding circuits, the third shift pulse is also fed over a completed circuit for energizing the tube VT62 (Fig. 1i) causing the relay R6 to be energized also. The circuit may be traced from the comparison circuit (Fig. 1j) as follows: conductor 70, line 71 (Fig. 1j to Fig. 1i), contacts R3d, R4a, R5a all shifted, R6d as shown, conductor 112, to the control grid of the tube VT62. The application of this positive shift pulse to the grid of the tube VT62 will render this tube conductive causing the relay R6 to be energized also in a manner similar to that as previously described.

Upon energizing the relay R6 the associated contacts R6a (Fig. 1i) are shifted resulting in the circuit for applying the "Off" pulses to the grid of the accumulator tubes being broken. Thus at this phase of the operation, the calculations per se are terminated with the factor "95727" standing in the augend with the further operations of rounding the product and reading out the same still to be carried out.

The eighteenth "On" pulse is then applied to the tube VT82 (Fig. 1i) resulting in the tube VT82 and the associated relay R201 being respectively rendered conductive and energized. The circuit making possible the energization of the tube VT82 may be traced from conductor 43 (Fig. 1h), contacts R41h as shown, conductor 42 (Fig. 1h to Fig. 1i), contacts R3c and R6d shifted, line 113 to the grid of the tube VT82. The relay R201, which is energized when VT82 is made conductive, is energized only when calculations have been completed in order to prepare the circuit arrangement for the next following program step.

The eighteenth "Off" pulse is applied to the control grid of the energized tubes R3, R4, R5 and R6 for the purpose of returning those tubes to a non-conductive state. The circuit established for carrying out this operation may be traced from conductor 47 (Fig. 1h), contacts R41c as shown, conductor 82 (Fig. 1h to Fig. 1i), contacts R3a and R6a shifted, line 114, to the control grid of the tubes R6, R5, R4 and R3. The timing diagram of Fig. 4d shows that these tubes are rendered non-conductive after the "12" index time of the calculating cycle.

With the energization of relay R201, the contacts R201a (Fig. 1e) will shift thereby enabling a circuit to be established when the cam controlled contacts C13 (Fig. 1e) make at 12.6 index time for energizing the relay R202 (Fig. 1e). This circuit may be traced from the positive side of the 40 volt power supply source as follows: conductors 14 and 24 (Fig. 1e), cam controlled contacts C13 now closed, conductor 67, conductor 116, contacts R201a shifted, pick-up coil of relay R202 and then to ground. A hold circuit will be established for the relay R202 when the cam controlled contacts C10 make at 12.9 time as shown in the timing diagram of Fig. 2. This hold circuit may be traced from the contacts C10 as follows: conductor 25, contacts R618a as shown, R622a as shown, line 115, contacts R202a now closed, the hold coil of the relay R202 and then to ground.

It is to be pointed out at this time that the making of the cam controlled contacts C13 at 11.3 index time also establishes a hold circuit for the relay R202 through the associated contacts R202c. At the time that contacts C10 establish a hold circuit for the relay R202 through its associated contacts R202a there shall be established a circuit through the contacts R202b for energizing the pick-up coil of the relay R203 (Fig. 1e). The relay R203 will be held through the contacts R203a by means of a circuit established when the contacts C13 make at 11.3 index time of the calculating cycle.

The energization of the relay R203 causes the contacts R203c (Fig. 1h) to close. The closing of these contacts results in a circuit being established for rendering the tube VT82 (Fig. 1i) non-conductive and returning its associated relay R201 to a de-energized state. The circuit established for applying the negative "Off" pulse to the control grid of the tube VT82 may be traced as follows: conductor 47 (Fig. 1h), contacts R41a as shown, line 118, contacts R203c now closed, conductor 119 (Fig. 1h to Fig. 1i), to the control grid of VT82. Inasmuch as the relay R201 is now in a de-energized condition when the cam controlled contacts C13 make at 11.3 index time, a circuit will be established for energizing the program count relay R622. This circuit may be traced from the contacts C13 (Fig. 1e) as follows: conductor 67, conductor 116, contacts R201a as shown, conductor 120, contacts R203b now closed, conductor 38, pick-up coil of the relay R622 and then to ground.

A parallel circuit arrangement will be established when the cam controlled contacts C10 make around 11.6 index time for setting up the hold circuit for the relay R622 and for energizing the relay R599 (Fig. 1e). This circuit may be traced from the cam controlled contacts C10 (Fig. 1e) as follows: conductor 25, contacts R618a as shown, parallel circuit consisting of contacts R622a shifted, the hold coil of R622 and then to ground, and contacts R622b shifted, R600b shifted, R597b as shown, pick-up coil of the relay R599 and then to ground. At the time the contacts C10 establish a hold circuit for the relay R622, cam controlled contacts C7 (Fig. 1e) make thereby enabling a circuit to be completed for carrying out the third program step which is that of rounding out the last digit of the product. The circuit may be traced from the cam controlled contacts C7 as follows: conductor 40 (Fig. 1e), contacts R618b as shown, R622c shifted, R600c shifted, R597e as shown, hub PS3, plug line 121, hub ½ ADJ, pick-up coil of the relay R204 and then to ground.

When the cam controlled contacts C13 make at "0" index time a first circuit will be established for holding the relay R204 while a second circuit will be established for picking up the relay R597 (Fig. 1e) and for holding the relay R599 in an energized condition. The first circuit may be traced from the cam controlled contacts C13 in the following manner: conductor 67, contacts R204a now closed, the hold coil of the relay R204 and then to ground. The second circuit completed when the cam controlled contacts C13 make may be traced therefrom as follows: line 67, conductor 68, contacts R619a as shown, line 122, contacts R599a and R599b now closed, respective relays R599 and R597 and then to ground. As in the case of relays R600 and R601 the relays R597 and R599 will be alternately retained in an energized condition by the cam controlled contacts C13 and C10.

When the relay R204 is energized the normally closed contacts R204g (Fig. 1b) will open thus breaking the hold circuit for the addend relays as established by the cam controlled contacts C15, such that the addend relays will all be returned to a de-energized position after the cam controlled contacts C12 (Fig. 1b) break at "0" index time. With all the addend relays being de-energized and with the relay R204 now energized, a circuit will be established when the cam controlled contacts C9 (Fig. 1b) make during the "0" index time for entering a "5" in the lowest order of the addend for the purpose of rounding the last digit of the product in a manner as shall subsequently be made clearer. This circuit may be traced from the positive side of the 40 volt power source as follows: conductor 14 (Fig. 1b), contacts C9 now closed, line 123 (Fig. 1b to Fig. 1c), contacts R204c shifted, plug line 124, contacts R204d, line 125, pick-up coil of the relay R193 and then to ground. As previously described for the addend relays, the relay R193 will be retained in an energized state by means of the alternate breaking and making of the cam controlled contacts of C12 and C15. The time at which the addend relays R13, R153, R133, R170 and R176 are de-energized and R193 retained in an energized state are shown in Fig. 4b.

When the cam controlled contacts C9 make, a second obvious circuit will be established through the contacts R204b (Fig. 1c) for energizing the relay R206. A hold circuit will be established for the relay R206 through the associated contacts R206a when the cam controlled contacts C10 (Fig. 1c) make. At the same time the cam controlled contacts C10 will set up a circuit through the contacts R206b (Fig. 1c) for energizing the relay R207. A hold circuit is established for the relay R207 through the now closed contacts R207a and the normally closed contacts R208d (Fig. 1c). When the relay R207 is energized the contacts R207b (Fig. 1h) are closed thereby enabling a circuit to be established for applying a positive "On" pulse to tube VT83. This circuit may be traced as follows: conductor 43, contacts R41e now closed, conductor 127, contacts R208a as shown, contacts R207b now closed, conductor 126 (Fig. 1h to Fig. 1i), to the control grid of the tube VT83. The application of the positive "On" pulse to the control grid of this tube renders the same conductive thereby enabling the relay R208 to be energized. With the energization of the relay R208 the hold circuit for relay R207 will be opened to drop relay R207.

With the relay R208 in an energized state, contacts R208a will shift thereby establishing a circuit for applying a positive "On" pulse to each order of the augend for the purpose of reading out the same. This circuit may be traced as follows: conductor 43 (Fig. 1h), contacts R41e as shown, conductor 127, contacts R208a shifted, conductor 128, contacts R47g as shown, conductor 129 (Fig. 1h to Fig. 1j), conductor 85 (Fig. 1j to Fig. 1k), to the input side of the adding circuit associated with each order of the augend. This "On" pulse will be applied to the adding circuit of the fifth order for the purpose of adding the value "7" previously entered and the value "5" entered for rounding purposes.

The only circuit completed by the direct application of the positive "On" pulse to the fifth order may be traced as follows: conductor 85 (Fig. 1p), conductor 90, R193e, shifted, R196d shifted, carry conductor 130 to the fourth order (Fig. 1p to Fig. 1o), contacts R130d, R133d (Fig. 1o) as shown, R140i and R145h shifted, R149g, conductor 132, to the control grid of the tube VT15. The application of the positive "On" pulse to the control grid of this tube will render the tube conductive resulting in energization of the relay R149 representative of a "3" value. The application of this "On" pulse to the first accumulating order will result in a carry-back pulse being fed therefrom to the fifth accumulating order in such a manner as to cause the relay R180 to be energized, which relay in an energized state is representative of the "2" value entered in the augend.

This same "On" pulse which is applied to the adding circuits will also be applied to the control grid of tube VT82 (Fig. 1i) causing the energization thereof and resulting in the associated relay R201 being simultaneously energized. The circuit for energizing the tube VT82 may be traced from line 43 (Fig. 1h), contacts R41e as shown, line 127, contacts R208c now closed, conductor 133, conductor 134 (Fig. 1h to Fig. 1i), conductor 113, to the control grid of tube VT82.

As noted from the timing diagram of Fig. 4d after the rounding operation is completed, the factor now standing in the augend is "95732" as represented by the proper augent relays being in an energized condition.

As previously explained, the energization of the relay R201 is instrumental in setting up the circuit for the next following program step. During the time the relay R208 is energized and simultaneous with the application of a positive "On" pulse to the adding circuit, a negative "Off" pulse is applied to the control grid of all the accumulator tubes. The circuit making possible the application of this negative pulse to the grid of the tubes may be traced as follows: conductor 47 (Fig. 1h), contacts R41a as shown, conductor 118, conductor 135, contacts R208b now closed, line 30, to the control grid of the accumulator tubes.

As previously stated, simultaneous "On" and "Off" pulses are applied to the accumulator tubes. Those tubes receiving only the "Off" pulse will be retained in a non-conductive position or rendered non-conductive, whichever the case may be, while those tubes receiving concurrent "On" and "Off" pulses will be rendered conductive or continued in a conductive condition inasmuch as the "On" pulse will dominate the "Off" pulse. The relay R208 will be rendered non-conductive through the application of a direct "Off" pulse being applied thereto through the contacts R578a as shown (Fig. 1i). It is to be noted in the timing diagram of Fig. 4b that the relay R208 is energized for a period shorter than the relay R207 where the relay R208 is to set up a hold circuit for the relay R207, as previously described. It should be pointed out while in the instant case the relay R208 does not function in setting up a hold circuit for the relay R207, that under other operating conditions it may, inasmuch as the spacing of the "On" and "Off" pulses may be varied.

As previously set forth, after the operation required of a particular program step has been effected the circuit is prepared for the next following program step through the energization of the relays R201, R202 and R203 in the order named. It has just been seen that the relay R201 is picked up after the relay R208 is energized. With the energization of the relay R201, the associated contacts R201a are transferred, thereby enabling a circuit to be established therethrough to energize the relay R202. When the cam controlled contacts C10 make around 1.1 index time of the calculating cycle a circuit will be established for holding the relay R202 in an energized state and for energizing the relay R203. This circuit may be traced from the cam controlled contacts C10 as follows: conductor 25, contacts R618a as shown, R622a as shown, line 115, contacts R202a and R202b shifted, the respective relays R202 and R203 and then to ground. When the relay R203 becomes energized a negative "Off" pulse will be applied through the contacts R203c (Fig. 1h), to the control grid of the tube VT82 to render this tube non-conductive and cause the relay R201 to be returned to a de-energized position. Likewise, during the time that the relay R203 is an energized condition there will be established two circuits when the cam controlled contacts C13 make around 1.4 index time of the calculating cycle. These circuits have been previously traced and it will be sufficient to state that the first circuit will set up a hold circuit for the relays R203 and R202, while the second circuit will cause the energization of the program count relay R622, such as shown in the timing diagram of Fig. 4d.

With the energization of the relay R622 (Fig. 1e) the associated contacts R622a shift thereby enabling a pair of circuits to be established when the cam controlled contacts C10 make at 1.7 time. One of these circuits will constitute the hold circuit for relay R622, while the other will cause the energization of R596 (Fig. 1e). The hold circuit for the relay R622 may be traced from the cam controlled contacts C10 (Fig. 1e) as follows: conductor 25, contacts R618a as shown, R622a shifted, the hold coil of the relay R622 and then to ground. The circuit established for energizing the relay R596 is traceable from the cam controlled contacts C10 as follows: line 25, contacts R618a as shown, R622b shifted, R600b shifted, R597b shifted, R595b as shown, to the pick-up coil of the relay R596 and then to ground. It is to be noted at this point that when the contacts R622a shift that the circuit established through these contacts to energize the relays R202 and R203 when the cam controlled contacts C10 make is broken, such that the relays R202 and R203 will drop out when the cam controlled contacts C13 break prior to the "2" index time of the calculating cycle.

At the same time that the cam controlled contacts C10 establish a circuit for the energization of the relay R596, a circuit is established for carrying out the last program step when the cam controlled contacts C7 (Fig. 1e) make to cause the energization of the relay R619 (Fig. 1e). This circuit for energizing the relay R619 may be traced from the cam controlled contacts C7 as follows:

conductor 40, contacts R618b as shown, R622c shifted, R600e shifted, R597e shifted, R595e as shown, hub PS4, plug line 136, program clear hub, pick-up coil of the relay R619 and then to ground.

With the relay R619 now in an energized condition, the circuit established through the associated contacts R619a for holding the program counter relays in an energized state when the cam controlled contacts C13 make is broken. The program counter relays R600, R601, R599, R597 and R596 will all be returned to a de-energized state when the cam controlled contacts C10 break at 2.1 index time of the calculating cycle. Likewise, with the relay R619 in an energized state when the cam controlled contacts C13 make, a circuit will be established for continuing the relay R619 in an energized condition and for energizing the relay R618. This circuit may be traced from the cam controlled contacts C13 as follows: conductor 67, conductor 68, parallel circuit arrangement of contacts R619a shifted, the hold coil of R619 and then to ground, and contacts R619b shifted, the pick-up coil of the relay R618 and then to ground.

While it is not shown in the drawings, the last program step will be used to clear the relay storage and addend relays. This may be done by coupling the hubs PS4 to the addend (B) clear relay R209 (Fig. 1e) and the RS IN relay R653 (Fig. 1e) for respectively de-energizing the addend and relay storage relays. Thus when the clear relay R209 is energized, the contacts R209a (Fig. 1b) will open thereby breaking the hold circuit for the addend relays set up by the cam controlled contacts C15. When the relay R653 is energized, the contacts R653c (Fig. 1a) will open to break the hold circuit for the relay storage relays as set up by the cam controlled contacts C14 (Fig. 1a).

Also at the time that the relay R619 is energized a circuit is established for energizing the relay R14 (Fig. 1e) which may be traced from the cam controlled contacts C7 as follows: conductor 40, contacts R618b as shown, R622c shifted, R600d shifted, R597d shifted, R595d as shown, hub PS4, plug line 137, the feed start hub, contacts R12d now closed as shown in the timing diagram of Fig. 4d, the pick-up coil of the relay R14 and then to ground. When the cam controlled contacts C10 make during the second index time of the calculating cycle, a hold circuit is established for the relay R618 through its associated contacts R618a. It is to be noted from the timing diagram of Fig. 4b that the relays R618 and R619 will be returned to a de-energized state when the respective cam controlled contacts C13 and C10 break.

A hold circuit is established for the relay R14 (Fig. 1e) at this time inasmuch as the cam controlled contacts C40 (Fig. 1e) are closed as shown by the timing diagram of Fig. 2. This circuit may be traced as follows: line 14 (Fig. 1e), conductor 24, contacts C40 now closed, conductor 138, contacts R14a now closed, hold coil of relay R14 and then to ground.

When the cam controlled contacts C42 (Fig. 1e) make at 7.3 index time of the calculating cycle an obvious circuit will be established through the now closed contacts R14b for energizing the relay R9. With the contacts R9a now transferred and the cam controlled contacts C43 (Fig. 1e) having closed at 7.3 index time, a holding circuit will be established for the relay R9.

The energization of the relay R9 causing the contacts R9a to be transferred will now open the hold circuit for the relays R11 and R12 as established by the contacts C43 thereby causing these relays to be deenergized when the cam controlled contacts C40 break at "8" index time.

With the relay R11 now returned to its un-energized state, the contacts R11e (Fig. 1e) are returned to the normally closed position thereby enabling a circuit to be completed when the cam controlled contacts C29 (Fig. 1e) make at 9.7 index time for energizing the punch clutch magnet PCM (Fig. 1e). This circuit may be traced from contacts C29 as follows: conductor 140, contacts R10a now closed, R11e normally closed, punch clutch magnet PCM and then to ground.

The energization of the punch clutch magnet PCM will cause the next following card and the sensed card to be fed in a manner well known and understood in the art such that new factors are being read into the relay storage unit and the addend storage unit while the product stored in the augend will be read out.

At 14.1 index time of the second reading cycle, the cam controled contacts C39 (Fig. 1f) make causing a circuit to be established for energizing the augend exit relay R686 (Fig. 1f). This circuit may be traced as follows: line 14 (Fig. 1f), contacts R12b normally closed, card lever relay contacts R2a now closed, contacts C39 now closed, hub 215, plug line 141, hub 203, pick-up coil of relay R686 and then to ground. A hold circuit for this relay is set up through its associated contacts R686a when the cam controlled contacts C44 are in a closed position.

Inasmuch as the product entered in the augend is expressed in the 0, 1, 3, 5 code, it is necessary that this product be converted back to the decimal equivalent prior to being read out of the augend. This is made possible through the energization of the readout translating relays (Fig. 1d) corresponding to the decimal equivalent thereof.

When the cam controlled contacts C17 (Fig. 1d) make at the "3" index time of the readout cycle, the cam controlled contacts C48 will also be in a make position resulting in the translating relay R681 being energized where the relay R681 is representative of the value "3."

Thus with C17 in a make position and the translating relay R681 energized, a circuit will be established for reading out the fourth order of the augend. This circuit may be traced as follows: conductor 14 (Fig. 1d), conductor 142, contacts C17 now closed, R686b now closed, R681b shifted, R683c as shown, conductor 143, conductor 144, contacts R140a as shown, R149a shifted, R156a and R360g, each as shown, punch magnet PM4 and then to ground. The energization of the punch magnet PM4 will cause the value read out to be punched into the record card in a manner well known.

When the cam controlled contacts C17 make at "5" index time, the "5" value standing in the augend will be read out. At the time C17 is in a make position, the cam controlled contacts C49 will also be closed thereby enabling a circuit to be completed for energizing the readout translating relay R360 (Fig. 1d). Thus with the cam controlled contacts C17 closed, and the relays R686 and R360 energized, a circuit will be established for reading out the second order of the augend and causing the energization of the punch magnet PM2.

At "7" index time, the cam controlled contacts C17, C49, C47 and C45 (Fig. 1d) will all be closed. The closing of the latter three contacts will cause the energization of the respective translating relays R360, R682 and R683, while the closing of the contacts C17 will complete a circuit for reading out the value "7" standing in the third order of the augend. This circuit may be traced as follows: conductor 14 (Fig. 1d), conductor 142, contacts C17 now closed, R686b shifted, R681b as shown, R682b shifted, R683d shifted, conductor 145, conductor 146, transferred contacts R100b and R105a, R109a as shown, R116a and R360h each shifted to the punch magnet PM3 (Fig. 1d).

It is to be understood during the readout cycle that the factors represented in the next following card are being read and entered in either the relay storage unit or the addend unit, whichever the case may be.

At approximately 9.1 index time of the second reading cycle, the relay R576 (Fig. 1e) will be energized in a manner as previously described causing a negative pulse to be applied to the accumulator tubes of the augend for the purpose of clearing the augend of any values which may be stored therein. This operation will thereby enable the transferring operation for the second set of factors to take place.

(2) Divide 75 into 2986—result 39 plus remainder.

In a problem of this nature, it shall be assumed that the dividend will be entered in the orders 2 to 5, inclusive, of the augend, and that the divisor will be entered in the second and third orders of the addend.

Due to the detail description of the problem in multiplication in which certain steps are similar to that encountered in a division problem, the instant divisional operation will be briefly described inasmuch as it is felt that the diagram of Fig. 3b and the timing diagram of Figs. 5a and 5b when taken together will enable one to understand the particular operation.

The diagram of Fig. 3b and the timing diagram of Figs. 5a and 5b are directed towards the simple problem of dividing the factor 75 into the factor 2986. No readout operation will be described inasmuch as such an operation was described in the multiplication problem. The timing diagram of Figs. 5a and 5b shows the factors entered in the respective factor receiving devices, and the programming operation necessary to produce the desired result.

The augend and addend will be initially conditioned for an entry operation when the cam controlled contacts C38 (Fig. 1f) make at 12.5 index time of the reading cycle. This will cause the energization of the augend and the addend entry relays R676 and R672 as shown in Fig. 5a.

As it is now understood, the factors will be sensed, converted and entered in the augend and addend pursuant to the coding arrangement of 0, 1, 3 and 5.

As in the case of the multiplication problem, the relay R15 (Fig. 1f) will be energized when the cam controlled contacts C37 make at 7.2 index time. This constitutes a preliminary step for suppressing card feeding and commencing calculations. Feeding of the record card will be suppressed when the relay R11 is energized at 9.4 index time.

The programming operation will be initiated when the cam controlled contacts C37 (Fig. 1e) make at 9.4 index time causing the energization of the program start relay R621 (Fig. 1e) as shown in Fig. 5b. A hold circuit for this relay will be set up when the cam controlled contacts C10 (Fig. 1e) make at 9.4 index time. At the same time C10 will cause the relays R121 and R167 (Fig. 1e), which are representative of the first program step, to be energized. A hold circuit for R167 will be established by the cam controlled contacts C13 while a hold circuit for R121 will be set up by the normally closed contacts R123c. The energizing of relay R167 will close the contacts R167b (Fig. 1b), and with the contacts C9 (Fig. 1b) closing at 9.8 index time, a circuit will be established for energizing the addend relay R173 (Fig. 1c). The energizing of R173 causes a "1" to be entered in the fifth order of the addend.

The energizing of the relay R121 completes a circuit for applying the first "On" pulse over conductor 42 (Figs. 1h and 1i), contacts R1c as shown, line 221 (Figs. 1i to 1h), contacts R125b and R123b (Fig. 1h) as shown, R121b to the control grid of the tube VT70 causing the tube and associated relay R123 (Fig. 1h) to be energized. When relay R123 becomes energized the contacts R123c open to break the hold circuit established thereby for the relay R121.

With R123 energized, the second "On" pulse will be applied over the now closed contacts R123e (Fig. 1h) to the control grid of the tubes VT63 and VT64 causing these tubes and the corresponding invert relays R86 and R47 (Fig. 1h) to be energized. The second "On" pulse will also be applied through contacts R1c (Fig. 1i) as shown, conductor 221, contacts R125b as shown, R123b shifted, to the control grid of VT71 rendering this tube and the associated relay R125 (Fig. 1h) energized. The second "Off" pulse will be applied direct to the tube VT70 de-energizing this tube and the associated relay R123.

The third "On" and "Off" pulses are applied to the augend tubes for all orders but those tubes receiving only an "Off" pulse will be made non-conductive or retained in such a condition. The "Off" pulse will be applied through the closed contacts R41b and R47b (Fig. 1h) and conductor 30 to the control grid of augend control tubes. The third "Off" pulse is also applied through contacts R47a to the control grid of the tube VT63 and VT64 thereby de-energizing these tubes and the corresponding relays R86 and R47. The third "Off" pulse will also be applied directly to the tube VT71 causing this tube and the associated relay R125 to be de-energized. The third "On" pulse will be applied to the augend readout circuits associated with each order of the augend for the purpose of resetting the dividend to complement form. The factor standing in the augend after this operation is shown in Fig. 3b. The third "On" pulse will also cause the energization of the shift relay R38 and the division control relay R1 (Fig. 1i).

Now with the division control relay R1 energized, the fourth "On" pulse is applied to the even comparison circuit through the contacts R1c shifted (Fig. 1i), R6c as shown, and R13k as shown (Fig. 1j). The results of the comparison will produce a shift pulse which will cause the shifting of the value standing in each order of the augend to the next higher order. This shift pulse will also be applied to the product-quotient counter to energize the relay R4. The values standing in the augend after the shifting operation is shown in Fig. 3b while the energized relays representative of these values are shown in Fig. 5b.

The fourth "Off" pulse is applied to all the augend tubes resulting in those tubes not receiving simultaneous "On" and "Off" pulses being made non-conductive or retained in such a state.

The next three "On" pulses, fifth, sixth and seventh, are applied to the comparison circuit and are emitted as an adding pulse. This adding pulse is applied to the adding circuit for each order of the augend and causes the dividend to be reduced three times the divisor, and the "1" in the fifth order of the addend to be added three times, thus developing the first quotient digit 3.

When the eighth "On" pulse is applied to the comparison circuit, it is emitted as a shift pulse causing the value entered in each order of the augend to be shifted to the adjacent higher order. The resulting shift pulse will also be instrumental in energizing the product-quotient counter relay R5 to register the second shift pulse. The energizing of the relay R5 results in the closing of the contacts R5b thereby coupling the control grid of the tube VT65 to the −100 volts terminal (Fig. 1i) causing the tube and associated relay R38 to be de-energized.

The next nine "On" pulses, pulses 9 to 17, inclusive, are adding pulses which reduce the dividend by nine times the divisor and add the "1" in the fifth order of the addend nine times in order to produce the second quotient digit 9.

The eighteenth "On" pulse upon being applied to the comparison circuit is emitted as a shift pulse but inasmuch as the shift relay is now de-energized, the shift pulses reads out the augend readout circuit for each order directly. The main purpose of this third shift pulse is to terminate the application of the "On" pulses to the adding circuits such that the amount standing in the augend at this time is the quotient. The third shift pulse is applied to the product-quotient counter R6 (Fig. 1i) which opens the circuit for applying further "On" pulses to the adding circuits.

As in the case of the problem in multiplication, the next following "Off" pulse returns the relays R1, R4, R5 and R6 (Fig. 1i) to a de-energized condition thereby enabling the circuits to be conditioned for the next program step.

Referring to Fig. 3b, it is to be noted at the end of the calculations, as represented by the eighteenth pulse, that the quotient is now standing in the fourth and fifth orders of the augend while the remainder, in complement form, is standing in the second and third orders of the augend.

The remaining operations are similar to that previously described and shall not be repeated.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A calculating machine comprising two groups of factor receiving devices, each said groups further comprising a plurality of denominationally ordered sets of code relays, means for entering a multidigit factor in each of said sets of code relays, a greater than, less than, and equal to comparing circuit including contacts of said relays for determining the relative magnitude of said factors, means controlled by said greater than and equal to circuits for initiating the summation of said factors, means controlled by said less than circuits for shifting each of the digits of one of said factors to the next higher ordered one of the corresponding one of said sets of code relays, said relays being energized in combination to represent said factors.

2. In a calculating machine, a first and second group of factor receiving devices, said first and second group each comprising a plurality of denominationally ordered sets of relays, each of said sets comprising four relays respectively representative of the values 0, 1, 3 and 5, means for entering a multidigit multiplier in said first group, means for entering a multidigit multiplicand in said second group, means for inverting said multiplier in said first group, biased electron discharge means coupled to each of said relays of said first group, a network of contacts for each of said sets of each order of said first and second group interconnected in accordance with a table of addition and extending to said discharge means, pulse generator means for supplying simultaneous positive and negative pulses at a predetermined rate, said negative pulses being supplied to said discharge means at said rate for disabling such of said devices to which a positive pulse is not applied at the same time, comparing circuit means for controlling the application of said positive pulses to respective orders of said network, said comparing circuit means when said multiplier is at least equal to said multiplicand causing said positive pulses to be applied to said discharge means for energizing the corresponding relay of said first set thereby enabling said multiplicand to be repeatedly accumulated, said multiplier during said accumulation being reduced to 0, digit by digit, said comparing circuit when said multiplier is less than said multiplicand causing each order of said multiplier to be shifted to the next higher order, said multiplier being shifted a number of times equal to the number of digits represented thereby, said relays of said first group manifesting the product of said multiplier and multiplicand after said multiplier is reduced to 0 subsequent to last shift of said multiplier.

3. In a calculator, a group of augend receiving means comprising a plurality of ordered sets of relays, a group of addend receiving means comprising a plurality of ordered sets of relays, each of said sets comprising four relays respectively representative of the values 0, 1, 3 and 5, means for entering a multidigit factor in each said group of augend and addend receiving means through the energization of the corresponding ones of said relays either singly or in combination, a plurality of negatively biased electron discharge means, said discharge means controlling the energization of the corresponding one of each of said four relays of each said sets of relays of said augend receiving means, a plurality of contacts controlled by the respective relays of each of said ordered sets of augend and addend relays interconnected in accordance with a table of addition, means for extending said interconnections to said discharge means, a source of positive and negative pulses, means for applying one of said positive pulses through said interconnected contacts to energize selected ones of said discharge means as determined by said controlled contacts, said selected discharge means upon being energized causing the energization of the corresponding augend relay thereby causing the sum of said factors to be entered in said augend relays, and means for simultaneously applying the corresponding one of said negative pulses to said discharge means such that those discharge means not receiving concurrent positive and negative pulses will be de-energized.

4. A first and second set of factor receiving means, said first set comprising four augend relays representative of the values 0, 1, 3 and 5, said second set comprising four addend relays representative of the value 0, 1, 3 and 5, negatively biased electron discharge means, there being one for each augend relay and operably associated therewith, said discharge means controlling the energization of the corresponding one of said augend relays, means for entering a factor in each of said first and second receiving means through the energization of said augend and addend relays either singly or in combination, the energization of the augend relays being caused by the energization of the corresponding discharge means, comparing means jointly controlled by said augend and addend relays for comparing the relative magnitude of said factors, a set of contacts jointly controlled by said augend and addend relays and interconnected in accordance with a table of addition, means for extending said interconnections to said discharge means, and means for applying a single pulse through said interconnected contacts to said discharge means when a predetermined relationship between said factors is detected by said comparing means, said interconnections directing said pulse to effect energization or to retain in such a state of selected ones of said discharge means as determined by said set of contacts, said selected ones of said discharge means causing the energization of the corresponding augend relays representative of the sum of said factors, and means concurrent with said single pulse for de-energizing or retaining in such a state the non-selected ones of said discharge means.

5. In a calculator, a first factor receiving device, said device comprising four relays respectively representative of the values 0, 1, 3 and 5, a first and second set of contacts controlled by said first device, a second factor receiving device, said second device comprising four relays respectively representative of the values 0, 1, 3 and 5, a third and fourth set of contacts controlled by said second device, means for entering a factor in each said device as represented by the corresponding relays being energized either singly or in combination, comparing means including said first and third set of contacts interconnected in such a manner so as to determine the relative magnitude of said factors, electrical circuit connections interconnecting said second and fourth set of contacts in accordance with a table of addition, electron discharge means for controlling the energization of said relays of said first device, there being one for each corresponding relay, means for extending said circuit connections to said discharge means, and means for applying simultaneously a positive and negative pulse to said discharge means to cause said relays of said first device to be reset to register the sum of said factors, said positive pulse being passed through said interconnected second and fourth set of contacts to cause energization of selected ones of said discharge means when a predetermined relationship between said factors is detected by said comparing means, said negative pulse causing those discharge means receiving only a negative pulse to be de-energized.

References Cited in the file of this patent

UNITED STATES PATENTS

| | | |
|---|---|---|
| 2,061,745 | Wadel | Nov. 24, 1936 |
| 2,176,929 | Smith | Oct. 24, 1939 |
| 2,364,540 | Luhn | Dec. 5, 1944 |
| 2,434,499 | Lang | Jan. 13, 1948 |
| 2,486,809 | Stibitz | Nov. 1, 1949 |
| 2,539,043 | Verneaux | Jan. 23, 1951 |
| 2,572,132 | Giroud | Oct. 23, 1951 |

OTHER REFERENCES

"A Functional Description of the EDVAC," volume II by Moore School of Engineering (drawing No. 104–10LD–6); vol. I (pp. 1–1 to 1–6) November 1, 1949.